(12) United States Patent
Vu et al.

(10) Patent No.: US 10,299,632 B2
(45) Date of Patent: May 28, 2019

(54) APPARATUS AND METHOD FOR BLENDER SYSTEM WITH MID-CYCLE INVERSION

(71) Applicant: North American Robotics Corporation, San Francisco, CA (US)

(72) Inventors: My Vu, San Francisco, CA (US); Elvine Pineda, San Francisco, CA (US); Matthew Udomphol, San Francisco, CA (US)

(73) Assignee: NORTH AMERICAN ROBOTICS CORPORATION, San Francisco, CA (US)

( * ) Notice: Subject to any disclaimer, the term of this patent is extended or adjusted under 35 U.S.C. 154(b) by 225 days.

(21) Appl. No.: 15/474,991

(22) Filed: Mar. 30, 2017

(65) Prior Publication Data

US 2017/0202399 A1    Jul. 20, 2017

Related U.S. Application Data

(63) Continuation of application No. 15/143,058, filed on Apr. 29, 2016, now Pat. No. 9,629,503, which is a
(Continued)

(51) Int. Cl.
*A47J 43/07* (2006.01)
*A47J 43/08* (2006.01)
(Continued)

(52) U.S. Cl.
CPC .......... *A47J 43/0716* (2013.01); *A47J 31/60* (2013.01); *A47J 43/046* (2013.01);
(Continued)

(58) Field of Classification Search
CPC ...... A47J 31/60; A47J 43/046; A47J 43/0716; A47J 43/0766; A47J 43/0772;
(Continued)

(56) References Cited

U.S. PATENT DOCUMENTS 2,387,024 A * 10/1945 Hishon .................... B01J 3/002
165/76
2,511,357 A * 6/1950 Marty ................... A47J 43/044
209/251
(Continued)

*Primary Examiner* — Tony G Soohoo
(74) *Attorney, Agent, or Firm* — Shabbi S. Khan; Foley & Lardner, LLP

(57) ABSTRACT

A system includes a container platform configured to receive a container, a blade assembly and a blade actuator for rotating blades of the blade assembly, a blade platform, and a platform actuator for moving the blade platform between a blade engagement position and a container engagement position. A processor is configured to cause the platform actuator to move the blade platform, prior to a first actuation of the blade actuator, from the container engagement position to the blade engagement position, to cause the first actuation, to cause the platform actuator to move the blade platform towards the container engagement position, to cause the blade platform to return to the blade engagement position, to cause a second actuation of the blade actuator, and to cause the platform actuator to return the blade platform to the container engagement position subsequent to the second actuation.

20 Claims, 31 Drawing Sheets

US 10,299,632 B2
Page 2

Related U.S. Application Data continuation-in-part of application No. 14/808,442, filed on Jul. 24, 2015, now Pat. No. 9,370,279, which is a continuation-in-part of application No. 29/555,101, filed on Feb. 18, 2016, now Pat. No. Des. 833,272, which is a continuation of application No. 29/521,542, filed on Mar. 24, 2015, now Pat. No. Des. 752,971.

(60) Provisional application No. 62/154,489, filed on Apr. 29, 2015, provisional application No. 62/031,076, filed on Jul. 30, 2014, provisional application No. 62/076,188, filed on Nov. 6, 2014, provisional application No. 62/133,674, filed on Mar. 16, 2015, provisional application No. 62/154,466, filed on Apr. 29, 2015.

(51) Int. Cl.
*A47L 15/42* (2006.01)
*B01F 13/00* (2006.01)
*B01F 15/00* (2006.01)
*B01F 3/12* (2006.01)
*A47J 31/60* (2006.01)
*B08B 9/093* (2006.01)
*A47J 43/046* (2006.01)

(52) U.S. Cl.
CPC ....... *A47J 43/0766* (2013.01); *A47J 43/0772* (2013.01); *A47J 43/0777* (2013.01); *A47J 43/085* (2013.01); *A47L 15/4282* (2013.01); *B01F 3/1271* (2013.01); *B01F 13/0098* (2013.01); *B01F 15/00025* (2013.01); *B01F 15/0074* (2013.01); *B01F 15/00201* (2013.01); *B01F 15/00253* (2013.01); *B01F 15/00344* (2013.01); *B01F 15/00876* (2013.01); *B01F 15/00896* (2013.01); *B08B 9/093* (2013.01); *A47L 2601/16* (2013.01); *B01F 2015/00597* (2013.01); *B01F 2215/0014* (2013.01); *B01F 2215/0022* (2013.01)

(58) Field of Classification Search
CPC .......... A47J 43/0777; A47J 43/085; B01F 13/0098; B01F 15/00025; B01F 15/00201; B01F 15/00253; B01F 15/00344; B01F 15/0074; B01F 15/00876; B01F 15/00896; B01F 2015/00597; B01F 2215/0014; B01F 2215/0022; B01F 3/1271
See application file for complete search history.

(56) References Cited

U.S. PATENT DOCUMENTS

| | | | | |
|---|---|---|---|---|
| 3,137,327 A * | 6/1964 | Muench | ............ | B01F 9/02 141/172 |
| 3,224,741 A * | 12/1965 | Muench, Sr. | ......... | B01F 9/0018 366/197 |
| 3,262,680 A * | 7/1966 | Balazer | ............ | B01F 7/1605 366/207 |
| 3,505,075 A * | 4/1970 | Black | ............ | A23G 9/045 426/318 |
| 3,746,316 A * | 7/1973 | Langen | ............ | B01F 9/0018 366/213 |
| 3,999,742 A * | 12/1976 | Heyraud | ............ | B01F 9/0018 366/180.1 |
| 4,042,221 A * | 8/1977 | Myers | ............ | B01F 7/161 366/146 |
| 4,135,828 A * | 1/1979 | Cabak | ............ | B01F 7/162 366/197 |
| 4,372,686 A * | 2/1983 | Herfeld | ............ | B21F 9/02 366/220 |
| 4,432,650 A * | 2/1984 | Langen | ............ | A22C 5/00 366/147 |
| 4,671,666 A * | 6/1987 | Herfeld | ............ | B01F 7/162 366/197 |
| 4,676,658 A * | 6/1987 | Herfeld | ............ | B01F 7/162 366/197 |
| 4,781,468 A * | 11/1988 | Herfeld | ............ | B01F 7/162 366/213 |
| 4,957,373 A * | 9/1990 | Derksen | ............ | B01F 7/162 366/197 |
| 5,054,933 A * | 10/1991 | Derksen | ............ | B01F 7/162 251/144 |
| 5,067,819 A * | 11/1991 | Heinhold | ............ | B01F 7/1605 134/104.1 |
| 5,123,747 A * | 6/1992 | Derksen | ............ | B01F 7/162 248/130 |
| 5,208,050 A * | 5/1993 | Ney | ............ | A23G 9/045 222/229 |
| 5,439,289 A * | 8/1995 | Neilson | ............ | A23G 9/045 366/206 |
| 5,865,538 A * | 2/1999 | Walker | ............ | B01F 7/1695 366/197 |
| 6,241,380 B1 * | 6/2001 | Bonemann | ............ | B01F 9/106 366/217 |
| 6,331,070 B1 * | 12/2001 | Desai | ............ | B01F 7/162 366/197 |
| 9,370,279 B2 * | 6/2016 | Pineda | ............ | A47J 43/046 |
| 9,629,503 B2 * | 4/2017 | Vu | ............ | A47J 43/0716 |
| 10,022,019 B2 * | 7/2018 | Pineda | ............ | A47J 43/046 |
| 2016/0029844 A1 * | 2/2016 | Pineda | ............ | A47J 43/046 366/142 |
| 2016/0270598 A1 * | 9/2016 | Vu | ............ | A47J 43/0716 |
| 2016/0296073 A1 * | 10/2016 | Pineda | ............ | A47J 43/046 |
| 2017/0172348 A1 * | 6/2017 | Vu | ............ | B01F 7/1615 |
| 2017/0202397 A1 * | 7/2017 | Vu | ............ | A47J 43/0716 |
| 2017/0202398 A1 * | 7/2017 | Vu | ............ | A47J 43/0716 |
| 2017/0202399 A1 * | 7/2017 | Vu | ............ | A47J 43/0716 |

* cited by examiner

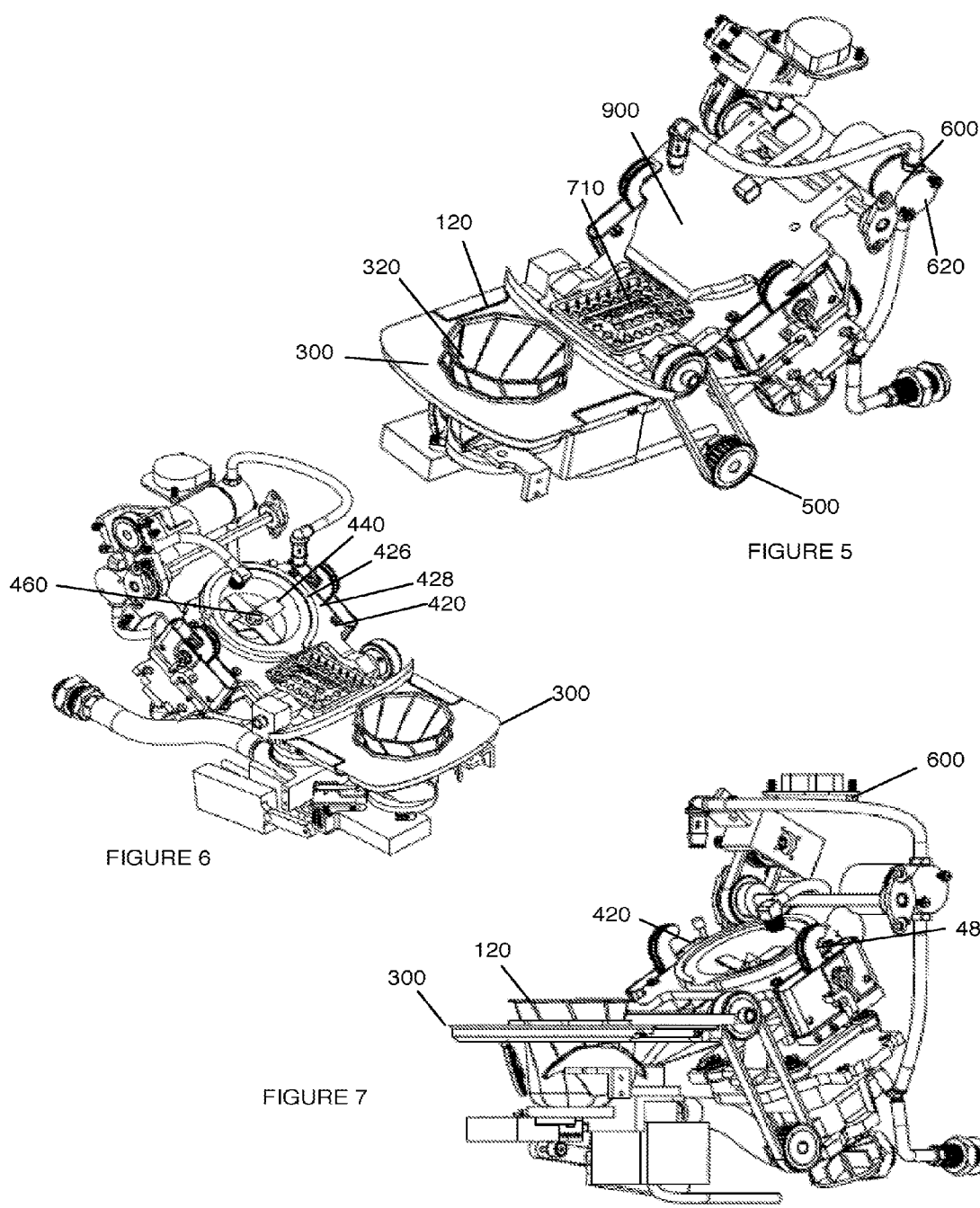

SECTION A-A

DETAIL B

DETAIL C

APPARATUS AND METHOD FOR BLENDER SYSTEM WITH MID-CYCLE INVERSION

CROSS-REFERENCE TO RELATED APPLICATIONS

The present application is a continuation of U.S. patent application Ser. No. 15/143,058, titled "BLENDING CONTAINER FOR USE WITH BLENDING APPARATUS," filed Apr. 29, 2016, which is a continuation-in-part of, and claims the benefit of and priority to, U.S. patent application Ser. No. 14/808,442, titled "AUTOMATED FOOD PROCESSING SYSTEM AND METHOD," filed Jul. 24, 2015, which claims priority to U.S. Provisional Application No. 62/154,466, titled "AUTOMATED FOOD BLENDING APPARATUS AND METHOD," filed Apr. 29, 2015; U.S. Provisional Application No. 62/133,674, titled "AUTOMATED BLENDING APPARATUS AND METHOD," filed Mar. 16, 2015; U.S. Provisional Application No. 62/076,188, titled "AUTOMATED BLENDING APPARATUS AND METHOD," filed Nov. 6, 2014; and U.S. Provisional Application No. 62/031,076, titled "AUTOMATED BLENDING APPARATUS AND METHOD," filed Jul. 30, 2014. The present application is also a continuation of U.S. patent application Ser. No. 15/143,058, titled "BLENDING CONTAINER FOR USE WITH BLENDING APPARATUS," which claims the benefit of and priority to U.S. Provisional Application No. 62/154,489, titled "APPARATUS AND METHOD FOR BLENDING SOLID FOODSTUFFS," filed Apr. 29, 2015. The present application is also a continuation of U.S. patent application Ser. No. 15/143,058, titled "BLENDING CONTAINER FOR USE WITH BLENDING APPARATUS," which is a continuation-in-part of, and claims the benefit of and priority to, U.S. patent application Ser. No. 29/555,101, titled "FOOD CONTAINER," filed Feb. 18, 2016, which is a continuation of U.S. patent application Ser. No. 29/521,542, titled "FOOD CONTAINER," filed Mar. 24, 2015. Each of the foregoing applications are herein incorporated by reference in their entirety.

TECHNICAL FIELD

This disclosure relates generally to the field of blending foods and more specifically to a new and useful automated food processing system and related method for blending foods.

BACKGROUND

Food processing systems can receive material in a container for processing and use blades or other tools to stir or blend the material. For example, solid or at least partially fluid material can be blended into a product to be consumed by a user. However, it can be difficult to blend materials to a user's satisfaction without the user having to closely monitor the blend cycle and the processing of the material in the container. Although food processing systems can be automated, it can be difficult to properly blend heterogeneous materials and mixtures of materials while maintaining a high quality product to be consumed by a user.

SUMMARY

According to an aspect of the present disclosure, a system for processing foodstuffs includes a container platform, a blade assembly, a blade actuator, a blade platform, a platform actuator, and a processor. The container platform defines a container receptacle configured to receive a container when the container platform is at a loading position. The blade assembly includes a set of blades is configured to rotate to process the foodstuffs. The blade actuator is configured to rotate the blades. The blade assembly is mounted to the blade platform. The platform actuator is configured to move the blade platform between a blade engagement position at which the blade assembly is coupled to the blade actuator and a container engagement position at which the blade platform is configured to couple to the container platform when the container platform is at the loading position. The processor is configured to cause the platform actuator to move the blade platform, prior to a first actuation of the blade actuator for the blend cycle, from the container engagement position to the blade engagement position. The processor is configured to cause the first actuation of the blade actuator, the first actuation including coupling the blade actuator to the blade assembly. The processor is configured to cause, subsequent to the first actuation, the platform actuator to move the blade platform away from the blade engagement position towards the container engagement position. The processor is configured to cause the blade platform to return to the blade engagement position. The processor is configured to cause a second actuation of the blade actuator subsequent to the blade platform returning to the blade engagement position, the second actuation including recoupling the blade actuator to the blade assembly. The processor is configured to cause the platform actuator to return the blade platform to the container engagement position subsequent to the second actuation.

According to another aspect of the present disclosure, a method for processing foodstuffs includes moving a blade platform, prior to a first actuation of a blade actuator for a blend cycle, from a container engagement position at which the blade platform is configured to couple to a container platform when the container platform is at a loading position, to a blade engagement position. A blade assembly including a set of blades configured to rotate to process the foodstuffs is mounted to the blade platform. The container platform defines a container receptacle configured to receive a container when the container is at a loading position. The blade actuator is configured to rotate the blades. The method includes performing a first actuation of the blade actuator by coupling the blade actuator to the blade assembly. The method includes moving the blade platform, subsequent to the first actuation, away from the blade engagement position towards the container engagement position. The method includes returning the blade platform to the blade engagement position. The method includes performing a second actuation of the blade actuator subsequent to the blade platform returning to the blade engagement position. The second actuation includes recoupling the blade actuator to the blade assembly. The method includes returning the blade platform to the container engagement position subsequent to the second actuation.

BRIEF DESCRIPTION OF THE FIGURES

FIG. 5 is an isometric view of an example of the system components, with the blade shield in the clean position.

FIG. 6 is an isometric view of an example of the system components, with the blade shield removed.

FIG. 7 is an isometric view of an example of the system components, with the blade shield removed.

DETAILED DESCRIPTION

The following description of various embodiments of the disclosure is not intended to limit the disclosure to these embodiments, but rather to enable any person skilled in the art to make and use this disclosure.

1. Automated Food Processing System

Figure 3:
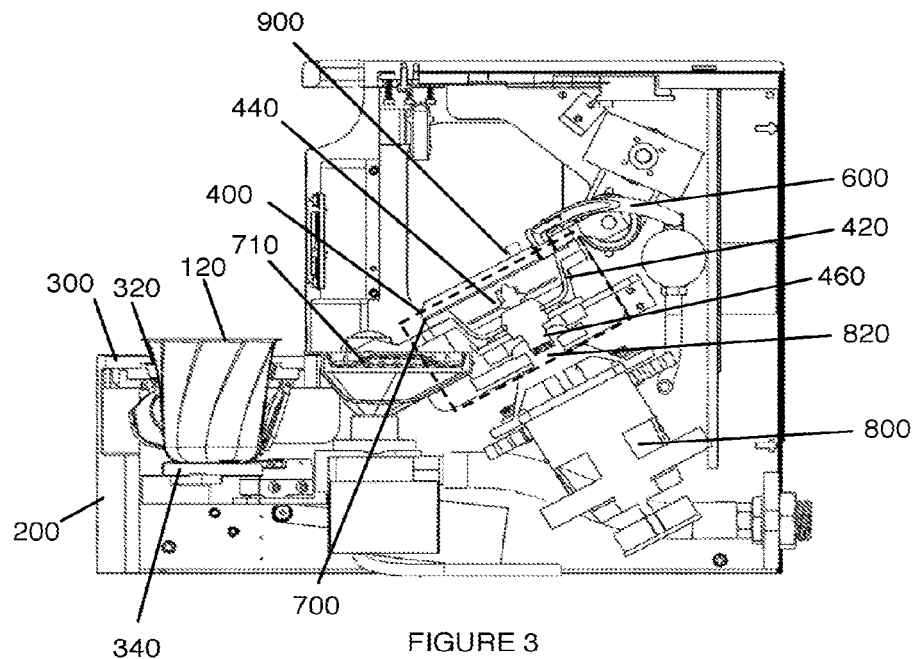
FIG. 3 is a cutaway view of the example of the system.

As shown in FIG. 3, an automated food processing system 100 includes: a housing 200; a container platform 300 operable between a loading position 302 and a processing position 304; a blade assembly 400 including: a blade platform 420 operable between an engaged position 422 and a disengaged position 424 and a set of blades 440 rotatably mounted to the blade platform 420; and a blade actuator 800. In one variation, the automated food processing system is an automatic blending system, and is configured to blend the food solids into an emulsion.

In one variation of the automated food processing system further includes: a blade shield 900 transiently operable in a clean position, the blade shield 900 substantially enveloping the blender blade in the cleaning position during a clean cycle; a cleaning fluid injector injecting a volume of cleaning fluid into the lumen formed between the blade shield 900 and the blade platform 420 during the clean cycle; and a drain adjacent the blade actuator 800 and receiving the volume of cleaning fluid from the blade shield 900 via the spout. The system 100 can additionally or alternatively include a door 220 operable between an open position and a closed position, the door 220 cooperatively enclosing the container platform 300, blade platform 420, set of blades 440, and blade actuator 800 in the closed position and exposing at least the container platform 300 in the open position; a set of sensors used to determine the presence of the container 120 within the container receptacle 320, the lid position, or any other operation parameter; and a processor 180 that automatically controls system operation. However, the system 100 can include any other suitable component.

2. Applications

Generally, the automated food processing system 100 functions to process foodstuff. In one variation, the automated food processing system automatically blends food solids, such as frozen or whole food, into an emulsion. The system 100 preferably processes single-serve food portions (e.g., portions of 8-16 oz), but can alternatively process multiple-serve food portions (e.g., portions of 2-4 L). The system 100 is preferably a countertop system, but can alternatively be a large appliance (e.g., for use in an office or café setting), or have any other suitable form factor. The system 100 is preferably self-contained, but can alternatively connect to one or more utilities (e.g., an electricity outlet and/or water supply, such as a faucet). The automated food processing system preferably processes foods into smoothies, but can alternatively or additionally make soups, baby food, sauces, chopped food, food mixes (e.g., batter), or otherwise process the food.

In operation, the automated food processing system functions to receive a container 120 (e.g., a cup, a bowl)

containing food solids, to automatically process (e.g., mix, blend) the food solids within a processing cavity entirely or partially formed by the container 120 into a mixture (e.g., an emulsion), to deliver the mixture back to a consumer for consumption directly from the container 120, and to automatically clean the portions of the automated food processing system in direct contact with the food solids and/or the emulsion.

In a first specific example, the automated food processing system can define a self-contained, countertop system that receives the cup containing frozen fruit and/or frozen vegetables. The system 100 can automatically dispense a particular volume of water into the cup once the cup has been loaded into the automated food processing system. The system 100 can automatically invert the cup and blend its contents into a smoothie, and return the cup—now containing the smoothie—to a consumer. The system 100 can automatically clean all or portions of the automated food processing system in contact with the fruit, vegetables, and/or smoothie in preparation for receiving a subsequent cup of frozen fruit and/or vegetables.

In a second specific example, the system 100 can additionally or alternatively receive a bowl containing soup ingredients, such as sliced vegetables, cream, stock, and spices, and the automated food processing system can then automatically blend the contents of the bowl into a soup, deliver the bowl back to a consumer for consumption of the soup directly from the bowl, and clean elements of the automated food processing system in contact with the soup or the soup ingredients in preparation for blending food solids in a subsequent cup or bowl loaded into the automated food processing system.

However, the automated food processing system can function as a standalone system for processing any other type of food solids into a mixture or an emulsification in situ within a container 120, wherein the container defines both a storage container 120 for the food solids and a consumption container 120 from which a consumer consumes the emulsification. For example, the automated food processing system can blend fruit into a smoothie, blend vegetables into a soup, process vegetables into salad, blend cornmeal into grits, grind oats into oatmeal, and/or blend fruits and vegetables into baby food, etc.

3. Container and Foodstuff

The automated food processing system can accept a container 120 containing one or more foodstuffs to be blended. The container 120 can include a body, which defines a container opening fluidly connected to a container 120 lumen that retains the foodstuff. The container 120 can additionally include a container lid. The container 120 is preferably configured to removably couple (e.g., transiently couple) to the container receptacle 320, but can alternatively substantially permanently couple or otherwise couple to the container receptacle 320 or container platform 300.

The container 120 can be prepackaged (e.g., be provided by a manufacturer or supplier with the foodstuff pre-arranged within the container 120), be filled by a user, or be otherwise supplied. The container 120 can be disposable (e.g., made of wax paper, cardboard, bamboo, plant fiber, polypropylene, etc.) or reuseable (e.g., made of thermoplastic, silicone, etc.). The container 120 can be rigid, flexible, or have any other suitable deformation property (e.g., elasticity or rigidity). The container 120 can be thermally insulative, thermally conductive, or have any other suitable thermal property. The container 120 can be transparent, translucent, opaque, or have any other suitable optical property. The container 120 can be cylindrical, prismatic, frustroconical, or have any other suitable shape.

The container 120 (vessel) can include keying features (location features) that function to orient the container 120 within the container receptacle 320 and/or resist container rotation during the blend cycle. The container keying features are preferably complimentary to keying features on the container receptacle 320, but can alternatively be mismatched or have any other suitable relationship to the container receptacle keying features. The keying feature can be the container profile, a feature (e.g., protrusion, depression, aperture, etc.) along the container housing 200, or include any other suitable keying feature. The keying feature is preferably defined along the portion of the container 120 configured to engage the container receptacle 320, but can alternatively be defined along the entirety of the container face (e.g., along the entire container 120 length, entire container base, etc.) or be defined along any other suitable portion of the container 120. The keying feature can be defined along the container housing 200 (e.g., along the base or sidewall), along the container lid, or along any other suitable portion of the container 120. In one variation, the keying feature can include a multi-sided container cross-section, such as a polygon (e.g., an octagon, nonagon, etc.). In a specific variation, the keying feature can be the container edge or lip defining the container opening, wherein the container lip cross-section can be multi-sided. In a second variation, the keying feature can be an asymmetric protrusion extending radially from the container sidewall. However, any other suitable keying feature can be used.

The container 120 can additionally include flow features that facilitate turbulent flow generation, such as spiral features on the wall (e.g., in the direction of rotation, against the direction of rotation, etc.), protrusions extending radially inward from the wall, or include any other suitable feature that encourages turbulent flow. The flow features are preferably defined along the wall interior (e.g., the wall face defining the container 120 lumen), but can be defined elsewhere.

The container 120 can additionally include a container lid, which functions to seal the foodstuff within the container 120 lumen. The container lid can be a snap lid, a sheet melted, adhered, or otherwise coupled to the container opening, or be any other suitable container lid. The container 120 can be inserted into the system 100 with the container lid, wherein the system 100 automatically manages the container lid (e.g., removes the container lid, pierce the container lid, etc.), or be inserted into the system 100 without the container lid. In the latter instance, the user preferably removes the container lid prior to container 120 insertion into the system 100. In this instance, the system 100 can additionally notify the user in response to determination that the container lid is still on the container 120. However, the container lid can be otherwise processed.

For example, a container 120 can be cup containing frozen strawberries, frozen blueberries, and frozen yogurt and sealed with a lid, such as a molded polymer snap lid or a wax-paper lid bonded over an opening of the cup. The cup lid can be removed from the cup and the cup then loaded into the automated food processing system by a user, the automated food processing system can execute the method to add fluid (e.g., water, juice, milk, etc.) to the cup and to blend the frozen strawberries, frozen blueberries, and frozen yogurt in a fruit smoothie, and the cup then removed from the automated food processing system and the smoothie consumer directly from the cup by the user.

The foodstuff can be substantially whole foodstuff (e.g., whole berries, whole nuts, whole seeds, whole fruits), be pre-blended foodstuff refrozen into pellets, discs, or as a solid piece within the cup, be presented in liquid form, or be in any other suitable form factor. In one variation, liquid, high-cellulose content, and/or foods with a high clumping probability (e.g., apples) are preblended and re-formed into pellets that are subsequently included in the cup, while other foods, such as berries, can be included as whole fruits in the cup. The foodstuff temperature is preferably maintained at substantially 0° F. (e.g., within a margin of error, such as several degrees) but can alternatively be maintained at 15-20° F., maintained at room temperature, or be maintained at any other suitable temperature.

However, the automated food processing system can receive a container 120 of any other form and containing any other food solids, and the automated food processing system can execute the method in any other way to automatically process the food solids for a user.

4. Housing

Figure 1A:
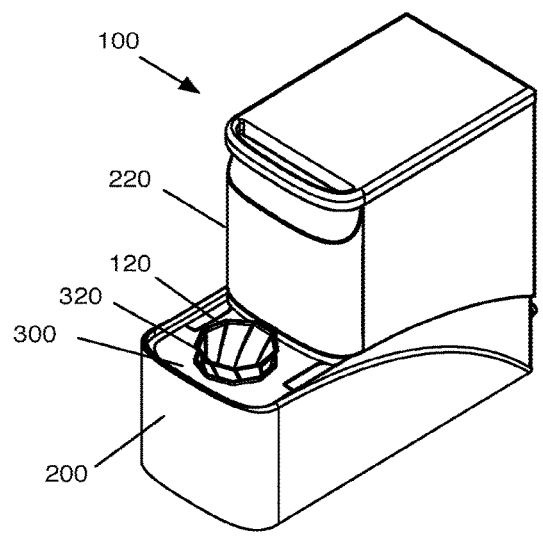
FIGS. 1A and 1B are isometric views of an example of the system.
Figure 1B:
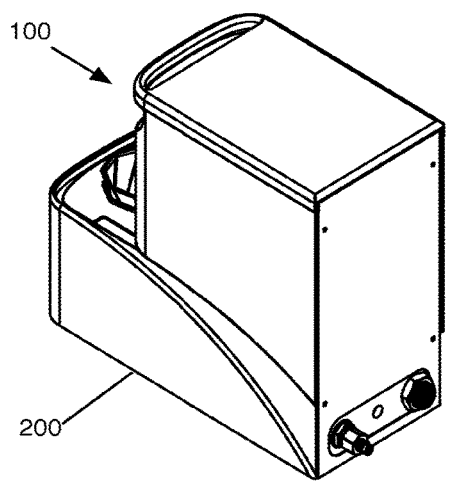
Figure 2:
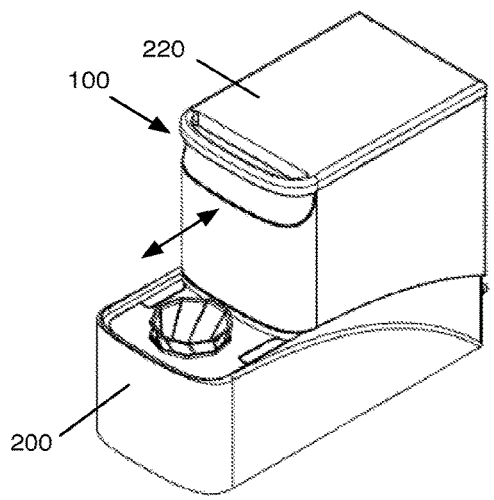
FIG. 2 is a schematic representation of a door actuation path.

As shown in FIGS. 1, 2, and 3, the housing 200 of the automated food processing system functions as a mounting point and support for the system components. The housing 200 (system body) also functions to house and enclose the system components. The housing 200 can include a base and sidewalls extending from the base. The sidewalls can extend from the base at a normal angle (e.g., at a 90° angle), or extend from the base at any other suitable angle. The sidewalls and/or base are preferably rigid, but can alternatively be flexible or have any other suitable material property. The housing 200 is preferably substantially opaque, but can alternatively be transparent or translucent.

The automated food processing system 100 can additionally include a door 220 that functions to cooperatively enclose the system components with the housing 200. The door 220 is preferably operable between an open position and a closed position. The door 220 preferably cooperatively encapsulates the container receptacle 320 within the housing 200 in the closed position and exposes the container receptacle 320 in the open position, but can additionally or alternatively enclose the container platform 300, blade assembly 400 (e.g., including the blade platform 420 and set of blades 440), blade actuator 800, or any other suitable component within the housing 200 in the closed position and expose the component in the open position.

The door 220 is preferably actuatably mounted to the housing 200, but can alternatively be statically mounted to the housing 200. The door 220 can be slidably engaged to the housing 200, and includes a handle or pull that enables a user to actuate the door 220. In this variation, the housing 200 can form a lower portion of the system body, while the door 220 forms an upper portion of the system body. The upper and lower portions of the system body are preferably coupled along a coupling axis (e.g., substantially aligned with a gravity vector when the base is rested on a support surface), wherein the upper portion (the door 220) slides along a plane perpendicular the coupling axis. The upper portion can slide along a plane substantially parallel the housing base, substantially parallel the container platform 300 in the loading position 302, or slide along any other suitable plane. The interface between the upper and lower portions can include tracks, grooves, magnets, or any other suitable sliding interface. The front face of the upper portion is preferably retracted from the front face of the lower portion in the open position, and preferably aligned with the front face of the lower portion in the closed position. However, the door 220 can be part of a tray that slides in and out of the housing 200, be a door 220 that slides perpendicular to the longitudinal axis of the housing 200, or be slidably coupled to the housing 200 in any other suitable manner. The door can be manually actuated, automatically actuated (e.g., automatically open), and/or be actuated in any other suitable manner. The door actuation mechanism can be active (e.g., driven by a motor), passive, or be actuated in any other suitable manner. In one variation, the door can additionally include a return mechanism (e.g., a spring, magnet, etc.) that biases the door in the open position. However, the door can include any other suitable component.

Alternatively, the door 220 can be pivotally connected to the housing 200. In one variation, a longitudinal edge of the door 220 can be pivotally (rotatably) connected to the housing 200, wherein the door 220 can be arranged along a sidewall of the housing 200. In a second variation, an edge of the door 220 can be pivotally connected to a top of the housing 200. However, the door 220 can be otherwise connected to the housing 200. The housing 200 can additionally or alternatively include any other suitable component.

The housing 200 can additionally include a set of sensors or switches configured to determine the instantaneous door position. Sensors that can be used include tilt sensors, optical sensors, accelerometers, magnetometers, Hall effect sensors, or any other suitable sensor. Switches include contact switches, limit switches, magnetic switches, or include any other suitable type of switch. The sensors or switches are preferably mounted to the door 220 and/or housing 200 (e.g., to the pivot point, to the casing, to the threshold, etc.), but can alternatively be mounted at any other suitable position. The sensors or switches are preferably connected to the processor 180, but can alternatively be connected (e.g., wirelessly or through a wired connection) to any other suitable control system. The door can additionally include soundproofing (e.g., foam), thermal insulation, electrical insulation, or include any other suitable component.

5. Container Platform

The container platform 300 (vessel platform) of the automated food processing system functions to receive and retain the container 120. More preferably, the container platform 300 functions to locate the container 120 laterally, longitudinally, and vertically (in a substantially upright position) within the automated food processing system until the blade platform 420 is closed over the container platform 300 upon initiation of a blend cycle, but can alternatively orient the container 120 in any other suitable orientation. The container platform 300 preferably defines a container receptacle 320 that receives and retains the container 120, but can alternatively receive and retain the container 120 in any other suitable manner. The container platform 300 can additionally cooperatively seal the container 120 against the blade assembly 400, place the container 120 in the processing position 304 (e.g., blending position), facilitate container content heating, retain the container orientation and/or position, or otherwise manipulate the container 120 or contents therein. The container platform 300 is preferably arranged proximal the housing 200 opening (e.g., proximal the door 220), but can alternatively be arranged within the door 220 or be arranged in any other suitable location. The container platform 300 is preferably arranged parallel a housing base and/or perpendicular a gravity vector in the loading position 302, but can alternatively be arranged in any other suitable configuration.

In one example, the container platform 300 can be arranged proximal a front of the automated food processing system in the loading position 302, such as behind or underneath a door 220 of the automated food processing system. A user can retrieve a prepackaged container 120 containing food solids sealed therein by a lid, remove the lid from the container 120, and load the container 120 into the receiver (e.g., through bore) in the container platform 300 currently in the loading position 302. The container can be received through an opening proximal the front of the automated food processing system (e.g., the door opening), at an exposed container receptacle, or otherwise received. Furthermore, when the container platform 300 is set in the loading position 302 in preparation for receiving a new container 120 containing solid foods for blending in a subsequent blend cycle, the blade platform 420 can be in the second position over the blade actuator 800 and the blade shield 900 can be set in the cleaning position over the blender blade to physically shield a user—reaching into the automated food processing system to load a container 120 into the container platform 300—from the blender blade.

The container platform 300 can be substantially planar (e.g., within a margin of error), curved (e.g., convex or concave toward the blade platform 420), or have any suitable configuration. The container platform 300 is preferably larger than the container opening, but can alternatively be smaller than the container opening or have any suitable set of dimensions. The container platform 300 preferably defines a receiving face (e.g., a broad face) and a set of edges bounding the receiving face. The container platform 300 can be thermally conductive (e.g., made of metal), thermally insulative (e.g., made of plastic), or have any other suitable material property.

The container platform 300 can additionally define a container receptacle 320. The container receptacle 320 can be a through-bore configured to receive all or a portion of the container 120 therethrough, a recess configured to receive a portion of the container 120 (e.g., the container base or portion of the container sidewall), or have any other suitable geometry for receiving and supporting a container 120 installed therein. The container receptacle 320 preferably additionally includes a set of keying features complimentary to that of the container 120, but can alternatively include any other set of features. In one example, the container receptacle 320 can be a through-bore, and can additionally include a chamfer or fillet about the bore edge that couples to the polygonal container opening exterior cross-section, wherein the chamfer or fillet further locates the container 120 within the container receptacle 320.

The container receptacle 320 can additionally or alternatively include a retention feature that functions to retain the container position and/or orientation. In one variation, the retention feature can be an aperture smaller than the container lip or opening cross section, such that gravity retains the container 120 within the container receptacle 320 in the loading position 302. In this variation, the blade platform 420 can retain the container 120 within the container receptacle 320 in the processing position 304. In a second variation, the retention feature can be a mechanical feature, such as a slot or clip. In a third variation, the retention feature includes a set of spring-loaded plates biased toward the receiving face that function to seal the container receptacle in a first position and retain an inserted container in a second position. However, the retention feature can be a magnetic element attracted to a ferrous component in the container 120, an adhesive, a set of hooks or loops, or be any other suitable retention feature.

The container platform 300 can be operable between a loading position 302 and a processing position 304, wherein the processing position 304 is distinct from the loading position 302. The loading and processing positions are preferably different angular positions, but can alternatively be different horizontal positions, different vertical positions, or actuate along any other suitable axis. Alternatively, the container platform 300 can be statically coupled to the housing 200. The container platform 300 preferably receives the container 120 in the loading position 302, and retains the container 120 proximal the set of blades 440 or blade actuator 800 in the processing position 304, but can perform any other suitable functionality in the loading and/or processing positions. The container platform 300 can pivot between the loading and processing position 304, but can alternatively slide between the loading and processing position 304 (e.g., laterally, vertically, etc.), or otherwise actuate between the loading and processing positions. The container platform 300 can pivot about the length of a container platform side (e.g., be hinged along the respective corner or edge), pivot about an axis normal to the container platform side face (e.g., about a container platform edge or along a portion of the container platform side), or pivot in any other suitable direction. The container platform 300 is preferably coupled to the housing 200, but can alternatively be coupled to any other suitable portion of the system 100.

Figure 11:
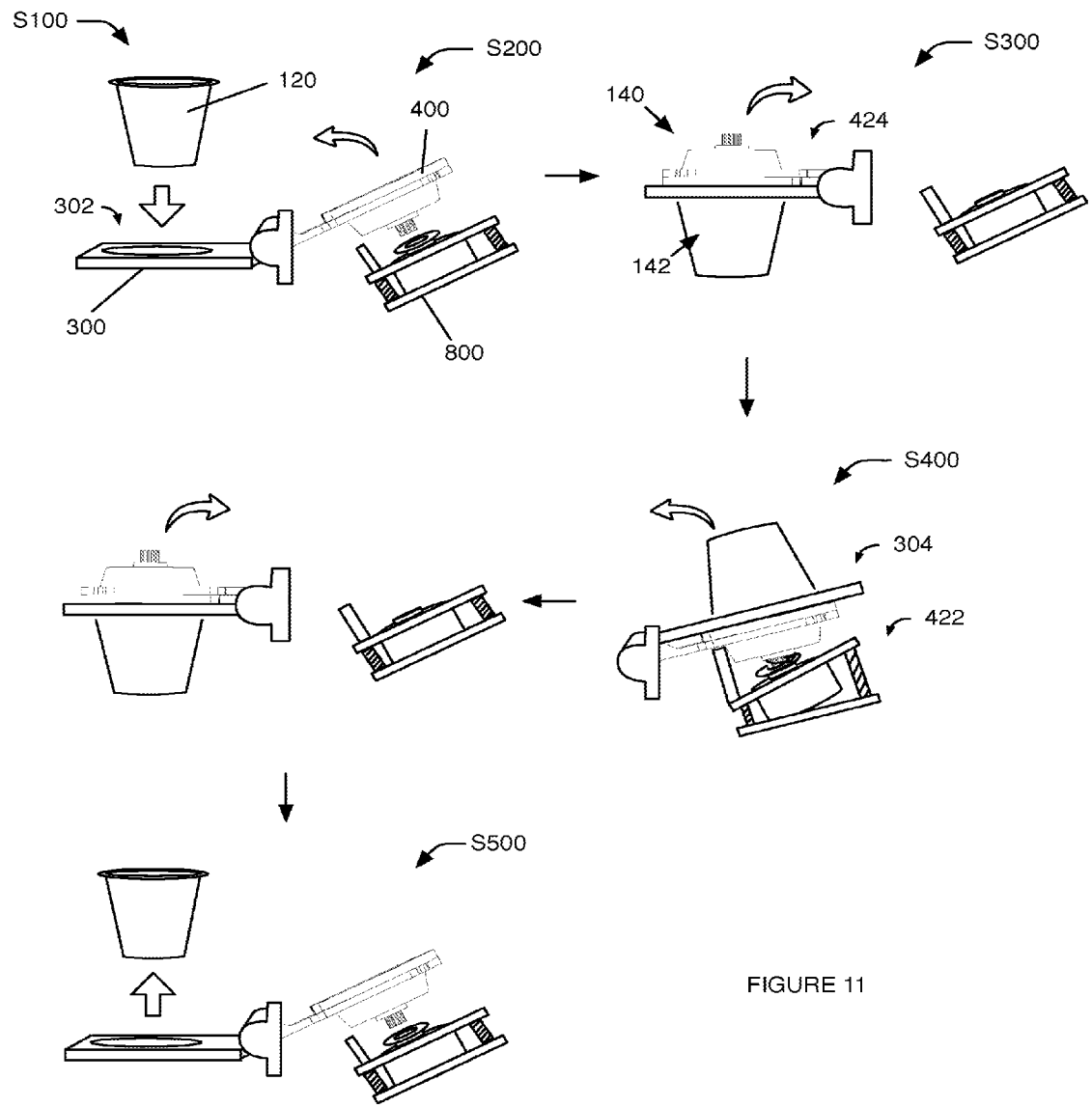
FIG. 11 is a schematic representation of the method of system operation.

As shown in FIGS. 4-7, in the loading position 302, the container platform 300 can be substantially parallel the housing base, perpendicular the housing base, be at an angle between parallel and perpendicular to the housing base, or be in any other suitable orientation. A second container platform edge opposing the pivoting edge is preferably distal the blade actuator 800 in the loading position 302 (e.g., such that a normal vector of the receiving face is at a non-zero angle to the rotational axis of the blade actuator 800, but can alternatively be at any other suitable angle), but can alternatively be proximal the blade actuator 800 or be arranged in any other suitable position. As shown in FIG. 11, in the processing position 304, the container platform 300 can be at an obtuse angle relative to the housing base, substantially parallel the housing base, perpendicular the housing base, be at an angle between parallel and perpendicular to the housing base, or be in any other suitable orientation. The second container platform edge opposing the pivoting edge is preferably proximal the blade actuator 800 in the processing position 304 (e.g., such that a normal vector of the receiving face is substantially parallel to the rotational axis of the blade actuator 800, but can alternatively be at any other suitable angle), but can alternatively be distal the blade actuator 800 or be arranged in any other suitable position. However, the container platform 300 can be otherwise retained relative to the housing 200, and be operable between any other suitable set of positions.

In one example, the container platform 300 is hinged along a trailing edge to the housing 200. The container platform 300 is pivotable about the trailing edge between a loading position 302 and a processing position 304, wherein the receiving face directed upward in the loading position 302 (e.g., with a normal vector opposing a gravity vector) and directed toward the blade actuator 800 in the processing position 304 (e.g., with the normal vector directed toward the blade actuator 800). The container 120 can be a frustoconical container that tapers towards the container base and defines a rim about the circumference of its open end, the receiving face can define a bore of an internal diameter greater than an outer diameter of the container open end and less than the maximum outer diameter of the rim of the container 120, such that the receiving face supports the container 120 from its rim. The container platform 300 can also define a protrusion extending from the receiving face and extending around the through-bore to elevate the rim of a container 120, loaded into the container receptacle 320, above the receiving face such that the rim of the container 120 contacts and seals against a seal arranged in a base of a recess of the blade platform 420 when the blade platform 420 is locked to the container platform 300, as described below. However, the receiving face of the container platform 300 can define any other suitable geometry for receiving a container 120 of any other suitable geometry.

The system can additionally include a lifting mechanism 340 that functions to bias a retained container 120 out of the system 100. The lifting mechanism 340 preferably biases the container 120 along a vector normal to the container receptacle 320, but can alternatively bias the container 120 along any other suitable vector. The lifting mechanism 340 (e.g., elevator) can be active (e.g., driven by a motor) or passive. Examples of the passive lifting mechanism 340 include a spring, magnet, or pendulum biasing a lifting platform upward (e.g., toward the container receptacle 320), wherein the passive lifting mechanism 340 can be retained in a receiving position (e.g., such that the mechanism does not bias the container 120 upward) by a switch, latch, or other mechanism. The lifting mechanism 340 is preferably operated in response to completion of the processing cycle, but can alternatively be operated at any other suitable time.

The container platform 300 can additionally include a set of container platform sensors or switches that function to detect the presence of a container 120 within the container receptacle 320. The sensor and/or switch output can additionally function to identify the type of container 120 within the container receptacle 320. The sensor can be arranged on the container platform, the lifting mechanism, or any other suitable portion of the system body. Sensors that can be used include tilt sensors, optical sensors (e.g., a laser tripwire), accelerometers, magnetometer, Hall effect sensors, pressure sensors, force sensors (e.g., piezoelectric, strain gauge, etc.), or any other suitable sensor. Switches include contact switches, limit switches, magnetic switches, or include any other suitable type of switch. The sensors or switches are preferably mounted to the container receptacle 320 (e.g., within the container receptacle 320, at the container receptacle 320 opening, etc.), more preferably the lifting mechanism 340 but alternatively the container receptacle 320 opening or any other suitable portion of the container receptacle 320. However, the sensors or switches can be mounted to any other suitable portion of the container platform 300. The sensors or switches are preferably connected to the processor 180, but can alternatively be connected (e.g., wirelessly or through a wired connection) to any other suitable control system.

6. Blade Assembly

Figure 9:
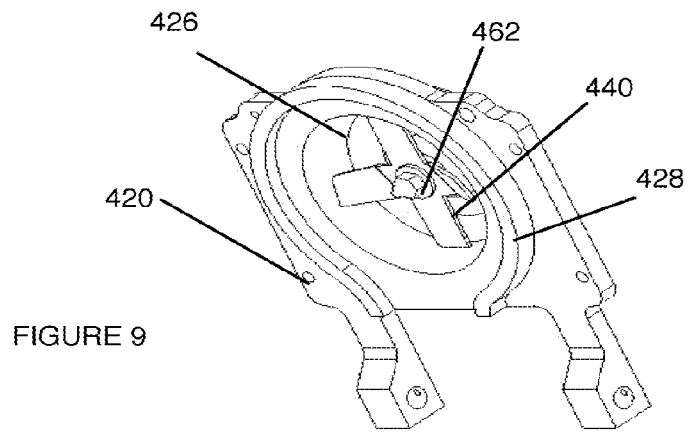
FIG. 9 is an isometric view of a variation of the blade assembly with a blade recess.

The blade assembly 400 of the automated food processing system functions to retain the blades, and can additionally function to engage with the container 120 and/or container platform 300, facilitate desired flow within the processing lumen cooperatively formed between the blade assembly 400 and the container 120 (e.g., turbulent flow), or perform any other suitable functionality. As shown in FIG. 9, the blade assembly 400 includes a blade platform 420 and a set of blades 440, and can additionally include a drive shaft connected to the blades, sensors, a locking mechanism 480, or any other suitable component. The blade assembly and blade actuator preferably cooperatively forms a split drive system in which the blade assembly is selectively couplable to the blade actuator, but can alternatively be substantially permanently coupled (e.g., wherein the blade actuator moves with the blade assembly) or have any other suitable configuration.

Figure 12:
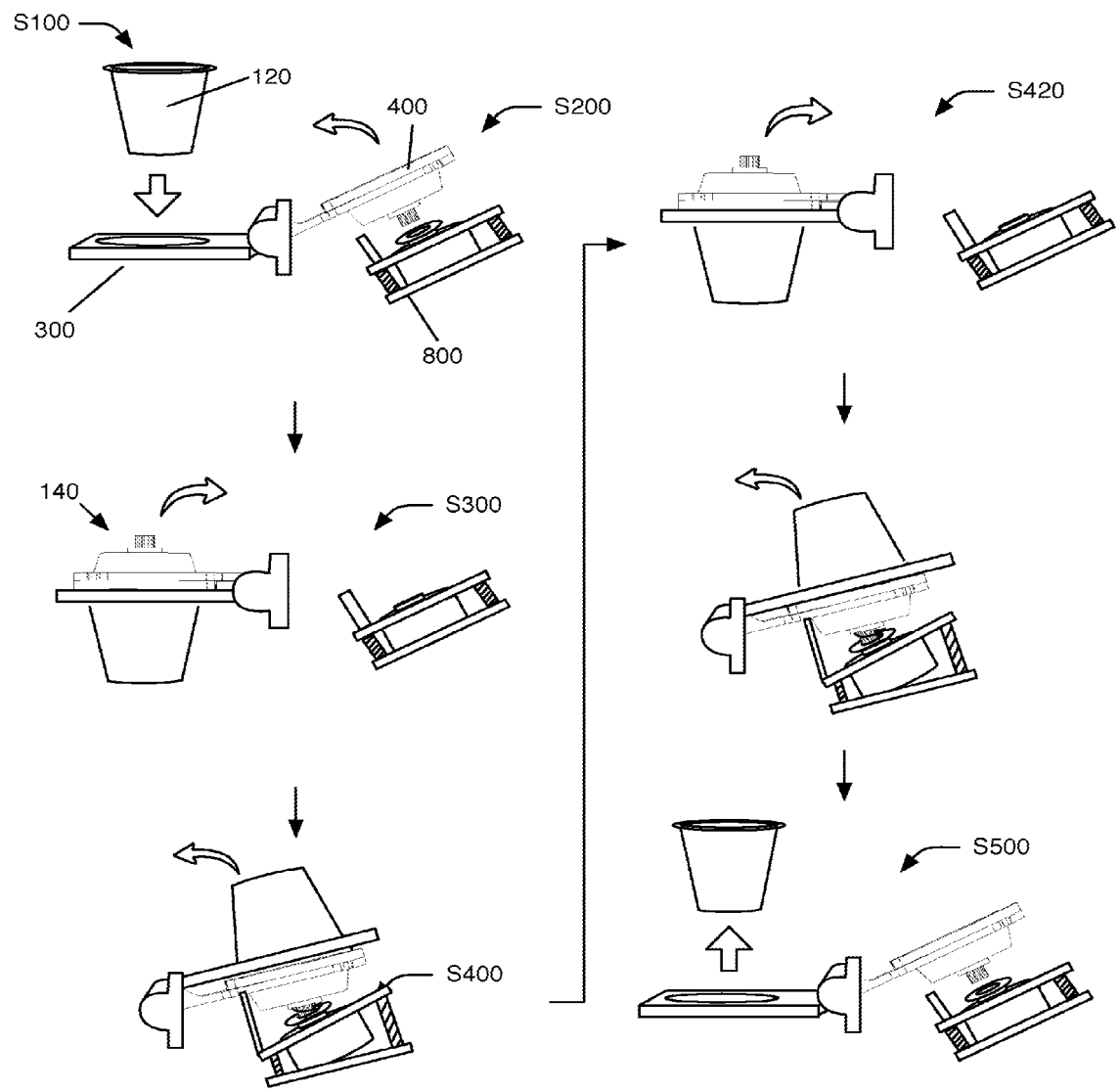
FIG. 12 is a schematic representation of the method of system operation, including processing unit agitation.
Figure 13:
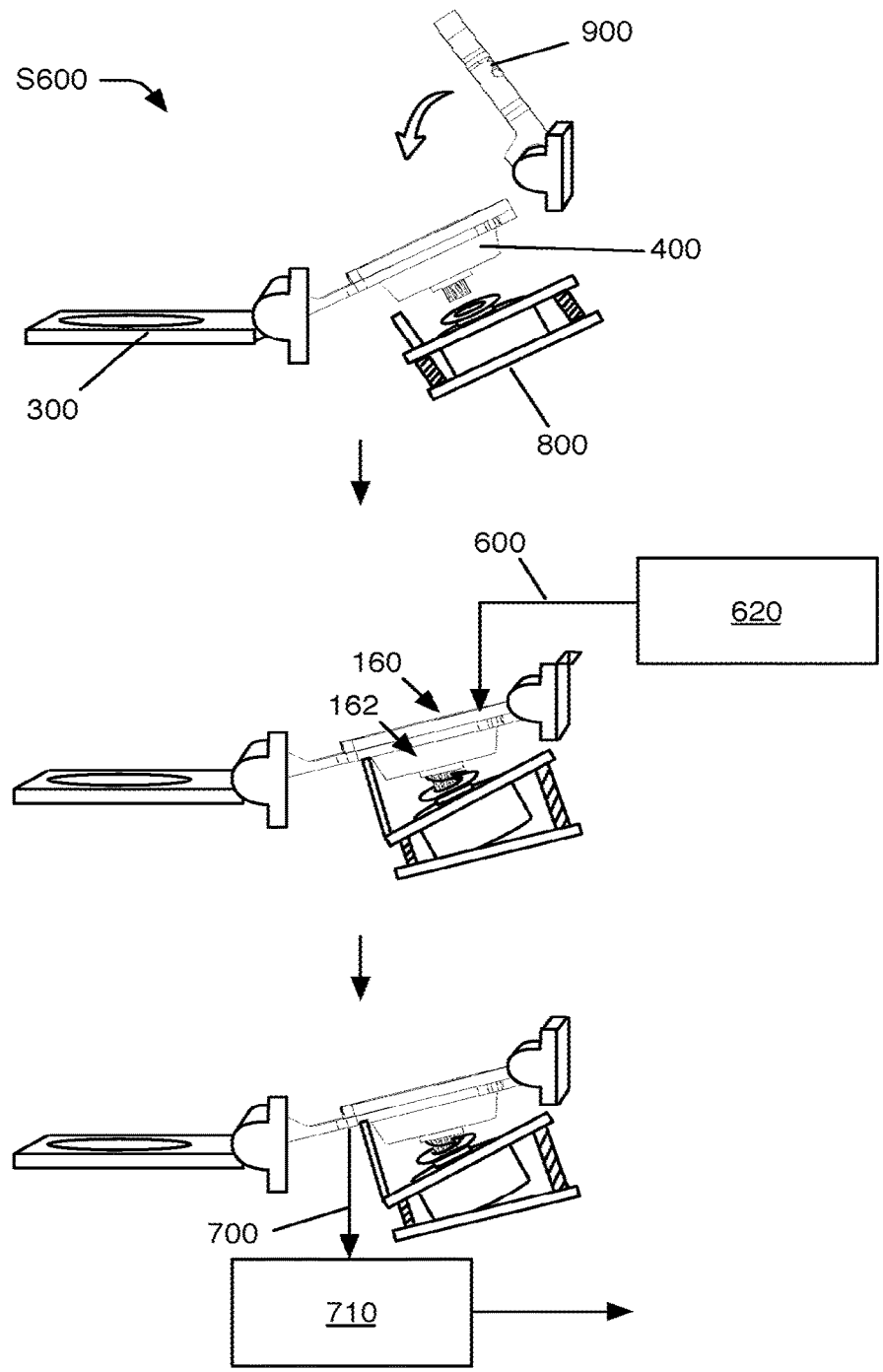
FIG. 13 is a schematic representation of the cleaning the blade assembly.

The blade assembly 400 preferably actuates relative to the blade actuator 800, the container platform 300, and/or the housing 200, as shown in FIGS. 11, 12, and 13, but can alternatively remain substantially static. The blade assembly 400 is preferably pivotable between an engaged position 422 and a disengaged position 424, but can alternatively slide between the first and the blade platform 420 or actuate in any other suitable manner. The engaged position 422 is preferably complimentary (e.g., substantially similar to) the processing position 304 of the container platform 300, while the disengaged position 424 is preferably complimentary to the loading position 302 of the container platform 300, the blade assembly 400 can be operable between any other suitable set of positions. The blade assembly 400 preferably actuates about a portion of the blade platform 420, but can alternatively actuate about any other suitable component. The blade assembly 400 is preferably arranged over and adjacent the container platform 300 in the disengaged position 424 and operatively mates the blades to the blade actuator 800 in the engaged position 422, but can alternatively operate in any other suitable manner.

In operation, one variation of the blade assembly 400: latches to the container platform 300 in the disengaged position 424; moves to the engaged position 422 (with the container platform 300, such that the container platform 300 is in the processing position 304) to facilitate container content blending; returns to the disengaged position 424 with the container platform 300 (and the container 120, now with blended contents) to the loading position 302, such that the container 120 is in the loading position 302; then moves back to the engaged position 422 without the container platform 300 to reveal the container 120 for removal from the automated food processing system by a user. However, the blade assembly 400 can operate in any other suitable manner.

In a specific example, the blade assembly 400 includes a set of bearings (e.g., two tapered bearings) that are set in the bore of the blade platform 420, a driveshaft 460 extending through the blade platform 420 and supported between the set of bearings, a coupler fixed to back end of the driveshaft 460 and configured to engage an output shaft of the blade actuator 800 (e.g., blade actuator interface 820), a rotor defining a set of sharpened blades (e.g., sharpened stainless steel blades) extending from the driveshaft 460 over a container 120-facing surface of the blade platform 420, and a seal 428 sealing the driveshaft 460 to the container 120-facing surface of the blade platform 420. The rotor with sharpened blades can be undersized for the open end of the container 120 such that the blades clear the internal walls of container 120 as the blade platform 420 is rotated into the first position adjacent the container platform 300, the blades thus passing fully into the container 120 along an arcuate path. However, the blades can be of any other form or type and can be mounted in any other way to the blade platform 420.

6.1 Blade Platform

The blade platform 420 functions to support the set of blades 440, and can additionally function to support and/or retain the driveshaft 460. The blade platform 420 can additionally function to cooperatively form a processing chamber 142 with the container 120 and/or container platform 300, and can facilitate formation of desired flow patterns within the processing chamber 142. In one variation, the blade platform 420 (e.g., a planar or curved surface)

and the container platform 300 cooperatively retains a container lip therebetween, wherein the processing chamber 142 is formed between the blade platform 420 and the container 120 lumen. However, processing chamber 142 can be formed by the blade platform 420 sealing against the container platform 300 or be otherwise formed.

The blade platform 420 preferably defines a processing face (e.g., a broad face) bounded by a set of edges and sides. The processing face is preferably arranged proximal the container platform 300, but can alternatively be arranged distal the container platform 300 or arranged in any other suitable orientation. The blade platform 420 can additionally define a blade recess 426 (e.g., recessed blade chamber) that functions to entirely or partially surround the set of blades 440, a driveshaft 460 aperture, or any other suitable feature. Alternatively, the blade platform 420 can be substantially flat, continuous, or have any other suitable configuration. The blade platform 420 can additionally include a seal 428 that functions to seal against the container 120, container platform 300, or container receptacle 320, or include any other suitable component.

The blade platform 420 of the blade assembly 400 is preferably actuatable relative to the housing 200, wherein blade platform 420 actuation actuates the blade assembly 400, but can alternatively be statically coupled to the housing 200 or otherwise coupled to the housing 200. In one variation, the blade platform 420 is pivotable between the engaged position 422 and the disengaged position 424, wherein the engaged position 422 is distinct from the disengaged position 424. The engaged and disengaged positions are preferably different angular positions, but can alternatively be different horizontal positions, different vertical positions, or actuate along any other suitable axis. In this variation, the blade platform 420 can be arranged over and adjacent the container platform 300 (in the loading position 302) in the disengaged position 424, and can be engaged with or be proximal to the blade actuator 800 in the engaged position 422. The blade platform 420 can pivot about the length of a blade platform side (e.g., be hinged along the respective corner or edge), pivot about an axis normal to the blade platform side face (e.g., about a blade platform edge or along a portion of the blade platform side), or pivot in any other suitable direction. However, the blade platform 420 can slide or otherwise actuate between the engaged and disengaged positions. The blade platform pivot axis can be parallel to the container platform pivot axis, be shared with (i.e., coincident) the container platform pivot axis, be at a non-zero angle to the container platform pivot axis, or be otherwise related to the container platform pivot axis, The blade platform 420 is preferably coupled to the housing 200, but can alternatively be coupled to any other suitable portion of the system 100.

In the disengaged position 424, the blade platform 420 can be substantially parallel the housing base, perpendicular the housing base, be at an angle between parallel and perpendicular to the housing base, be aligned with the container platform 300 in the loading position 302, contact the container platform 300 in the loading position 302, or be in any other suitable orientation. A second blade platform edge opposing the pivoting edge or face is preferably distal the blade actuator 800 in the disengaged position 424 (e.g., such that a normal vector of the processing face is at a non-zero angle to the rotational axis of the blade actuator 800, but can alternatively be at any other suitable angle), but can alternatively be proximal the blade actuator 800 or be arranged in any other suitable position. In the engaged position 422, the blade platform 420 can be at an obtuse angle relative to the housing base, substantially parallel the housing base, perpendicular the housing base, be at an angle between parallel and perpendicular to the housing base, contact or be aligned with the container platform 300 in the processing position 304, be arranged proximal the blade actuator 800, or be in any other suitable orientation. The second blade platform edge opposing the pivoting edge or face is preferably proximal the blade actuator 800 in the engaged position 422 (e.g., such that a normal vector of the processing face is substantially parallel to the rotational axis of the blade actuator 800, but can alternatively be at any other suitable angle), but can alternatively be distal the blade actuator 800 or be arranged in any other suitable position. However, the blade platform 420 can be otherwise retained relative to the housing 200, and be operable between any other suitable set of positions. The blade platform 420 can be rigid or flexible. The blade platform 420 can be thermally conductive, thermally insulative, or have any other suitable material property. The blade platform 420 can be made of metal, polymer, rubber, or any other suitable material. The blade platform 420 can be substantially planar, substantially continuous, or define one or more features.

6.1.1 Blade Recess

In one variation as shown in FIGS. 3, 6, 7, and 9, the blade platform 420 defines a blade recess 426 that functions to surround all or a portion of the blades. The set of blades 440 preferably do not extend beyond the opening plane defined by the blade recess 426, but can alternatively extend beyond the recess. This configuration can confer several benefits, including: increasing the volume of foodstuff that can be processed (e.g., by reducing the amount of volume occupied by the blade within the cup while blending); reducing blending stress, thereby enabling higher-speed and/or powered processing, such as blending (e.g., such that whole vegetables and fruits can be blended); and a more uniform blended matter consistency.

The blade recess 426 preferably defines an opening configured to couple to the container 120 and/or container receptacle 320 opening. The blade recess 426 opening can be slightly larger than the container 120 and/or container receptacle 320 opening, slightly smaller than the container 120 and/or container receptacle 320 opening, substantially the same dimensions and/or geometry as the container 120 and/or container receptacle 320 opening, or be otherwise configured. The blade recess 426 is preferably defined in the processing face and is concave, but can alternatively be defined along any other suitable surface and be convex, prismatic, conical, frustroconical, or have any other suitable shape. In one example, the blade recess 426 can include a spherical dome (spherical cap). In a second example, the blade recess 426 can be substantially cylindrical, with rounded edges (e.g., a tapered cylinder with edge blends, a straight cylinder, etc.). In a third example, the blade recess 426 can be conical, with the cone apex proximal the blade platform 420 face opposing the processing face. However, the blade recess 426 can be otherwise configured. The blade platform 420 can conform to the blade recess 426 (e.g., such that the blade platform 420 face opposing the processing face has a profile mirroring the blade recess 426 geometry), or the blade recess 426 can be defined within the thickness of the blade platform 420. However, the blade recess 426 can be otherwise related to the blade platform 420. The blade recess 426 can have a substantially smooth surface, have a textured surface, include grooves or swirls (e.g., in the direction of blending blade rotation, in an opposing direction, etc.), or include any other suitable feature. The features can promote desired flow formation (e.g., direct fluid flow within the processing chamber 142); reduce blending stress on the blade platform 420, blades 440, driveshaft 460, container 120, or container platform 300; facilitate container 120 sealing to the blade platform 420, or perform any other suitable functionality.

6.1.2 Driveshaft Bore

The blade platform 420 can additionally define a driveshaft bore that accepts a driveshaft 460 of the blender assembly therethrough. The driveshaft bore is preferably coaxially arranged with the region of the blade platform 420 configured to engage with the container 120 and/or container receptacle 320 (engagement region), but can alternatively be arranged offset within the engagement region or arranged in any other suitable location. In the variant in which the blade platform 420 defines the blade recess 426, the driveshaft bore is preferably defined at the apex or along the central axis of the blade recess 426, but can alternatively be defined offset from the apex or central axis of the blade recess 426, or be defined in any other suitable position.

The driveshaft bore preferably has a smooth arcuate surface, but can alternatively be splined or include any other suitable feature. In one implementation, the driveshaft bore can include a set of bearings (e.g., two tapered bearings), wherein the driveshaft 460 extends through the blade platform 420 and supported between the set of bearings.

6.1.3 Seal

As shown in FIG. 9, the blade platform 420 can also include a seal 428 that—when the blade platform 420 is moved into the first position and is locked to the container platform 300—engages the container 120 (e.g., the container 120 rim, container opening, container edges, etc.) and/or container receptacle 320 to prevent foodstuff egress from the container 120 while the foodstuff is being processed (e.g., blended). In one example, the seal can prevent foodstuff within the container 120 from leaking out from between the container 120 rim and the blade platform 420 when the container 120 is (substantially) inverted and its contents are being blended during a blend cycle. The seal can additionally engage with the blade shield 900 to cooperatively form a wash chamber therebetween, or engage with any other suitable component.

The seal 428 can extend along the engagement region or merely trace the perimeter of the engagement region. In one variation, the seal can define a circular recess slightly oversized in interior diameter for the circular rim of the container 120, wherein the circular recess receives the rim of the container 120 such that a base of the recess seals against the rim of the container 120 when the blade platform 420 is locked to the container platform 300. Alternatively, when the blade platform 420 defines a blade recess 426, the seal can be arranged within the blade recess 426 or along the edge of the blade recess 426 to seal against the rim of a container 120. However, the seal can have any other suitable geometry or set of features. The seal can be made of elastomeric material (e.g., a polymer), gel, metal, rigid plastic, or be made of any other suitable material. For example, the seal can including a food-safe o-ring sized to match the diameter of the rim of standard-sized container 120. The seal can additionally function to define all or a portion of the egress manifold, the fluid dispenser, or any other suitable element.

6.2 Blade Set

The set of blades 440 of the blade assembly 400 function to process the foodstuff within the processing chamber 142, and/or generate turbulent flow within the processing chamber 142 and/or cleaning chamber 162 (e.g., cooperatively formed by the blade platform 420 and the blade shield 900). The set of blades 440 is preferably rotatably mounted to the blade platform 420. More preferably, the set of blades 440 is statically mounted to a driveshaft 460, wherein the driveshaft 460 rotates relative to the blade platform 420. However, the set of blades 440 can be directly mounted to the blade platform 420, rotate relative to each other, or be otherwise configured.

The set of blades 440 can include one or more blades. Multiple blades can have the same geometry, or have different geometries. The blades can taper toward a blade tip, curve toward a blade tip, have a bent blade tip, taper toward a leading edge, twist about a longitudinal axis, be flat, be triangular, rectangular, or have any other suitable geometry. The blades can be arranged offset along the driveshaft 460, be arranged in-line, or have any other suitable relative relationship. The blades can be arranged with the tips extending outward from the blade platform 420 (e.g., distal the blade platform 420), but can alternatively be arranged with the tips extending inward toward the blade platform 420 or be arranged in any other suitable orientation.

6.3 Driveshaft

The driveshaft 460 of the blade assembly 400 functions to operatively connect the blades to the blade actuator 800. The driveshaft 460 is preferably removably couplable to the blade actuator 800, such that the driveshaft 460 is disconnected from the blade actuator 800 when the blade assembly 400 is in the disengaged position 424, and drivably connected to the blade actuator 800 when the blade assembly 400 is in the engaged position 422. Alternatively, the driveshaft 460 can be permanently coupled (e.g., mounted, formed as a singular piece) to the blade assembly 400, the blade actuator, the blade platform, the container platform, or be otherwise coupled to any other suitable system component.

The driveshaft 460 preferably rotatably mounts the set of blades 440 to the blade platform 420, but can alternatively statically connect the blades to the blade platform 420 or otherwise relate the blades with the blade platform 420. The driveshaft 460 preferably extends through the driveshaft bore in the blade platform 420, but can alternatively terminate at the blade platform 420 (e.g., wherein the driveshaft 460 only extends from the processing face of the blade platform 420 outward) or be otherwise configured. The driveshaft 460 preferably extends perpendicular the blade platform 420 (e.g., normal to the blade platform 420), but can alternatively extend at any other suitable angle. The driveshaft 460 preferably freely rotates relative to the blade platform 420 about the driveshaft longitudinal axis (rotational axis), but can alternatively be statically coupled to the blade platform 420. The driveshaft 460 can remain axially static relative to the blade platform 420, freely actuate along an axis substantially parallel the rotational axis relative to the blade platform 420, actuate within a limited range along the rotational axis, or be otherwise axially coupled to the blade platform 420.

The driveshaft 460 preferably defines a blade end 462 and an actuator engagement end 464 (e.g., motor engagement end) opposing the blade end 462. The blade end 462 mounts the set of blades 440, and is preferably arranged proximal the processing face and/or container platform 300 (e.g., arranged within the blade recess 426), but can alternatively be arranged elsewhere. The actuator engagement end 464 functions to selectively engage with the blade actuator 800, and is preferably arranged distal the processing face and/or container platform 300 (e.g., arranged proximal the blade actuator 800), but can alternatively be arranged elsewhere. In particular, the actuator engagement end 464 functions to engage the blade actuator 800 in the engaged position 422

(e.g., such that the driveshaft 460 can transfer processing, or rotational, force from the blade actuator 800 to the blades on the blade end 462), and is disengaged from the blade actuator 800 in the disengaged position 424. However, the driveshaft 460 can be otherwise configured. The actuator engagement mechanism can be a mechanical engagement mechanism, an electromagnetic engagement mechanism (e.g., magnets, electrostatic attraction, etc.), an adhesive, or include any suitable coupling mechanism. The driveshaft can pivot about an external pivot point to engage with the actuator, traverse linearly to engage with the actuator, rotate about the longitudinal axis to engage with the actuator, or otherwise actuate to engage with the actuator.

The actuator engagement end 464 can engage with the blade actuator 800 along an interior surface, along an exterior surface, along a broad face of the end (e.g., perpendicular a driveshaft 460 longitudinal axis), or engage with the blade actuator 800 along any other suitable surface. The engagement surface is preferably splined, but can alternatively include threads, be smooth, or include any other suitable set of features.

The actuator engagement end 464 is preferably profiled. Because the blade actuator 800 and driveshaft 460 engage along an arcuate direction of travel (arcuate engagement path), unlike conventional systems, which engage in an axial direction, the motor and blade can suffer from misalignment issues, which can lead to interface wear or system failure.

Figure 8A:
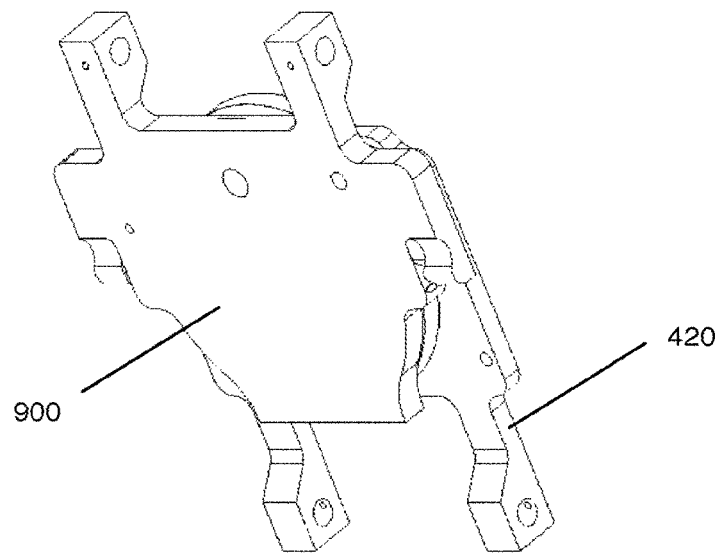
FIGS. 8A and 8B are an isometric view and side view of a blade shield coupled to a blade assembly.
Figure 8B:
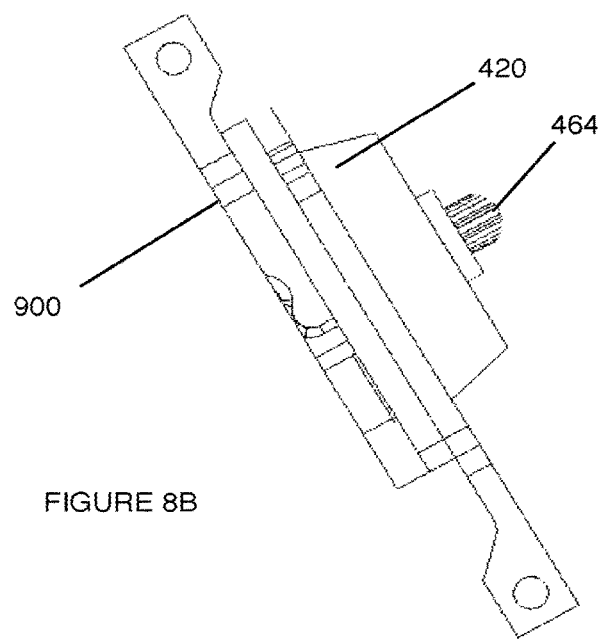

In one variation, as shown in FIG. 8B, the blade assembly 400 includes a driveshaft 460 with a convex, rounded surface that interfaces with the blade actuator 800. The radius of the rounded actuator engagement end 464 is preferably determined based on the radius of the arcuate travel path (e.g., be calculated from the path radius or substantially match the path radius), but can alternatively have any other suitable radius. The rounded actuator engagement end 464 can include a dome (e.g., a spherical cap), a cylinder with rounded edges, a cylinder with filleted edges, or have any other suitable profile. the actuator engagement end 464 can be prismatic with sharp, rounded, or filleted edges, or have any other suitable shape.

Figure 4:
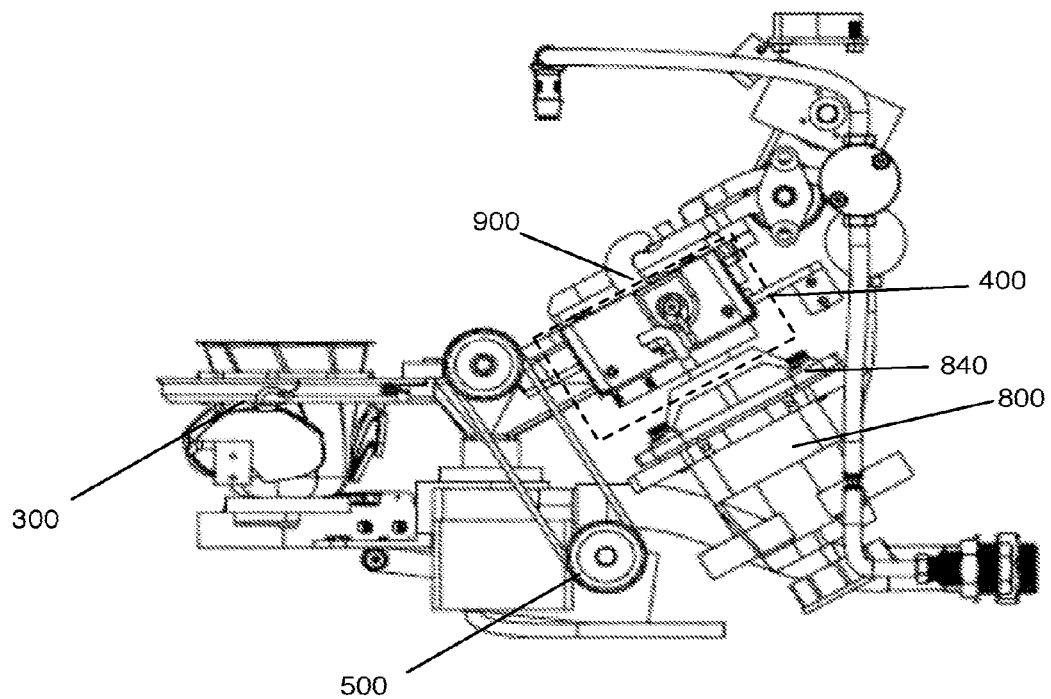
FIG. 4 is a profile view of an example of the system components.

Alternatively and/or additionally, as shown in FIGS. 4, 11, and 12, the misalignment between the blade actuator 800 and driveshaft 460 can be accommodated by a compliant interface 840. The compliant interface 840 can be arranged at the blade actuator 800 (e.g., such that the blade actuator 800 can move relative to the housing 200 and blade assembly 400), be arranged at the blade assembly 400 (e.g., such that the pivot point includes the compliant interface 840), and/or be assembled to any other suitable component. The compliant interface 840 can include a set of springs (e.g., one or more) biasing the coupled component away from or toward the housing 200, a set of magnets (e.g., one or more) biasing the coupled component away from or toward the housing 200, a set of dampers, foam, a motor actively changing the angle of the component relative to the housing 200 (e.g., the same motor as the blade actuator 800, blade platform 420 actuator, and/or container platform actuator, or be a separate motor), or be any other suitable interface capable of adjusting the angle of the component relative to the housing 200. The compliant interface 840 can be mounted to the housing 200 and the component, or be mounted to any other suitable set of mounting points.

In one example, the blade actuator platform is spring-loaded, such that it can actuate in one or more directions. In this example, the blade actuator platform includes one or more springs biasing the blade actuator 800 toward the driveshaft 460. Blade assembly 400 compression against the blade actuator platform can adjust the angle of the blade actuator platform relative to the driveshaft 460, such that the longitudinal axis of the driveshaft 460 is substantially aligned with the longitudinal axis of the motor interface. The mount can include two springs located along the mount edge proximal the base, one spring centered along the mount edge proximal the base, or any suitable number of springs arranged in any configuration. The blade actuator platform can additionally include an extension that protrudes beyond the motor interface, such that the blade platform 420 contacts and applies a depression force to the extension, instead of prior to contact force application to the motor interface. However, the blade platform 420 can be mounted on springs, or any other suitable compliant interface 840 can be used.

6.4 Blade Assembly Sensors

The blade assembly 400 can additionally include a set of sensors that function to report the operation parameter values of the blade assembly 400. More preferably the sensors are configured to measure the operation parameter values of the processing chamber 142 and/or cleaning chamber 162 (e.g., wherein the sensors are connected to or arranged proximal the processing face of the blade platform 420), but can alternatively measure the tilt or any other suitable operation parameter of the blade assembly 400. The sensors can include flow sensors (e.g., configured to measure the flow rate within the processing chamber 142 or cleaning chamber 162), temperature sensors, pressure sensors, cameras, optical sensors, orientation sensors (e.g., accelerometer, etc.), rotary sensors, or include any other suitable sensor.

6.5 Locking Mechanism

The locking mechanism 480 of the blade assembly 400 transiently locks the blade platform 420 to the container platform 300. Locking the blade platform to the container platform can seal the blade platform 420 against an adjacent lip of the container 120 in the first position. Generally, the locking mechanism 480 functions to transiently and selectively lock the container platform 300 to the blade platform 420.

As shown in FIG. 7, the locking mechanism 480 can be coupled to the blade platform 420 and engage a corresponding feature (e.g., a bolt, cutout, hook, etc.) arranged on the container platform 300 to lock the blade platform 420 to the container platform 300 during a blend cycle and/or bias the blade platform 420 against the container platform 300. In particular, the locking mechanism 480 can engage the feature on the container platform 300 to lock the blade platform 420 to the container platform 300 as the blade platform 420, container 120, and container platform 300 are pivoted—as a unit—into the second position, the blender blade is spun to blend the contents of the container 120, and as the blade platform 420, container 120, and container platform 300 are pivoted—as a unit—back into the first position before separation of the blade platform 420 from the container platform 300 to enable removal of the container 120—and its blended contents—from the automated food processing system. The locking mechanism 480 can also engage a similar feature on the blade shield 900 during a clean cycle. For example, the locking mechanism 480 can be actuated once the blade shield 900 reaches the clean position to lock the blade shield 900 to the blade platform 420, thereby sealing the blade shield 900 to the blade platform 420 as cleaning fluid is injected toward the blender blade and the blender blade spun during the clean cycle. However, the locking mechanism 480 can be coupled to any other suitable component.

In one implementation, the locking mechanism 480 includes an electromechanical pull latch operable between an unlatched position and a latched position. In this implementation, the locking mechanism 480 includes a hooked latch that, when actuated from the unlatched position into the latched position, rotates toward an adjacent latching feature (arranged on the container platform 300 or on the blade shield 900) and then draws linearly back into a housing 200 of the locking mechanism 480 to pull the latching feature inward toward the housing 200, thereby drawing adjacent faces of the blade platform 420 and the container platform 300 together during a blend cycle and drawing adjacent faces of the blade platform 420 and the blade shield 900 together during a clean cycle. Subsequently, when the locking mechanism 480 actuated from the latched position back into the unlatched position, the hooked latch moves linearly away from housing 200 and the rotates away from the adjacent latching feature, the hooked latch thus clearing the latching feature and enabling the blade platform 420 to separate from the container platform 300 during a blend cycle and enabling the blade platform 420 to separate from the blade shield 900 together during a clean cycle. As in this implementation, the automated food processing system can include any number of locking mechanisms 480 coupled to the blade platform 420 and engaging corresponding features (e.g., bolts) on the container platform 300 and/or the blade shield 900. Alternatively, one or more locking mechanisms 480 can be arranged on the container platform 300 and engage corresponding features on the blade platform 420 to lock the container platform 300 to the blade platform 420, and one or more locking mechanisms 480 can be arranged on the blade shield 900 and engage the same or different features on the blade platform 420 to lock the blade shield 900 to the blade platform 420. However, the locking mechanism 480 can include a magnetic locking mechanism 480, an adhesive locking mechanism 480, or include any other suitable locking mechanism 480.

6.6 Egress Manifold and Trough

As shown in FIGS. 3 and 13, the blade platform 420 can also define an egress manifold 700 (e.g., spout) that functions to fluidly connect the processing chamber 142 with a drain or fluid outlet. The egress manifold 700 can additionally or alternatively function as a pressure equalizer (e.g., vent). The egress manifold 700 can be a vertical recess extending from the blade recess 426 to an edge of the platform, wherein the platform edge is arranged over a trough 710 (or drain) supported in the housing 200. In particular, the egress manifold 700 allows cleaning fluid (wash fluid, rinse water)—injected between the blade platform 420 and the blade shield 900 to clean the blender blade during a clean cycle—to drain from the blade recess 426 in the blade platform 420 downward into the trough 710 after the cleaning cycle.

The egress manifold 700 can be a tube, pipe, hole in the cavity, or have any other suitable configuration, and can be unobstructed, include a valve (e.g., one way or two way valve configured to control fluid flow from the system interior to or from the system exterior), vent, or any other suitable flow regulation mechanism. The egress manifold can be operable between an open position that permits fluid flow therethrough, and a closed position that prevents fluid flow therethrough or prevents flow of selective fluids therethrough. The egress manifold operation can be passively controlled (e.g., by pressure differentials), actively controlled (e.g., by a motor, electromagnetic coupling mechanism, etc.), or otherwise controlled.

The egress manifold 700 can be cooperatively defined by the blade platform 420 and the blade shield 900, entirely defined by the blade platform 420, or be defined in any other suitable manner. In one variation, the egress manifold 700 can be defined along the pivot edge of the blade platform 420. In a second variation, the egress manifold 700 can be defined along the blade shield 900 edge proximal the pivot edge of the blade platform 420. In a third variation, the egress manifold 700 can be defined through the thickness of the blade platform 420 (e.g., perpendicular or at any other suitable angle to the processing face). However, the egress manifold 700 can be arranged in any other suitable configuration. The egress manifold 700 is preferably fluidly connected to the engagement region (e.g., fluidly connected to the blade recess 426), but can alternatively be fluidly isolated from the engagement region and be arranged in any other suitable position.

In one variation, the spout can face the container platform 300 and can be sealed outside of the container 120 and the seal in the blade platform 420 when the blade platform 420 is locked to the container platform 300, and the spout can face substantially upward (e.g., 30° from horizontal) when the blade platform 420 moves to the engaged position 422 after returning the container platform 300 and container 120 with blended contents to the disengaged position 424 prior to initiating a clean cycle. With the blade platform 420 facing upward with the blade platform 420 in the engaged position 422 upon initiating of a clean cycle, the blade shield 900 can move into the clean position in which the perimeter of the clean container 120 substantially seals against the exposed face of the blade platform 420 without substantially obstructing the spout such that cleaning fluid injected toward the blade during the clean cycle drains out of the volume between the blade shield 900 and the blade platform 420 substantially exclusively via the spout.

The automated food processing system can additionally include a trough 710 that collects food waste and waste water from left over from blend and clean cycles executed on the automated food processing system. In one implementation, the trough 710 defines an open end that extends longitudinally within the automated food processing system between a trailing edge of the container platform 300 in the first position adjacent the blade actuator 800: such that cleaning fluid can drain from the spout into the trough 710 below; and such that any blended matter that falls from the receiver of the blade platform 420—as the blade platform 420 moves from the first position back to the second position to reveal the container 120 and its blended contents for removal from the automated food processing system at the end of a blend cycle—falls into the trough 710. The trough 710 can therefore also define a width substantially similar to or greater than a width of the receiver of the blade platform 420 to substantially ensure that any blended matter falling from the blade platform 420—but missing the container 120 as the blade platform 420 moves from the first position to the second position—is captured by the trough 710. The trough 710 can thus collect food waste collected from the blade platform 420 during a blend cycle and wash and rinse fluid collected from the blade platform 420, the blender blade, and the blade shield 900 during a rinse cycle. The trough 710 can further dispense of this waste from the automated food processing system by funneling this waste into a residential or commercial drain in a space in which the automated food processing system is located or installed. For example, the water dispenser can tap into a city water supply, and the trough 710 can tap into a city sewer system, the city water supply and city sewer system both provided in a building or space occupied by the automated food processing system. However, the trough, water dispenser, or any other suitable fluid containing volume can be fluidly connected to any other suitable fluid source or sink. However, the trough 710 can be of any other form arranged in any other way within the automated food processing system and can dispense of food waste and waste water from the automated food processing system in any other suitable way.

7. Platform Actuator

The platform actuator 500 of the automated food processing system is coupled to the blade platform 420, and functions to pivot the blade platform 420 from the engaged position 422 into the disengaged position 424. The platform actuator 500 can additionally pivot the blade platform 420, the container 120, and the container platform 300, locked to the blade platform 420 by the locking mechanism 480, between a first position and a second position (e.g., the disengaged and engaged positions, respectively; the processing and loading positions 302, respectively). Alternatively, a container platform actuator separate from the platform actuator 500 can actuate the container platform 300 between the loading and processing positions 304. Generally, the platform actuator 500 functions to move the blade platform 420 between the engaged position 422 and the disengaged position 424 during a food processing cycle (e.g., blending cycle).

The platform actuator 500 can be a motor, such as an electric motor; a handle (e.g., wherein the platform is manually actuated, or be any other suitable force-generating mechanism. The electric motor can be a DC motor or an AC motor. Examples of the electric motor include a brushed DC motor, an electronic commutator motor, a universal AC-DC motor, an induction motor, a synchronous motor, a doubly fed electric machine, a rotary motor, a linear motor, or be any other suitable motor. The platform actuator 500 can be drivably coupled to the blade platform 420 and/or container platform 300 by a coupling mechanism. The coupling mechanism can be an angular gear drive, bevel drive, belt gear, worm gear, or be any other suitable force transfer mechanism.

In one example of platform actuator operation, at the start of a blend cycle, the blade platform 420 is arranged in the engaged position 422 with the blender assembly engaged with the blade actuator 800, and the container platform 300 is arranged in the loading position 302 (i.e., the first position), thus separated (e.g., angularly offset) from the blade platform 420. Once insertion of a new container 120 into the container platform 300 is detected, once a blend cycle input is entered in the automated food processing system, or once any other suitable blend cycle start event is detected, the platform actuator 500 can apply a torque to the blade platform 420 to rotate the 480 can then latch the blade platform 420 to the container platform 300 with the container blade platform 420 into the first position over the container platform 300. The locking mechanism 120 constrained therebetween. Once the blade and container platforms 300 are latched, the blade actuator 800 can apply a torque to the blade platform 420 in an opposite direction to pivot the container platform 300, the container 120, and the blade assembly 400—in unit—to the second position, in which the driveshaft 460 of the blade assembly 400 engages the blade actuator interface 820 (blade actuator 800 output shaft). In the second position, the container 120 is thus supported in a substantially inverted orientation by the blade and container platforms 300. For example, opposing adjacent faces of the blade and container platforms 300 can be arranged at a 30° angle from horizontal in the second position.

Once the contents of the container 120 are processed (e.g., blended, by actuating the blade actuator 800 coupled to the blade for a period of time), the platform actuator 500 then pivot the container platform 300, the container 120, and the blade assembly 400—in unit—back into the second position, and the locking mechanism 480 unlatches the container platform 300 from the blade assembly 400. With the blade platform 420 now released from the container platform 300, the platform actuator 500 pivots the blade assembly 400 back into the second position adjacent the blade actuator 800, such that the blade assembly 400 is separated from the container platform 300, and such that the container 120 (now with blended contents) is revealed and accessible for retrieval from the automated food processing system by a user.

The platform actuator 500 can therefore include a rotary actuator that is directly or indirectly coupled to the blade platform 420 to move the blade platform 420 (and other latched components of the automated food processing system) between the first and second positions. For example, the blade platform 420 can be locked to an axle, the container platform 300 can be bushed on the axle and therefore pivot about the axle independently of the axle, and the platform actuator 500 can include an electric gearhead motor coupled to the axle by a timing belt that communicates torque from an output shaft of the electric gearhead motor into the axle to pivot the blade platform 420. However, the platform actuator 500 can be any other suitable type of actuator and can selectively rotate and/or translate the blade platform 420, the container platform 300, and/or the container 120 between the first and second positions in any other suitable way.

7.1 Platform Actuator Sensors

The automated food processing system can further include one or more sensors that detect a position of the blade platform 420, the container platform 300, and/or the platform actuator 500 to inform control of the platform actuator 500. The sensors can include switches (e.g., limit switches, tilt switches, pressure switches, toggle switches, etc.), rotary encoders (e.g., conductive encoders, optical encoders, on-axis magnetic encoders, off-axis magnetic encoders, etc.), or include any other suitable sensor. The platform actuator 500 sensors are preferably connected to the platform actuator 500, but can alternatively be connected to the force transfer mechanism, the blade assembly 400 (e.g., the blade platform 420), or be connected to any other suitable component. The platform actuator 500 sensors are preferably connected to the processor 180, but can alternatively be connected (e.g., wirelessly or through a wired connection) to any other suitable control system.

For example, the automated food processing system can include various limits switches, and a processor 180 (or similar controller) arranged within the automated food processing system can trigger the platform actuator 500 to pivot the blade platform 420 from the first position toward the second position until the blade platform 420 contacts a second limit switch, thereby indicating that the blade platform 420 has fully entered the second position. Subsequently, in this example, the controller can trigger the platform actuator 500 to pivot the blade actuator 800 from the second position back toward the first position (as in Block S140) until the blade platform 420 contacts a first limit switch, thereby indicating that the blade platform 420 has fully entered the first position. (The automated food processing system can similarly include a third and a fourth limit switch that indicate the limits of the blade shield 900 between a clean position and a retracted position, and the processor 180 can control an actuator to move the blade shield 900 between these positions accordingly.) Alternatively, the automated food processing system can incorporate one or more optical trip sensors, linear or rotary encoders, a Hall effect sensors, or any other suitable type of sensor(s) to detect the position of the blade platform 420 (and/or other component) within the automated food processing system, and the processor 180 within the automated food processing system can trigger an actuator to move one or more elements of the automated food processing system between positions in any other way or according to any other schema.

8. Blade Actuator

As shown in FIG. 3, the blade actuator 800 of the automated food processing system functions to actuate (e.g., rotate) the blades. The blade actuator 800 preferably selectively engages the blades when the blade assembly 400 is in the engaged position 422, and is selectively disengaged from the blades when the blade assembly 400 is in the disengaged position 424. Generally, the blade actuator 800 functions to spin the blades to blend contents within the container 120 when the blender blade is engaged with the blade actuator 800 in the engaged position 422. Alternatively, the blade actuator 800 can be permanently mounted to the blade platform, blades, or be otherwise configured.

The blade actuator 800 can be a motor, such as an electric motor, but can alternatively be any other suitable force-generating mechanism. The electric motor can be a DC motor or an AC motor. Examples of the electric motor include a brushed DC motor, an electronic commutator motor, a universal AC-DC motor, an induction motor, a synchronous motor, a doubly fed electric machine, a rotary motor, a linear motor, or be any other suitable motor. The blade actuator 800 can be retained by a blade actuator platform, to the housing 200, or to any other suitable component. The blade actuator 800 is preferably statically mounted to the mounting surface, but can alternatively actuate relative to the blade assembly 400, or be retained in any other suitable manner. The blade actuator platform can be coupled to the housing 200 by a compliant interface 840, as discussed above; statically mounted to the housing 200; or otherwise coupled to the housing 200.

The blade actuator 800 can additionally include a blade actuator interface 820 that functions to drivably engage with the blade assembly 400. The blade actuator interface 820 can be an output shaft, complimentary magnet, or be any other suitable force transfer mechanism configured to transfer a rotary force generated by the blade actuator 800 to the blade assembly 400 (e.g., the driveshaft 460 and/or set of blades 440).

For example, the blender blade can include an electric motor with an output shaft configured to transiently engage the blade actuator 800 (e.g., only when the blade platform 420 is in the second position) and to communicate torque into the blender blade when the blender blade and the blade actuator 800 are engaged. The blade actuator 800 can rotate the blender blade according to a particular blend time, a particular blend formulae (e.g., pattern), a particular blend schema, or any other suitable set of operation parameters to process the contents of the container 120. For example, the blade actuator 800 can rotate the blender blade continuous as a maximum power or rotation rate (e.g., 4000 rpm) for a preset period of time (e.g., ten seconds). In another example, the blade actuator 800 can pulse rotation of the blender blade between off and maximum power, such as lull-power' for one second, off for one-half of one second, and repeat this for ten cycles. In yet another example, the blade actuator 800 can ramp the blender blade from static up to maximum speed (or maximum power) and then back down to static smoothly over a period of time (e.g., twelve seconds). However, the blade actuator 800 can implement any other blend schema or cycle.

The blade actuator 800 can execute the same processing schema for each fresh container 120 loaded into the automated food processing system, for each container 120 containing the same type of food (e.g., one processing schema for all smoothies and another processing schema for baby foods), or uniquely for each container 120 or user, etc. For example, the blade actuator 800 can rotate the blade at a first speed (e.g., 4000 rpm) for a first time (e.g., ten seconds) for a smoothie to achieve a desired consistency of the smoothie (i.e., emulsion), and the blade actuator 800 can rotate the blade at a second speed (e.g., 60 rpm) for a second time (e.g., thirty seconds) for oatmeal to achieve a desired level of mixing of the oatmeal grains with milk, cinnamon, and sugar. However, the blade actuator 800 can include any other suitable type of actuator that spins the blade to mix or blend, etc. the contents of the container 120 according to any other suitable schema.

The blade actuator 800 can additionally be waterproofed or water-resistant. The blade actuator 800 can be enclosed within a waterproof or water-resistant enclosure, coated with a hydrophobic coating, made from or include hydrophobic materials, incorporate one-way water-selective membranes or valves that drain water out of the motor enclosure, or include any other suitable water management system.

The system 100 can additionally include soundproofing mechanisms that function to reduce the amount of generated or emitted noise from the system 100. Soundproofing mechanisms can include: using a low-sound emission motor, using sound-absorbing material for the cup (e.g., bagasse, bamboo, plastic, etc.), using a low-sound emission blade design, including sound insulation or dampeners in the container 120 holder (e.g., silicone lining, etc.) and/or blade actuator 800, or include any other suitable sound-proofing mechanism.

9. Fluid Dispenser

The fluid dispenser 600 of the automated food processing system dispenses a volume of fluid into a chamber. The chamber can be entirely or partially formed by the blade assembly 400, container, or by any other suitable system component. The fluid can function to wash the chamber and/or constituent components, control the temperature of the chamber contents (e.g., heat, cool, or maintain the temperature of the chamber contents), purge the fluid manifolds or any other suitable component of the system 100, or perform any other suitable functionality. The system can include one or more fluid dispensers, wherein each can serve a different function (e.g., dispense fluids at different temperatures) or serve the same function. The chamber can be a processing chamber 142, cleaning chamber 162, or be any other suitable chamber. The fluid can be liquid, gas, or any other suitable fluid. The fluid can be water (e.g., hot water, cold water, etc.), cleaning fluid (e.g., mixed in-line or at the fluid dispenser 600), oil, juice, flavored water, or any other suitable fluid.

The fluid dispenser 600 can dispense fluid into the chamber (e.g., container 120) in response to insertion of the container 120 into the receiver of the container platform 300 in the first position (loading position 302) or determination of container 120 presence within the container receptacle 320, in response to a predetermined period of time being met (e.g., after 5 minutes has passed since the last rinse), in response to the temperature in the fluid manifold reaching a threshold temperature (e.g., when the temperature in the fluid line falls below 150° F.), in response to blade platform sealing against the container platform, in response to blade platform latch engagement with the container platform, or in response to the occurrence of any other suitable trigger event.

The fluid dispenser 600 preferably includes a fluid manifold fluidly connected to a fluid source 620, but can alternatively include any other suitable fluid connection. The fluid source can be a fluid reservoir, a fluid heater (e.g., connected in-line between a fluid source and the system 100), a fluid generator, a utility (e.g., a city water system), or be any other suitable fluid source. In a specific example, the fluid source can be a water heater configured to heat water to at least 100° F., to between 120° F.-200° F., to approximately 190° F. (within a margin of error, such as 5° F.), or to any other suitable temperature. 190° F. can be preferred in some variations, particularly in applications in which the container 120 is transported and stored in conventional cold chain (e.g., at 0° F.), to bring the container content temperature up to a desired temperature. The fluid source can hold different volumes of fluid at different temperatures, heat the fluid to different temperatures by varying heating time, hold fluid at a single temperature and mix the fluid with lower temperature fluid to change the temperature, or provide fluid at different temperatures in any other suitable manner.

The fluid dispenser 600 can be fluidly connected to the fluid source by a secondary fluid manifold (e.g., an intermediary tube, such as a rigid or flexible tube), directly connected to the fluid source, or be otherwise connected to the fluid source. The secondary fluid manifold can additionally actuate (e.g., pivot at the same point as the blade platform) to minimize stretching. The fluid dispenser 600 can additionally include regulators and/or sensors for pressure, temperature, flow rate, or other fluid parameters connected to the fluid dispenser 600 (e.g., arranged within the fluid dispenser 600, arranged in-line with the fluid dispenser 600, arranged in any other suitable location, etc.). The fluid dispenser 600 can additionally include passive and/or active valves (e.g., check valves, ball valves, etc.) that function to control fluid flow therethrough, one or more water filters, one or more additive manifolds (fluidly connected to additive reservoirs), or include any other suitable component.

The fluid dispenser 600 is preferably fluidly connected to the processing face of the blade platform 420, but can alternatively be fluidly connected to the receiving face of the container platform 300, the lumen of the container receptacle 320, arranged above the container platform 300 in the loading position 302 (e.g., within the volume above the container receptacle 320), or be fluidly connected to any other suitable component. The fluid dispenser 600 can extend through the thickness of the blade platform 420 and terminate within the engagement region (e.g., within the blade recess 426, etc.), extend through the thickness of the container platform 300, extend parallel to the receiving or processing faces, or extend along any other suitable portion of the system 100. The fluid dispenser 600 can be oriented and/or introduce fluid along a normal vector to the receiving or processing faces, along an acute angle to the receiving or processing faces, along a tangent to the blade recess 426 and/or container receptacle 320, or along any other suitable vector. The fluid dispenser 600 can be a separate fluid manifold from the other system components (e.g., be a separate tube), can be defined by the system components, or can be defined in any other suitable manner.

The fluid dispenser 600 can remain substantially static relative to the blade assembly 400, the container platform 300, or the housing 200, or can actuate relative to the blade assembly 400, the container platform 300, or the housing 200. In the latter variation, the fluid dispenser 600 can be actuated by a passive actuator (e.g., a spring, foam, etc.) or an active actuator (e.g., a motor).

In a first variation, the fluid dispenser 600 extends through the blade platform thickness to the blade recess 426, normal to the planar portion of the processing face. The fluid dispenser 600 can terminate proximal the driveshaft 460, proximal the perimeter of the engagement region, or terminate at any other suitable location. In a second variation, the fluid dispenser 600 extends through the blade platform 420 at an angle to the planar portion of the processing face, and terminates at an angle within the blade recess 426. In this variation, the fluid dispenser 600 is configured to direct fluid along a tangential vector within the blade recess 426, in a swirl pattern. However, any other suitable fluid dispenser 600 arranged in any other suitable configuration can be used.

In one specific example, the fluid dispenser 600 includes a water line that connects to a commercial or residential water supply with a kitchen, office, or other space occupied by the automated food processing system. In this example, the water dispenser can include a pressure regulator, a valve, and a spigot, wherein the pressure regulator regulates water pressure from the commercial or residential water supply (e.g., at 50 psi) down to an internal-use pressure (e.g., 30 psi), and wherein the valve is selectively actuated for discrete periods of time to meter a particular volume of fluid from the pressure regulator, through the spigot, into the container 120. The spigot can include a rigid water line pivotably suspended over and directed downward toward the receiver of the container platform 300 to dispense the volume of water from the valve directly into the container 120. Alternatively, the spigot can include a flexible line extending downward over and directed toward the receiver of the container platform 300. In one example implementation, the spigot is coupled to an access door 220 of the automated food processing system via a mechanism such that, when the access door 220 is opened by a user to load a fresh container 120 into the container platform 300, the mechanism moves the spigot out of the way of the path of the container 120 into the automated food processing system. Similarly, when the blade platform 420 moves into the first position over the container platform 300, the blade platform 420 can push the spigot out of its the path. Alternatively, the spigot can be coupled to an actuator that moves the spigot between a dispense position over the container 120 and a retracted position out of the way of a container 120 and/or blade platforms 420 and out of the way of insertion or removal of a container 120 into or out of the container platform 300. Yet alternatively, the spigot can be integrated into the container platform 300 to dispense water into the container 120 once the container 120 is loaded into the automated food processing system or integrated into the blade platform 420 to dispense water into the container 120 once the blade platform 420 is arranged over the container platform 300 in the first position. However, the spigot can be arranged in any other way within the automated food processing system to dispense water into the container 120.

The fluid dispenser 600 can supply the volume of fluid into the container 120 in response to detected insertion of a new container 120 into the container platform 300, in response to closure of the door 220 through which the new container 120 was loaded into the automated food processing system, in response to selection of a "start" button or a menu selection on the automated food processing system (or a device in communication with the automated food processing system), in response to opening of the door 220, in response to removal of the container from the container receptacle, in response to a predetermined time duration having passed, or in response to any other suitable event.

In a specific example, the fluid dispenser 600 dispenses a first volume of fluid at a first temperature for a first time duration into a processing chamber cooperatively formed between a container and the blade platform in response to blade platform sealing against the container. The fluid dispenser 600 dispenses a second volume of fluid at a second temperature (e.g., 140 F-160 F) for a second time duration into a wash chamber cooperatively formed between the blade shield and the blade platform in response to door actuation (e.g., door opening) to rinse the blades and processing face. The fluid dispenser 600 dispenses a third volume of fluid at a second temperature (e.g., 180 F) for a third time duration (e.g., 30 seconds) into the wash chamber in response to a predetermined time threshold (e.g., 4 hours) being met.

The processor 180 of the automated food processing system can additionally control the volume, flow rate, pressure, duration, and/or any other suitable fluid parameter of the dispensed fluid. For example, the processor 180 can further trigger the valve (e.g., a solenoid valve) to open for a preset period of time (e.g., three seconds) to portion a particular preset volume of fluid into the container 120. The processor 180 can also adjust the length of time that the valve is opened—and therefore the amount of fluid dispensed into the container 120—such as based on a menu selection entered by the user (e.g., for a consistency of the emulsion), based on a type of food solid contained in the container 120, based on a menu or command read from the container 120, etc. However, the water dispenser can function in any other way and include any other suitable component arranged in any other way to dispense.

10. Blade Shield

One variation of the automated food processing system further includes: a blade shield 900 transiently operable in a clean position and substantially enveloping the blender blade in the cleaning position during a clean cycle; the cleaning fluid injector configured to inject a volume of cleaning fluid into the blade shield 900 and toward the blender blade during the clean cycle; and the drain (or trough 710, as described above) adjacent the blade actuator 800 and receiving the volume of cleaning fluid from the blade shield 900 via the spout. Generally, the blade shield 900, fluid injector, and drain cooperatively function to automatically clean the blender blade and the blade platform 420—both of which may contact food during a blend cycle—upon completion of a blend cycle.

In one implementation, the blade shield 900 is coupled to an actuator that actuates (e.g., pivots, actuates axially, etc.) the blade shield 900 from the retracted position into the clean position over the blade platform 420 upon completion of a blend cycle. The blade shield 900 can include a rigid housing 200 that seals against a face of the blade platform 420, such as between an outer perimeter of the blade platform 420 and the perimeter of the blade recess 426 in the blade platform 420, to prevent egress of cleaning fluid from between the blade platform 420 and the blade shield 900. For example, the blade shield 900 can define an inverted polymer bucket defining a rim that seals against the elastomeric layer arranged across the blade platform 420. The elastomeric layer can therefore function both to: seal the rim of the container 120 to the blade platform 420 during a blend cycle; and to seal the blade shield 900 to the blade platform 420 during a clean cycle. However, the blade shield 900 can be of any other form and can engage the blade platform 420 in any other suitable way.

The cleaning fluid injector can be the fluid dispenser 600, or be a separate fluid manifold. The cleaning fluid can be the same fluid introduced into the processing chamber 142 (e.g., water), the fluid supplied by the fluid dispenser 600 with a cleaning additive, be a different fluid from a different fluid source, or be any other suitable fluid having any other suitable composition.

The cleaning fluid injector can include: a T-fitting that taps into the fluid line between the regulator and the valve of the fluid dispenser 600 described above; a nozzle extending through (or coextensive with) the blade shield 900; a flexible line coupled to the nozzle; and a valve arranged between the flexible line and the T-fitting and actuatable to release fluid (e.g., water) toward the blade during a clean cycle. The cleaning fluid injector can also include a soap dispenser than selectively releases a food-safe soap into the valve or into the flexible line during a clean cycle.

The clean cycle is preferably implemented (e.g., by the processor 180 or other computing system) in response to determination of container 120 removal from the container receptacle 320, but can alternatively be implemented in response to a predetermined number of processing cycles being met (e.g., after 5 containers 120 have been blended), in response to a predetermined time duration being met (e.g., after 4 hours has passed since the last clean cycle), or be implemented in response to the occurrence of any other suitable trigger event. The clean cycle can be a rinsing cycle, a sanitizing cycle, or be any other suitable cleaning cycle. In a specific example, the rinsing cycle includes a hot water rinse at 150° F. after every new container has been removed, and a sanitizing cycle includes a 180° F. rinse for 30 seconds every several hours. However, the clean cycle can be otherwise performed at any other suitable temperature, pressure, frequency, and duration.

The other components can additionally be operated during the clean cycle. For example, during a clean cycle, the blade actuator 800 can spin the blender blade (e.g., at full- or half-speed), the (first) valve can open for a full clean cycle period (e.g., ten seconds) to release water from the regulator toward the blender blade now enshrouded by the blade shield 900), and a second valve arranged between the soap dispenser and the flexible line can open for a limited period of time less than the duration of the clean cycle period (e.g., five seconds) to release soap into the water moving toward the blade. Thus, soapy water can enter the volume between the blade shield 900 and the blade platform 420 to clean (e.g., sanitize) the blender blade and the blade platform 420, as in a "wash cycle." In this example, the second valve can then close during the remaining portion of the clean cycle period (e.g., for the remaining five seconds of the clean cycle period) such that only clean, fresh water enters the volume between the blade platform 420 and the blade shield 900 to rinse soapy water and any other remaining food waste from the volume, as in a "rinse cycle." The cleaning fluid injector can alternatively include one nozzle, one flexible line, and one (or more) valves selectively dispensing cleaning solution (e.g., soapy water) into the volume (as in a wash cycle) and one nozzle, one flexible line, and one (or more) valves selectively dispensing rinse water (e.g., fresh water) into the volume (as in a rinse cycle). Furthermore, both wash and rinse fluid can then drain from the volume, through the spout in the blade platform 420, into the trough 710 (or drain).

During the clean cycle, the cleaning fluid injector can inject or dispense fluid (e.g., cleaning fluid, rinse fluid) directly toward the blender blade as the blade actuator 800 spins the blender blade in a forward direction. The blender actuator can also pulse to intermittently spin the blender blade, spin the blender blade backward, or actuate the blender blade in any other way and according to any other schema or schedule during a clean cycle.

Upon completion of the clean cycle, the blade shield 900 can remain in the clean position to shield a user from contact with the blade during insertion of a subsequent container 120, and the blade shield 900 can then retract from the blade platform 420 to enable the blade platform 420 to pivot into the first position over the container platform 300 at the start of a subsequent blend cycle. However, the system 100 can include any other suitable cleaning mechanism configured to clean the blades and/or blade assembly 400 of the system 100.

11. Processor and Power Source

Figure 10:
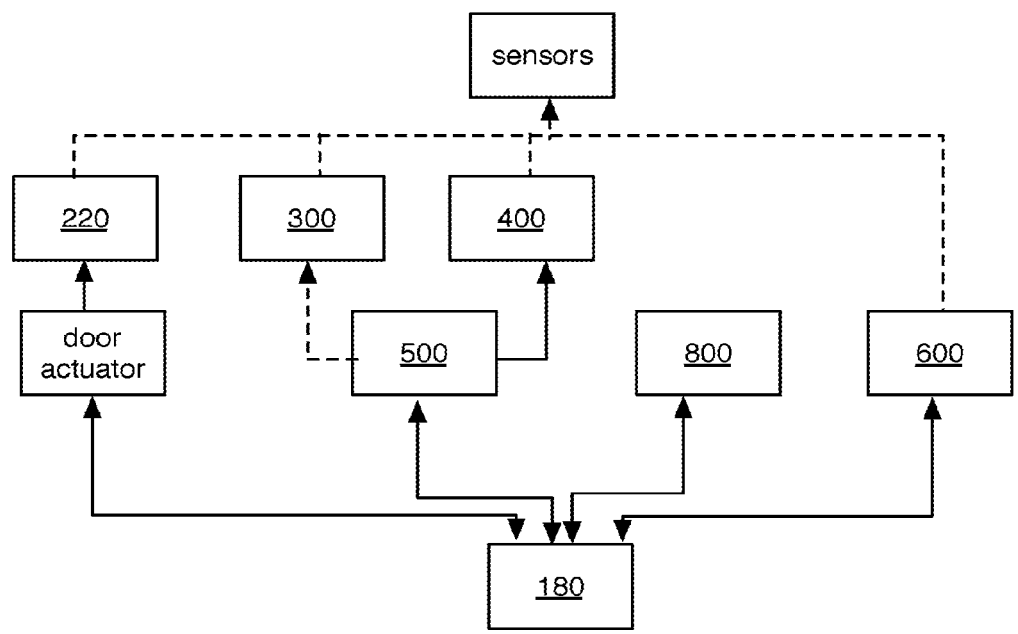
FIG. 10 is a schematic representation of a variation of system control.

As shown in FIG. 10, the system 100 can additionally include a processor 180 that functions to control system operation (e.g., control performance of the method described below). The processor 180 is preferably retained within the housing 200, but can alternatively be arranged external the housing 200. The processor 180 is preferably housed within a waterproof casing, but can alternatively be retained in any other suitable manner. The processor 180 is preferably fluidly and thermally isolated from the blade assembly 400, blade actuator 800, container platform 300, or any other system component, but can alternatively be fluidly and/or thermally connected to one or more system components. For example, the processor 180 can be thermally connected to the container 120 (e.g., arranged along a container 120 retention mechanism connected to the container receptacle 320), such that heat from the processor 180 can be transferred to the container 120, and the container 120 can cool the processor 180.

The processor 180 is preferably connected to the active components of the system 100, such as the active actuators (e.g., platform actuator(s)), the sensors, and the switches of the system 100, but can alternatively be connected to the passive components or be connected to any other suitable component. The processor 180 is preferably electrically connected to the components (e.g., by a wire), but can alternatively or additionally be wirelessly connected to the components. The processor 180 can additionally include a receiver, transmitter, and/or transponder, and can communicate with external computing systems (e.g., a remote server, user device, etc.).

The system 100 can additionally include a power source that functions to power the active components of the system 100. The power source can be a power storage system (e.g., a battery, such as a lithium ion battery, a capacitor, etc.), a power supply (e.g., a plug couplable to a wall outlet), or be any other suitable power supply. The power source is preferably connected to the active components by a set of wired connections, but can alternatively be wirelessly connected or otherwise connected to the components. However the system 100 can include any other suitable component, operable in any other suitable manner.

12. Method

Figure 14:
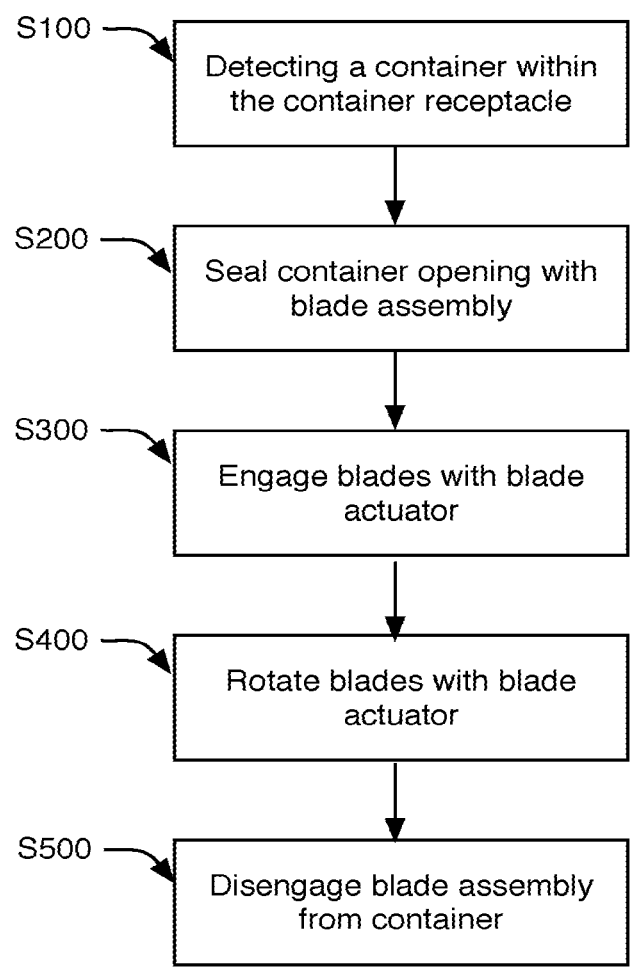
FIG. 14 is a schematic representation of the method.
Figure 15:
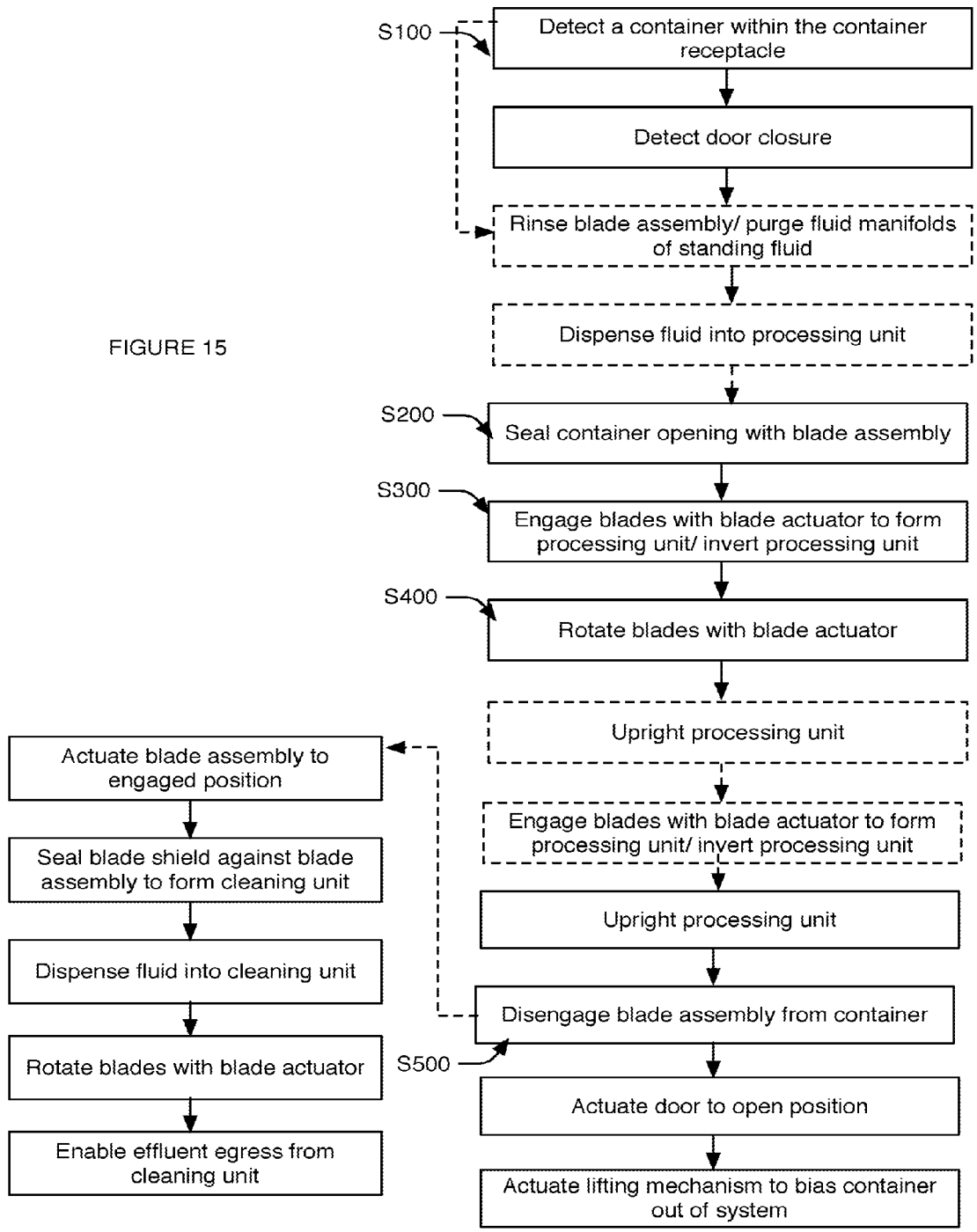
FIG. 15 is a schematic representation of an example of the method.

As shown in FIGS. 11 and 14, a method for processing foodstuff with an automated food processing system includes: detecting the presence of a container within the container receptacle S100; sealing the container opening with the blade assembly S200; engaging the set of blades with a blade actuator S300; rotating the set of blades with the blade actuator S400; and disengaging the blade assembly from the container S500. The method functions to process foodstuff within a processing volume. More preferably, the method functions to blend foodstuff within a container 120. However, the method can process any other suitable foodstuff in any other suitable volume.

All or part of the method is preferably automatically performed, but can alternatively be manually performed, performed in response to the detection of trigger events, or be performed at any other suitable time or frequency. The method is preferably performed by the system 100 discussed above (e.g., controlled by the processor 180), but can alternatively be performed or controlled by a different system, a remote computing system, or any other suitable apparatus, computing system, or set thereof. The method is preferably performed with a container 120 containing foodstuff (e.g., prepackaged with foodstuff), more preferably frozen foodstuff, but can alternatively be performed with any other suitable foodstuff, be performed with a container 120 that receives foodstuff dispensed by the system 100 from a reservoir or hopper, or be performed with any other suitable foodstuff provision system.

Detecting the presence of a container within the container receptacle S100 functions to determine that a container 120 has been received within the container receptacle 320. Detecting the presence of the container 120 can include: receiving the container 120 within the container receptacle 320, recording a measurement indicative of container receipt, and determining that the container 120 has been received based on the measurement. The container 120 is preferably received by the container receptacle 320 of the container platform 300, but can alternatively be received by any other suitable component. The container 120 is preferably received when the container 120 is entirely or partially inserted into the container receptacle 320, but can alternatively be otherwise received. The container platform 300 is preferably in the loading position 302 when the container 120 is received, but can alternatively be in any other suitable position. Recording the measurement indicative of container receipt is preferably performed by the container platform sensor or switch. Example measurements can include detection of a weight or pressure on the lifting mechanism 340 (e.g., detection of a depression force), determination that a laser beam has been interrupted, detection of actuation of the lifting mechanism 340 or a set of container 120 retention mechanisms, or be any other suitable measurement.

Sealing the container opening with the blade assembly S200 functions to form a processing unit 140 (e.g., blending unit), which defines the processing chamber 142 in which the foodstuff will be processed (e.g., blended). The processing unit 140 is preferably cooperatively formed by the container 120, the container platform 300, the blade assembly 400, and/or blade platform 420, but can alternatively or additionally be formed by any other suitable component. The blade recess 426 is preferably substantially aligned with the container opening when sealed, but can alternatively be misaligned or in any other suitable relative orientation. The container opening can be sealed by applying a sealing or other force against the container 120 with the blade assembly 400 and/or platform, but can alternatively be sealed in any other suitable manner. The force can be applied against the container edges forming the container opening, against the container receptacle 320, or applied to any other suitable component. Alternatively or additionally, the method can include orienting the set of blades 440 within the container 120.

The container opening can be sealed in response to a container 120 being present within the container receptacle 320 (e.g., in response to receipt of the container 120, in response to determination that the container 120 is within the container receptacle 320, etc.), in response to the door 220 being in the closed position (e.g., in response to determination that the door 220 is in the closed position based on the sensor data, etc.), in response to a combination thereof, or in response to the occurrence of any other suitable trigger event.

In one variation, sealing the container opening includes: actuating the blade assembly 400 to the disengaged position 424 (e.g., the first position), while the container platform 300 is in the loading position 302; and coupling the blade assembly 400 (more preferably the blade platform 420, but alternatively another component) against the container platform 300. Actuating the blade assembly 400 can include moving the blade platform 420 to the disengaged position 424 (e.g., from the engaged position 422, but alternatively from any other suitable position) with the platform actuator 500, moving a blade platform 420 into the first position over the container platform 300, or otherwise arranging the blade assembly 400 over the container opening. The blade platform 420 is preferably arranged over the container platform 300 in the loading position 302 when sealed, but can alternatively be sealed in any other suitable position. Coupling the blade assembly 400 against the container 120 can include coupling the blade assembly 400 to the container platform 300 with a latching mechanism, a set of complimentary magnetic elements, adhesive, suction (e.g., generated within the processing chamber 142), or include any other suitable method of coupling the blade assembly 400 to the container 120.

Engaging the set of blades with a blade actuator S300 functions to drivably connect the processing unit 140 with the blade actuator 800. The blades are preferably engaged with the blade actuator 800 after the container opening is sealed, but can alternatively be engaged before (e.g., wherein the blade actuator 800 moves with the set of blades 440) or after. Engaging the set of blades 440 with the blade actuator 800 preferably includes actuating the blade assembly 400 to the engaged position 422 and/or the container platform 300 to the processing position 304. As shown in FIG. 12, engaging the set of blades 440 with the blade actuator 800 can additionally include inverting the processing unit 140 (e.g., 150° from the upright position), such that the longitudinal axis of the container 120 is misaligned with a gravity vector, the container base is elevated above the container opening, or the container 120 is otherwise tilted or inverted from the upright position. In one variation, engaging the set of blades 440 with the blade actuator 800 can include moving the blade platform 420, the container 120, and the container platform 300 in unit to a second position, a blade actuator 800 engaging the blender blade in the second position. However, the set of blades 440 can be otherwise engaged with a blade actuator 800.

Rotating the set of blades S400 functions to execute the processing cycle. More preferably, rotating the set of blades 440 functions to execute the blend cycle to blend the foodstuff and/or additives (e.g., water) within the processing unit 140 (e.g., within the container 120) into an emulsion, but can alternatively process the food in any other suitable manner. The blades can be rotated at a predetermined rate, frequency, axial position, or have any other suitable operational parameter controlled. The blade rotation is preferably controlled according to recipe or schema, and is preferably controlled by processor 180 or other computing system. The blades are preferably actuated by the blade actuator 800, but can alternatively be actuated by any other suitable actuation mechanism.

Disengaging the blade assembly from the container S500 functions to reveal the container 120—now with blended contents—to the user for retrieval. The blade assembly 400 is preferably disengaged after rotating the set of blades 440 with the blade actuator 800, but can alternatively be disengaged during blade rotation or at any other suitable time. Disengaging the blade assembly 400 can include: uprighting the blending unit (e.g., moving the blade assembly 400 to the disengaged position 424 and the container platform 300 to the loading position 302), decoupling the blade assembly 400 from the container platform 300, actuating the blade assembly 400 away from the disengaged position 424 (e.g., toward or to the engaged position 422), and retaining the container platform 300 in the loading position 302. However, the blade assembly 400 can be otherwise disengaged from the container 120. Disengaging the blade assembly 400 can additionally include actuating the door 220 to the open position (e.g., with a door 220 actuator), raising the container 120 out of the container receptacle 320 (e.g., with the lifting mechanism 340 or releasing a latch retaining the lifting mechanism 340 in the lowered position), or include any other suitable process. In a specific example, disengaging the blade assembly 400 can include moving the blade platform 420, the container 120, and the container platform 300 in unit to the first position, unlocking the blade platform 420 from the container platform 300, and moving the blade platform 420 into the second position to reveal the container 120 for a consumer, wherein the container platform 300 supports the container 120 in an upright orientation in the first position. Disengaging the blade assembly can additionally include opening a vent to equalize the chamber pressure with the external pressure prior to moving the blade platform 420 into the second position. However, the blade assembly 400 can be otherwise disengaged from the container 120 and/or container platform 300.

The method can additionally include agitating the processing unit S420, which functions to dislodge clumps within the processing chamber 142. The processing unit 140 is preferably agitated during the processing cycle, but can alternatively be agitated before, after, or at any suitable time relative to the processing cycle (e.g., blend cycle). The processing unit 140 can be agitated one or more times. Agitating the processing unit 140 can include shaking the processing unit 140 laterally, shaking the processing unit 140 longitudinally or arcuately, rotating the processing unit 140 in a direction opposing the direction of blade rotation, rotating the blades in the opposing direction, or otherwise agitating fluid flow within the processing chamber 142. In one variation, agitating the blending unit can include, partway through the blend cycle: uprighting the blending unit, inverting the blending unit (and recoupling the blending assembly to the blade actuator 800), and resuming the blend cycle. However, the processing unit 140 can be otherwise agitated. For example, agitation can be caused as described with reference to declumping in Section 15 herein.

The method can additionally include adjusting the foodstuff temperature, which functions to melt the foodstuff, bring the foodstuff to a predetermined temperature (e.g., for consumption), and/or facilitate better food processing. Adjusting the foodstuff temperature can include heating the foodstuff, cooling the foodstuff, maintaining the foodstuff temperature, or otherwise adjusting the foodstuff temperature. Adjusting the foodstuff temperature can include introducing heated fluid into the processing chamber 142 (e.g., by adding water via the fluid dispenser 600, etc.), heating the container 120 (e.g., with heating elements thermally coupled to the container receptacle 320), heating the blade assembly 400, or otherwise applying heat to foodstuff. The foodstuff is preferably heated after the blade assembly 400 is sealed against the container opening, but can alternatively be heated before or at any other suitable point in time. Adjusting the foodstuff temperature by introducing water at a predetermined temperature can include: adjusting the amount of fluid introduced into the processing chamber 142 and providing a predetermined volume of fluid into the processing chamber 142, adjusting the temperature to which the fluid is heated, or otherwise adjusting the temperature of the foodstuff.

The method can additionally include cleaning the blade assembly and/or container platform S600, which functions to sterilize, rinse, or otherwise clean the food-contacting portions of the system 100. The food-contacting components can be rinsed, scrubbed, heated above a predetermined temperature, gassed (e.g., with iodine), misted (e.g., with alcohol), or otherwise cleaned. The food-contacting components can be rinsed with the fluid used in or similar to that introduced into the processing chamber 142 to heat the foodstuff, cleaning fluid, or be any other suitable fluid. However, the blade assembly 400 can be otherwise cleaned.

As shown in FIG. 13, one variation of cleaning the blade assembly 400 includes: moving a blade shield 900 into a cleaning position over the blade assembly 400 to envelope the blades to form a cleaning chamber 162; actuating the blade actuator 800 during a clean cycle to rotate the blades; injecting a cleaning fluid toward the blender blade during the clean cycle; and, in response to completion of the clean cycle, retracting the blade shield 900 from the clean position. The blade is preferably in the engaged position 422 as the blade shield 900 moves from the retracted position to the cleaning position, but can alternatively be in any other suitable position. Enveloping the blade assembly 400 can include cooperatively enclosing the blades between the blade platform 420 and the blade shield 900, enclosing the blade recess 426, or otherwise encompassing the blade. The blade assembly 400 can be sealed against the blade shield 900, forced against the blade shield 900 (e.g., by a latch or other coupling mechanism), or otherwise coupled to the blade shield 900. However, the cleaning chamber 162 can be formed and cleaned in any other suitable manner.

The method can additionally include facilitating effluent egress from the cleaning chamber 162, which functions to remove the rinsate from the cleaning chamber 162. This can include opening a valve fluidly connecting the egress manifold 700 with the cleaning chamber 162, decreasing the sealing or coupling force between the blade assembly 400 and container platform 300, or otherwise facilitating fluid flow between the cleaning chamber 162 and a trough 710 or other fluid reservoir. However, the effluent can be otherwise removed.

13. Container Configured for Use with Automated Food Processing System

Referring now to FIGS. 16-22, embodiments of a container 1000 are illustrated. The container 1000 can be similar to container 120 described herein. In some embodiments, the container 1000 is configured for use with an automated food processing system, such as automated food processing system 100. In some embodiments, the container 1000 is for use in a blending apparatus, such as the automated food processing system 100. The container 1000 can include a body 1020 including a lip portion 1028 and a base portion 1032. The body 1020 can include a wall structure 1036 extending between the lip portion 1028 and the base portion 1032. The wall structure 1036 and the base portion 1032 can define a cavity 1040.

The lip portion 1028 can extend outwards from the wall structure 1036 relative to a central axis 1004 extending through a center of the body 1020 transverse to the base portion 1032. The body 1020 can be configured to be received in a container receptacle defined within a container platform of the automated food processing system 100 when the container platform is in a first position such that the wall structure 1036 passes through an opening defined by the container receptacle and a second (e.g., bottom) surface 1030 of the lip portion 1028 is supported by a surface of the container receptacle (see, e.g., container receptacle 320 of container platform 300 shown in FIGS. 1A-7, positions 302 and 304 shown in FIG. 11, etc.).

The lip portion 1028 can include or define one or more engagement features sized and shaped to (i) sealingly engage with a corresponding engagement feature of a blade assembly of the automated food processing system 100 (e.g., blade assembly 400 shown in FIGS. 3-7, etc.); (ii) restrict rotation of the container 1000 about the central axis 1004 during rotation of blades of the blade assembly (e.g., blades 440 of blade assembly 400 shown in FIG. 9, etc.); and (iii) restrict translational motion of the lip portion 1028 relative to the surface of the container receptacle during rotation of the container platform from the first position to a second position about an axis transverse to the central axis of the container or during rotation of blades of the blade assembly when the container platform is in the second position. The container 1000 can be configured to hold material for blending (e.g., fruit, food particles, water, etc.) in the cavity 1040 such that a blade assembly, when coupled to the container 1000, can blend or otherwise process the material in the cavity 1040 to provide the material for consumption.

In some embodiments, such as shown in FIGS. 16-19, the wall structure of the container 1000 can include a plurality of side portions 1022 that are adjoined by dividing features 1024. The wall structure 1036 can include an exterior surface 1038 and an interior surface 1039. The cavity 1040 (e.g., the cavity 1040 into which material such as food/fluid, etc., is inserted into the container 1000 and contained by the container 1000) can be defined by the body 1020 (e.g., by the wall structure 1036, by the interior surface 1039) and the base portion 1032. A central axis 1004 can be defined for the container 1000 which passes through the base portion 1032 and is transverse to the base portion 1032 (e.g., perpendicular to the base portion 1032). In some embodiments, the wall structure 1036 includes a thickness (e.g., a thickness defined from the exterior surface 1038 to the interior surface 1039). In some embodiments, the thickness of the wall structure 1036 is greater than or equal to 0.01 inches and less than or equal to 0.1 inches. In some embodiments, the thickness of the wall structure is less than 0.09 inches, 0.08 inches, 0.07 inches, 0.06 inches, 0.05 inches, 0.04 inches, 0.03 inches, 0.02 inches, amongst others. In some embodiments, the thickness of the wall structure is greater than or equal to 0.04 inches and less than or equal to 0.06 inches. In some embodiments, the thickness of the wall structure is greater than or equal to 0.04 inches and less than or equal to 0.052 inches.

The lip portion 1028 can be configured to engage, contact, or otherwise coupled with the container receptacle 320 and the blade assembly 400. The lip portion 1028 can include a perimeter 1070 defining a plurality of sides 1072. The lip portion 1028 can include a first surface 1029 and a second surface 1030 opposite the first surface 1029. The first surface 1029 can be configured to engage the blade assembly 400, and the second surface 1030 can be configured to be supported by and/or engage the container receptacle 320. A first dimension 1027a of the lip portion 1028 can be defined for the lip portion 1028 along the first surface 1029 as the lip portion 1028 extends outward relative to the central axis 1004 to a first edge 1031a of the lip portion 1028. A second dimension 1027b of the lip portion 1028 can be defined for the lip portion 1028 along the second surface 1030 as the lip portion 1028 extends outward relative to the central axis 1004 to a second edge 1031b of the lip portion 1028.

Figure 20:
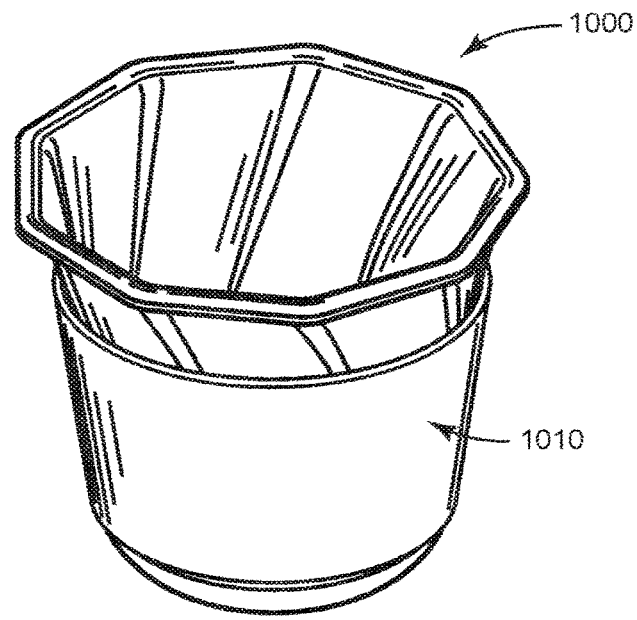
FIG. 20 is a perspective view of an embodiment of the container of FIG. 16 and a removable sleeve.

In some embodiments, as shown in FIG. 20, a removable member 1010 (e.g., sleeve) can be positioned about the container 1000. The removable member 1010 can be configured to facilitate handling of the container 1000 by a user before and/or after a blending operation. For example, the removable member 1010 can be an insulating member configured to insulate material contained within the container 1000 from a relatively warm or relatively cold hand of a user.

Figure 16:
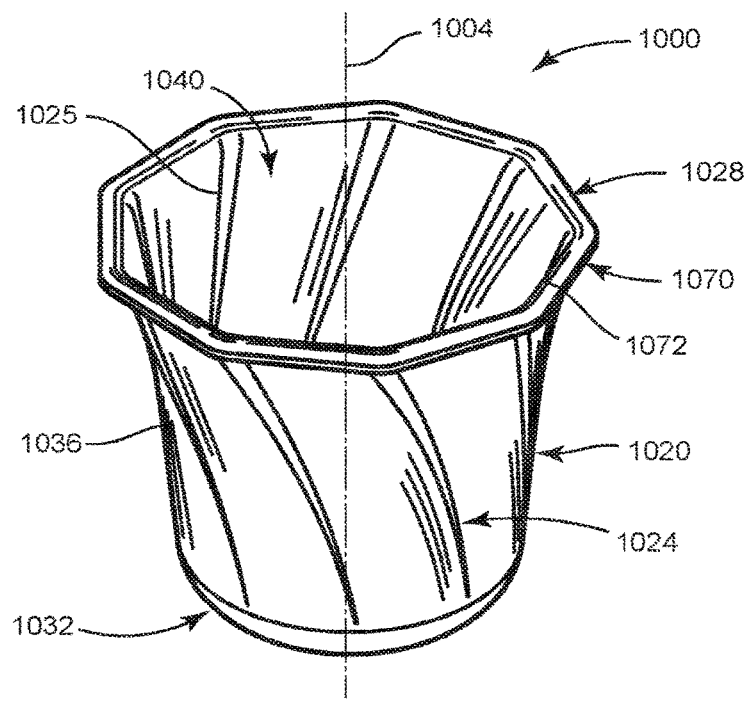
FIG. 16 is a perspective view of an embodiment of a container for use with an automated food processing system.
Figure 17:
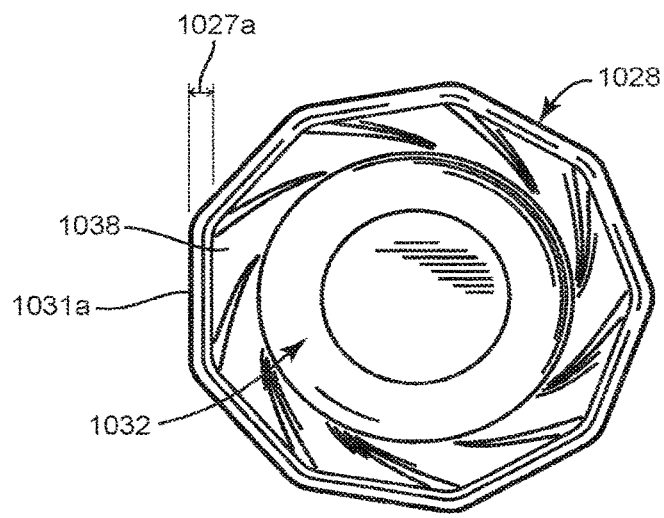
FIG. 17 is a top view of an embodiment of the container of FIG. 16.
Figure 18:
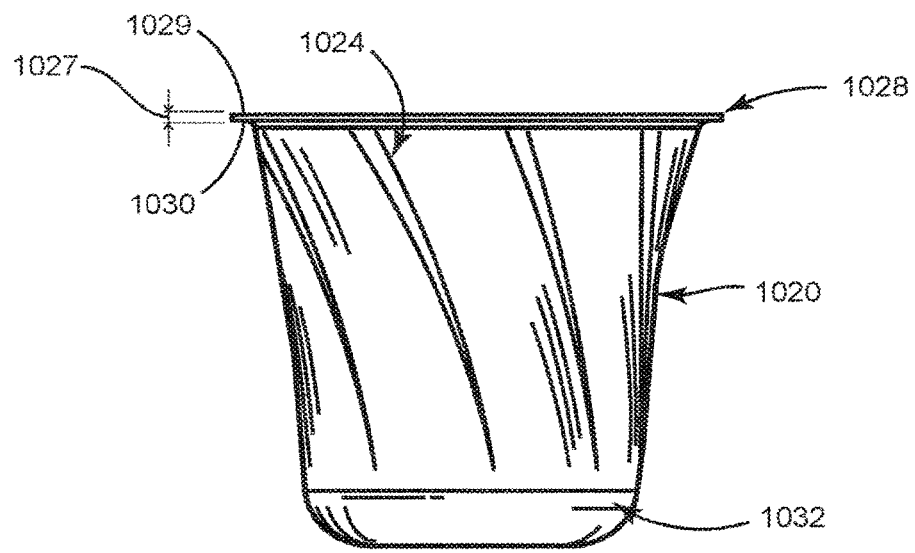
FIG. 18 is a side view of an embodiment of the container of FIG. 16.
Figure 19:
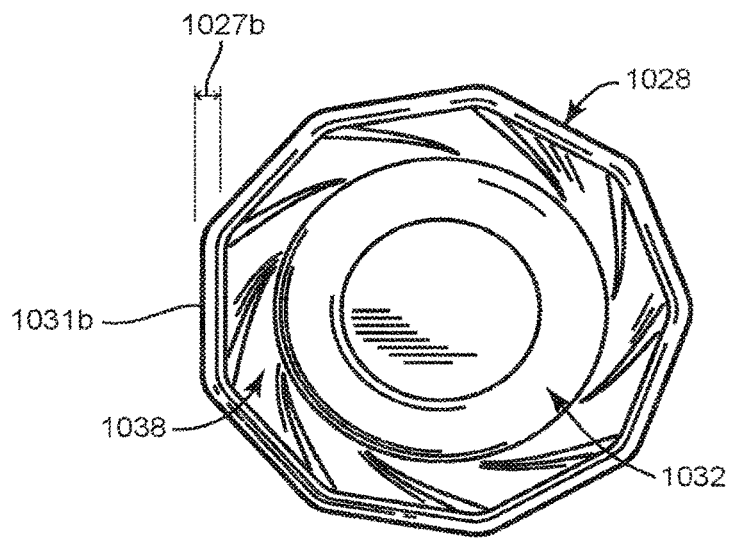
FIG. 19 is a bottom view of an embodiment of the container of FIG. 16.
Figure 21:
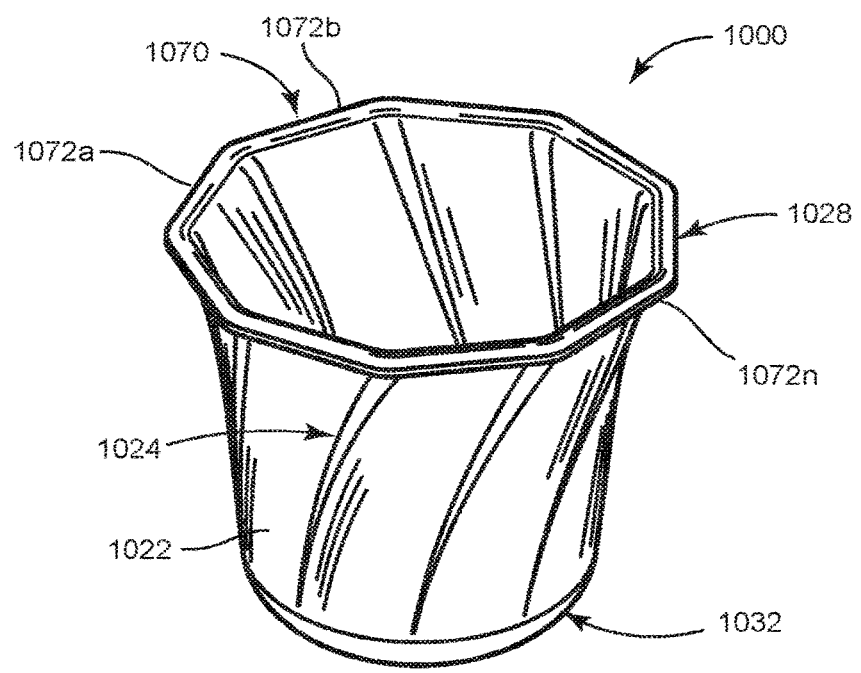
FIG. 21 is a perspective view of an embodiment of a container for use with an automated food processing system illustrating an orientation of the exterior faces of the container.

In some embodiments, a perimeter 1070 of the lip portion 1028 defines at least three sides 1072. For example, the perimeter 1070 can include a plurality of discrete, adjoining sides 1072 forming a closed shape of the lip portion 1028. The side portions 1022 can correspond to the sides 1072 of the lip portion 1028, such that each first end 1021 of each side portion 1022 extends to an edge defining the lip portion 1028 adjacent to each side 1070. In some embodiments, the dividing features (e.g., striations, indents, lines, edges, etc.) 1024 are defined on the exterior surface 1038 of the wall structure 1036 and extend from the edges that define the sides 1072 of the lip portion 1028. In some embodiments, other dividing features 1025 are defined on the interior surface 1039 of the wall structure 1036 and similarly extend from the edges that define the sides 1072 of the lip portion 1028. The dividing features 1024 can extend outward from the wall structure 1036. The dividing features 1024 can be configured to shape the body 1020 such that the body fits within the container receptacle 320. As shown in FIG. 16, the dividing features 1024 can follow a counter-clockwise path relative to a to the central axis 1004 between the lip portion 1028 and the base portion 1032 and the dividing features 1025 can follow a clockwise path relative to the central axis 1004 between the lip portion 1028 and the base portion 1032. As shown in FIG. 21, the dividing features 1024 can follow a clockwise path relative to the central axis 1004 between the lip portion 1028 and the base portion 1032 and the dividing features 1025 can follow a counter-clockwise path relative to the central axis 1004 between the lip portion 1028 and the base portion 1032.

In some embodiments, the wall structure 1036 includes a plurality of side portions 1022. Each side portion 1022 can include a first end 1021 that extends to an edge or side 1072 defining the lip portion 1028 and a second end 1023 that extends to the base portion 1032, the first end 1021 of each side portion 1022 forming an obtuse angle with corresponding first ends 1021 of adjoining side portions 1022 adjacent to the side portion 1022. In some embodiments, the wall structure 1036 includes a number of side portions 1022 corresponding to a number of receiving sides of a container receptacle 320. Stated in another way, each of the edges or sides 1072 that define the lip portion 1028 form obtuse angles with corresponding adjacent sides 1072 of the lip portion. In some embodiments, the obtuse angle between the edges or sides 1072 that define the lip portion 1028 is about 140 degrees.

In some embodiments, the obtuse angle formed between the first end 1021 of each side portion 1022 and the corresponding first ends 1021 of adjoining side portions 1022 adjacent to the side portion 1022 corresponds to an angle formed between adjacent sides of the container receptacle 320 that form an opening within the container receptacle 320, the opening sized and shaped to receive the body 1020 of the container 1000. In some embodiments, the correspondence between the angles formed by the side portions 1022 and the angles of the container receptacle 320 are configured to fit the container 1000 to the container receptacle 320, such as to increase frictional engagement between the container 100 and the container receptacle 320. In some embodiments, the obtuse angle is a function of the number of side portions 1022. In some embodiments, each side portion 1022 includes a similar or identical shape. In some embodiments, the obtuse angle is about 140 degrees.

In some embodiments, the lip portion 1028 has a first dimension 1027a extending from an interior surface 1039 of the wall structure 1036 to a first edge 1031a of the lip portion 1028 adjacent a first surface 1029 of the lip portion 1028, and the lip portion has a second dimension 1027b extending from an exterior surface 1038 of the wall structure 1036 to a second edge 1031b of the lip portion 1028 adjacent a second surface 1030 of the lip portion 1028. In some embodiments, the first dimension 1027a and the second dimension 1027b are different. In some embodiments, the dimensions of the lip portion 1028 are configured such that the lip portion 1028 can be clamped by the container receptacle 320 and the blade assembly 400, so as to seal the container 1000 for operations of the automated food processing system 100, such as rotation of the container platform from the first position to the second position and corresponding rotation of the container 1000, processing of material within the container 1000, etc.

Figure 22:
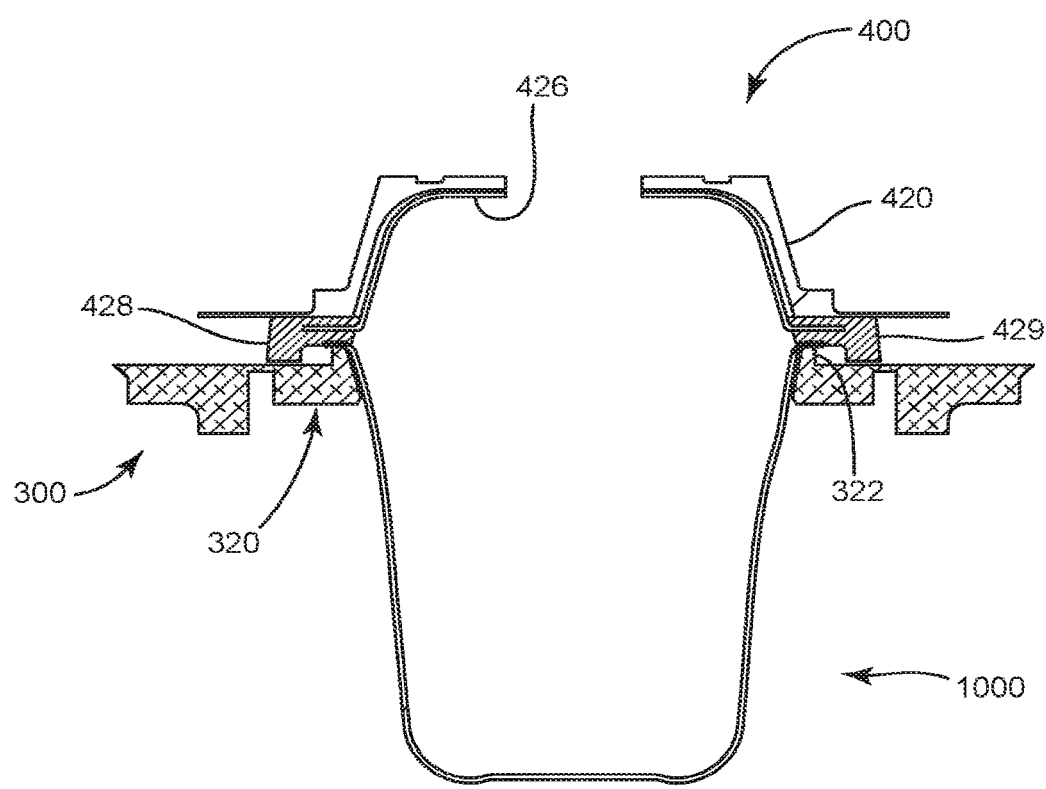
FIG. 22 is a sectional view of an embodiment of a container for use with an automated food processing system when received by a container receptacle and blade assembly of the automated food processing system.
Figure 23:
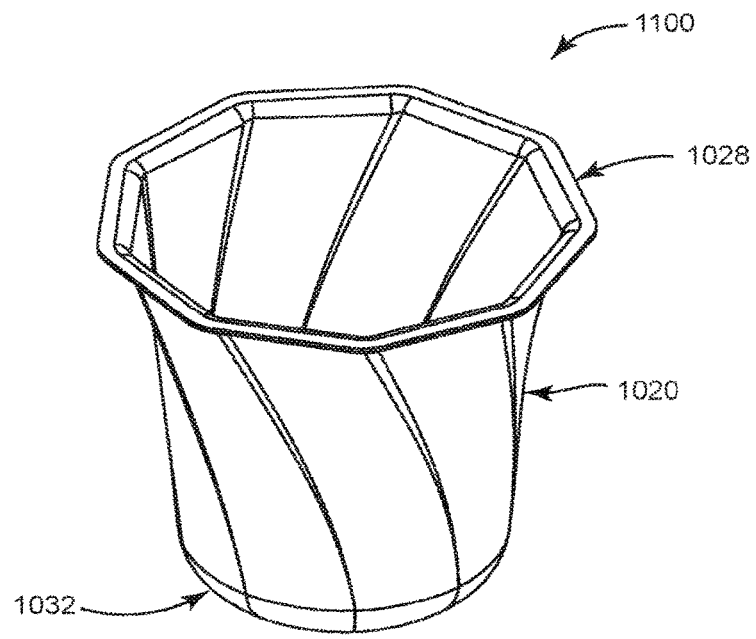
FIG. 23 is a perspective view of an embodiment of a container for use with an automated food processing system.
Figure 24:
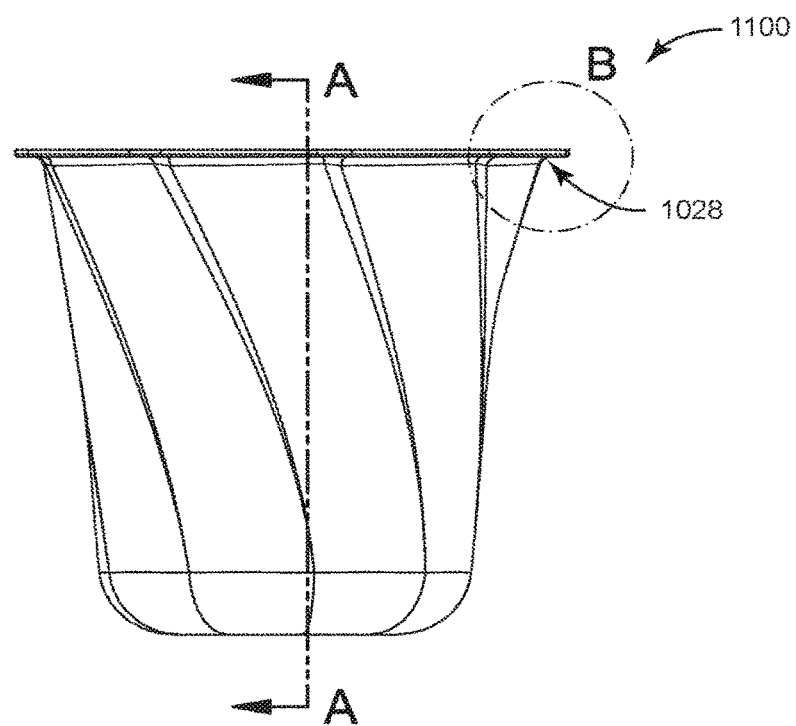
FIG. 24 is a side view of an embodiment of the container of FIG. 23.

In some embodiments, the first surface 1029 of the lip portion 1028 is configured to contact an engagement feature of a blade assembly (e.g., seal 428 of blade assembly 400 shown in FIGS. 9 and 22, etc.), and the second surface 1030 of the lip portion 1028 is configured to contact a protrusion of the container receptacle (e.g., protrusion 322 of container receptacle 320 shown in FIGS. 3 and 22, etc.). For example, the contacts can be frictional engagements and/or sealing engagements between the lip portion 1028 and the blade assembly 400 and the container receptacle 320, respectively. In some embodiments, the first surface 1029 and/or the second surface 1030 of the lip portion 1028 can include anti-rotation features (e.g., notches, rough portions, teeth, etc.) configured to increase friction between the first and second surfaces of the lip portion 1028 and the blade assembly 400 and container receptacle 320, respectively. The first surface 1029 and/or second surface 1030 can be configured to generate frictional forces with the contacted surfaces in order to withstand outside forces applied to the container 1000 during operation of the automated food processing system 100, such as rotational and/or translation forces caused during movement of the container 1000 or during processing of material within the container 1000 that would otherwise cause the container 1000 to rotate (e.g., rotate about the central axis 1004) or shift (e.g., cause the lip portion 1028 to translate relative to the container receptacle 320 and/or the blade assembly 400).

In some embodiments, the lip portion 1028 is configured to withstand clamping forces applied to the lip portion 1028 by the engagement feature of the blade assembly and the protrusion of the container receptacle when the blade assembly is secured attached to the container platform. For example, the lip portion 1028 can include material having a sufficient rigidity or compressive strength such that, when clamped by the seal 428 and protrusion 322 (see, e.g., FIG. 22), the lip portion 1028 does not undergo a shape change such as a decrease in thickness. This facilitates frictional engagement between the lip portion 1028, the protrusion 322, and the seal 428, as frictional forces between these components would be reduced if the lip portion 1028 were compressed by clamping forces rather than sufficiently resisting the clamping forces so as to maintain contact between the lip portion 1028, the protrusion 322, and the seal 428.

In some embodiments, the lip portion 1028 is configured to withstand operating forces applied to the lip portion 1028 by the engagement feature of the blade assembly and the protrusion of the container receptacle when the blade assembly is rotating. For example, the lip portion 1028 can be configured to withstand operating forces applied to the lip portion 1028 by the seal 428 of the blade assembly 400 and the protrusion 322 of the container receptacle 320 when the blade assembly 400 is rotating. Rotation of the blades 440 of the blade assembly 400 can generate rotational forces in the blade assembly 400 and/or in the material processed by the blade assembly 400 that are transferred to the lip portion 1028. The lip portion 1028 is configured to withstand these rotational forces such that the lip portion 1028 does not rotate against or disengage from the seal 428, which could result in damage to the container 1000, loss of material from the container 1000, etc.

In some embodiments, the lip portion 1028 is configured to withstand operating forces applied to the lip portion 1028 by the engagement feature of the blade assembly and the protrusion of the container receptacle when the blade assembly is rotating. For example, the lip portion 1028 can be configured to withstand operating forces applied to the lip portion 1028 by the seal 428 of the blade assembly 400 and the protrusion 322 of the container receptacle 320 when the blade assembly 400 is rotating from the first position to the second position (e.g., when the container platform rotates between loading position 302 and processing position 304, etc.). A variety of forces can be applied to the lip portion 1028 during such operations, including gravity forces applied to the container 1000 that change in direction relative to the container 1000 as the orientation of the container 1000 changes. Material in the container 1000 can also shift within the container 1000 as the container 1000 is rotated, applying forces against various parts of the container 1000. In some embodiments, the lip portion 1028 forms the only point of contact between the container 1000 and the container platform 300 and the blade assembly 400 during rotation of the container platform 300, and the lip portion 1028 is configured to withstand each of the forces applied to the container 1000 during rotation of the container 1000.

In some embodiments, the lip portion 1028 is configured to withstand a combination of clamping forces and operating forces applied to the lip portion 1028 by the engagement feature of the blade assembly and the protrusion of the container receptacle when the blade assembly is securely attached to the container platform and the blade assembly is rotating. For example, the lip portion 1028 can be configured to withstand a combination of clamping forces and operating forces applied to the lip portion 1028 by the seal 428 of the blade assembly and the protrusion 322 of the container receptacle 320 when the blade assembly 400 is securely attached to the container platform 300 and the blade assembly 400 is rotating.

In some embodiments, the exterior surface 1038 of the wall structure 1036 flares (e.g., increases in distance relative to the central axis 1004 along a path away from the base portion 1032) toward the lip portion 1028 such that a distance between the exterior surface 1038 and corresponding sides of the container receptacle 320 that form an opening for receiving the container 1000 is below a threshold distance to inhibit rotation of the container 1000 relative to the container receptacle 320 while the blade assembly is rotating. For example, the base portion 1032 can include a diameter that is less than a diameter of the exterior surface 1038 adjacent to the lip portion 1028, such as to facilitate positioning the container 1000 in the container receptacle 320, while the flared portion of the exterior surface 1038 increases contact between the container 1000 and the container receptacle 320 (e.g., between the container 1000 and the protrusion 322), such that the container 1000 is supported by and engaged to the container receptacle 320. In some embodiments, a distance between the flared portion of the exterior surface 1038 and a surface of the container receptacle 320 defining the opening of the container receptacle 320 is small enough such that rotation of the container 1000 is prevented by contact between the dividing features 1024 and the surface of the container receptacle 320. In some such embodiments, the dividing features 1024 can serve as anti-rotation features. In some embodiments, the base portion 1032 defines a distance (diameter) across the base portion of approximately 2.5 inches, an interface of the lip portion 1028 and the wall structure 1036 defines a distance (diameter) across the interface of approximately 3.4 inches, and an outside of the lip portion 1028 defines a distance (diameter) across the outside of the lip portion of approximately 3.8 inches. In some embodiments, an arc length of the dividing feature 1024 is approximately 3.2 inches. It should be appreciated that the distances may be dependent on the size of the opening defined by the container receptacle of the automated food processing system.

In some embodiments, the container 1000 is structurally configured to maintain structural integrity to maintain a seal between the lip portion 1028 and the blade assembly 400 during rotation of the blade assembly 400 and rotation of the container platform 3000 from the first position to the second position. For example, the container 1000 can include material configured to maintain structural integrity due to operational forces as discussed herein, as well as due to shocks resulting from particles impinging on the interior surface 1039 of the wall structure 1036.

In some embodiments, the first surface 1029 of the lip portion 1028 has a first coefficient of friction, and the lip portion 1028 is configured to engage with a corresponding engagement feature of the blade assembly (e.g., seal 428 of blade assembly 400) such that a frictional engagement force between the first surface 1029 and the seal 428 is greater than a threshold translational force applied to the container 1000 during rotation of the blade assembly 400 to maintain a seal between the lip portion 1028 and the blade assembly 400. For example, as the blade assembly 400 is rotated, forces may be applied to the lip portion 1028 in a plane defined by the lip portion 1028 that could cause the lip portion 1028 to be translated in the plane defined by the lip portion 1028. If the frictional engagement force between the lip portion 1028 and the seal 428 is less than a threshold value, then the forces applied to the lip portion 1028 can cause the lip portion 1028 to disengage from the seal 428 and translate relative to the seal 428. If the lip portion 1028 disengages from the seal 428, then particles (e.g., food, fluids, etc.) in the container 1000 can escape the container 1000.

In some embodiments, the thickness 1027 of the lip portion 1028 between the first surface 1029 and the second surface 1030 is sized to establish a seal between the blade assembly 400 and the first surface 1029 when the blade assembly 400 is engaged with the container platform 300 and, when the container platform 300 is in the second position, to align a blade assembly coupler (e.g., blade actuator interface 820, etc.) with the blade actuator 800 to enable sufficient torque delivery to the blade assembly. For example, if the thickness 1027 is less than a lower threshold thickness, then the first surface 1029 may not properly engage the seal 428 so as to form a seal between the lip portion 1028 and the blade assembly 400 (e.g., clamping/compressing forces that clamp against the lip portion 1028 from the container receptacle 320 and the seal 428 may be insufficient to generate sufficient engagement between the first surface 1029 and the seal 428). For example, if the thickness 1027 is greater than an upper threshold thickness, then the blade assembly 400 may not be properly aligned such that the locking mechanism 480 cannot engage the container platform 300 to the blade assembly 400 (e.g., the locking mechanism 480 may not be able to fully latch the container platform 300 to the blade assembly). In some embodiments, the lower threshold thickness is greater than or equal to 0.005 inches and less than or equal to 0.25 inches (e.g., 0.005 inches, 0.01 inches, 0.015 inches, 0.02 inches, 0.25 inches, or any other value greater than or equal to 0.005 inches and less than or equal to 0.25 inches). In some embodiments, the upper threshold thickness is greater than or equal to 0.026 inches and less than or equal to 0.4 inches (e.g., 0.026 inches, 0.05 inches, 0.1 inches, 0.2 inches, 0.3 inches, 0.4 inches, or any other value greater than or equal to 0.005 inches and less than or equal to 0.4 inches). In some embodiments, the thickness 1027 is defined by the threshold thicknesses. For example, the thickness 1027 can be greater than 0.005 inches and less than 0.25 inches; greater than 0.01 inches and less than 0.2 inches; greater than 0.02 inches and less than 0.1 inches; greater than or equal to 0.03 inches and less than or equal to 0.065

In some embodiments, the width is configured to enable the lip portion 1028 to be sealed with a cover member that encloses the container 1000, such as for storage and/or transportation of the container 1000. For example, the width can be configured for the cover member to be adhered to the lip portion 1028, such as by a heat seal and/or an adhesive seal. In some embodiments, the seal is a vacuum seal. In some embodiments, an interior gas in the container 1000 is replaced during a sealing process (e.g., nitrogen or carbon dioxide gas are introduced into the container 1000). For example, the interior gas can be replaced to reduce the formation of ice crystals if the container 1000 is subject to temperatures at which water vapor in the container 1000 would freeze, or to slow a metabolic rate of material (e.g., food) contained in the container 1000 to preserve freshness (e.g., prevent degradation or decomposition). In some embodiments, the width and/or the first surface 1029 of the lip portion 1028 is configured to maintain the seal during a sealing process and in response to pressure forces applied to the seal due to vacuum sealing, gas replacement, or gases generated within the container 1000.

In some embodiments, as shown in FIG. 22, the range of widths that can be used to form the lip portion 1028 may be restricted by the corresponding surface areas of the seal 428 and the protrusion 322 that contact with first surface 1029 and second surface 1030 of the lip portion 1028 when the blade assembly 400 is securely engaged with the container platform 300. The maximum width defined by the first surface 1029 is limited by a portion 429 of the seal 428 that extends towards the container receptacle 320.

In some embodiments, the width is configured to establish a seal that can withstand forces applied on the cover member, such as forces due to other containers being stacked on the cover member, forces due to material contained within the container 1000 pressing against the cover member, etc. Although a larger width would enable the seal between the container 1000 and the cover member to withstand larger forces, there are countervailing interests that would limit the size of the width. For example, the width should not exceed a predetermined width that would inhibit a user from drinking from the container 1000. Stated in another way, if the width of the lip portion 1028, a user may struggle to drink from the container 1000 by placing his lips on the lip portion 1028.

In some embodiments, a width of the lip portion 1028 (e.g., a width associated with the first dimension 1027a or the second dimension 1027b) is greater than or equal to 0.01 inches and less than or equal to 1 inch (e.g., 0.01 inches, 0.1 inch, 0.5 inches, 1 inch, or any other value greater than or equal to 0.01 inches and less than or equal to 1 inch). In some embodiments, the width is greater than or equal to 0.02 inches and less than or equal to 1 inch (e.g., 0.02 inches, 0.05 inches, 0.1 inches, 0.5 inches, 1 inch, or any other value greater than or equal to 0.02 inches and less than or equal to 1 inch). In some embodiments, the width is greater than or equal to 0.04 inches and less than or equal to 0.08 inches (e.g., 0.04 inches, 0.05 inches, 0.06 inches, 0.08 inches, or any other width that is greater than or equal to 0.104 inches and less than or equal to 0.08 inches).

In some embodiments, a thickness of the wall structure 1036 (e.g., a thickness defined between the exterior surface 1038 and the interior surface 1039) is sized to maintain structural integrity of the wall structure 1036 during changes in pressure in the container 1000, such as changes in pressure resulting from changes in temperature in the container 1000, vacuum applied to the container 1000, etc. For example, during operation of the automated food processing system 100, hot fluids (e.g., hot water) can be introduced into the cavity 1040 of the container 1000, causing heat transfer to particles already present in the container 1000, resulting in increased pressure in the container 1000 that generates forces pushing outward against the interior surface 1039 of the container 1000. During blending of material within the container 1000, the temperature within the container 1000 may decrease, reducing the pressure within the container 1000, resulting in forces pushing against the exterior surface 1038 of the container 1000. If the thickness of the wall structure 1036 is less than a threshold thickness, then the wall structure 1036 may deform (e.g., bow, bend, tear, etc.), comprising the structural integrity of the container 1000 and thus the ability of the container 1000 to maintain a seal with the blade assembly 400, be used to contain material, etc. For example, if the thickness of the wall structure 1036 is less than a threshold thickness, then the wall structure 1036 may plastically deform due to heat transfer from hot water added into the container 1000. If the thickness of the wall structure 1036 is less than a threshold thickness, then the wall structure 1036 may crack during transport in cold storage.

In some embodiments, the container 1000 includes (e.g., is made from) a food-grade material, such as a food-grade biomaterial. For example, the interior surface 1039 can include material configured to maintain a food-safe environment within the container 1000, such as by not chemically interacting with food material.

In some embodiments, the mass of the container 1000 is less than 250 grams, 200 grams, 150 grams, 100 grams, 90 grams, 80 grams, 70 grams, 60 grams, 50 grams, 40 grams, 30 grams, 10 grams, amongst others. In some embodiments, the mass of the container 1000 can be greater than or equal to 2 grams and less than or equal to 100 grams. In some embodiments, a mass of the container 1000 is less than 40 grams. In some embodiments, a mass of the container is 50 grams. In some embodiments, the mass of the container is between 35 and 45 grams. In some embodiments, the container 1000 is sized for making a single serving of a smoothie drink or other edible product. In some embodiments, the material selected for the container 1000 is based on maintaining structural integrity, resisting tearing or compression, handling changes in pressure, or withstanding deformation due to the various operational forces discussed herein. In some implementations, the container can be made from a plastic (e.g., PET, PP). In some embodiments, the container 1000 can be made from a metal or metallic alloy. In some embodiments, the material is selected to have sufficient strength (e.g., tensile strength, malleability, pliability, etc.) to withstand operation in a range of temperatures from relatively cold temperatures (e.g., temperatures near or below a freezing point of water) for cold storage during transport, to relatively hot temperatures due to heat transfer from hot water introduced into the container 1000 (e.g., heat transfer from water having a temperature between 170 degrees Fahrenheit and a boiling point of water, etc.).

Referring now to FIGS. 23-27, embodiments of a container 1100 are illustrated. The container 1100 can be similar to containers 120 and 1000 described herein. As shown in FIG. 25B, similar to wall structure 1036 and lip portion 1028 of container 1000, container 1100 includes a wall portion 1136 that flares out to a lip portion 1128, and is continuous with a second surface 1130 of the lip portion 1128 opposite a first surface 1129 of the lip portion 1128.

Figure 25A:
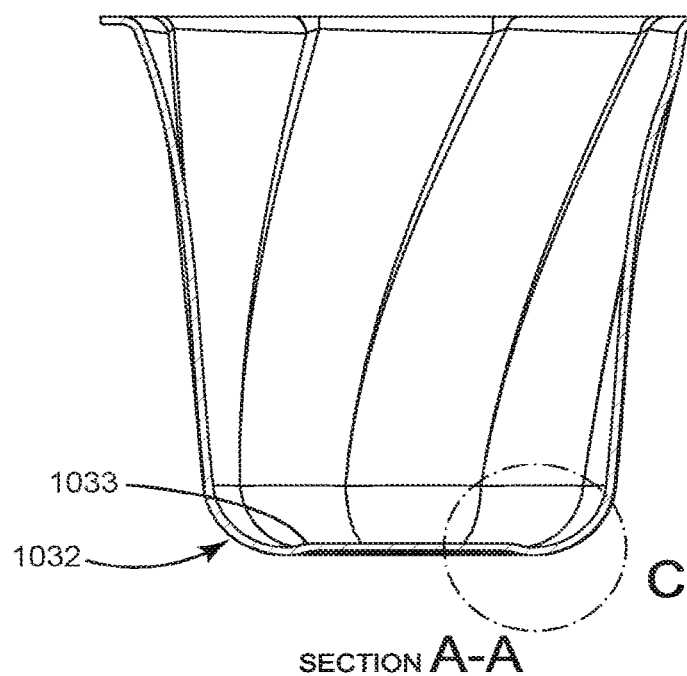
FIG. 25A is a sectional view of an embodiment of the container of FIG. 23.
Figure 25B:
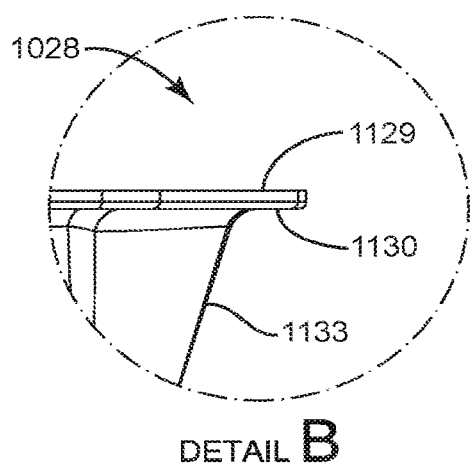
FIG. 25B is a detail view of an embodiment of a lip portion of the container of FIG. 23.
Figure 25C:
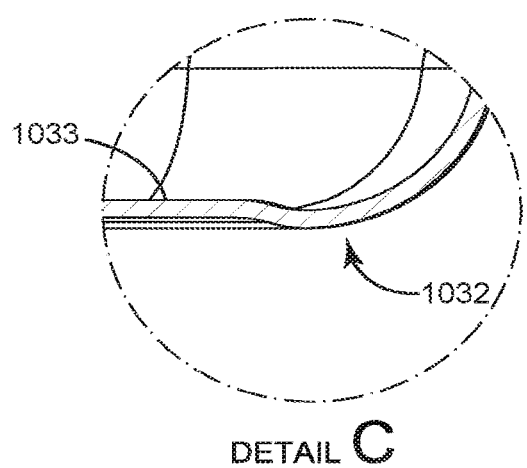
FIG. 25C is a detail view of an embodiment of a base portion of the container of FIG. 23.
Figure 26:
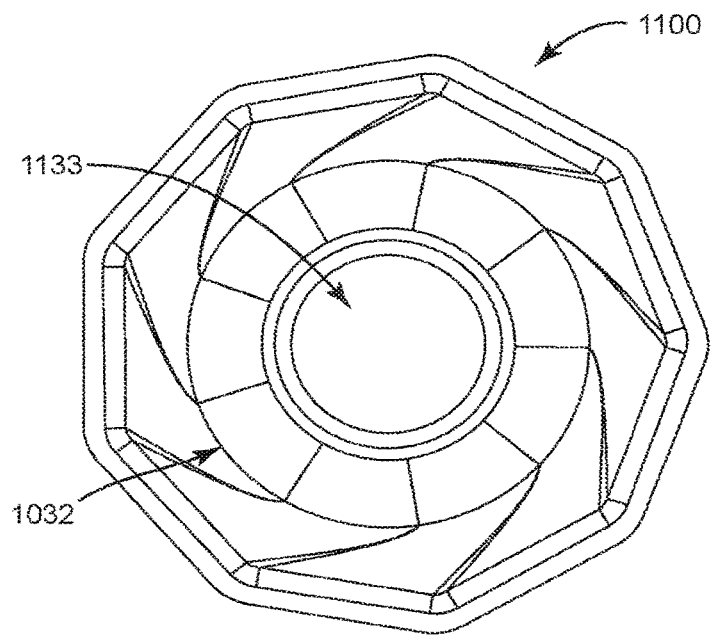
FIG. 26 is a top view of an embodiment of the container of FIG. 23.
Figure 27:
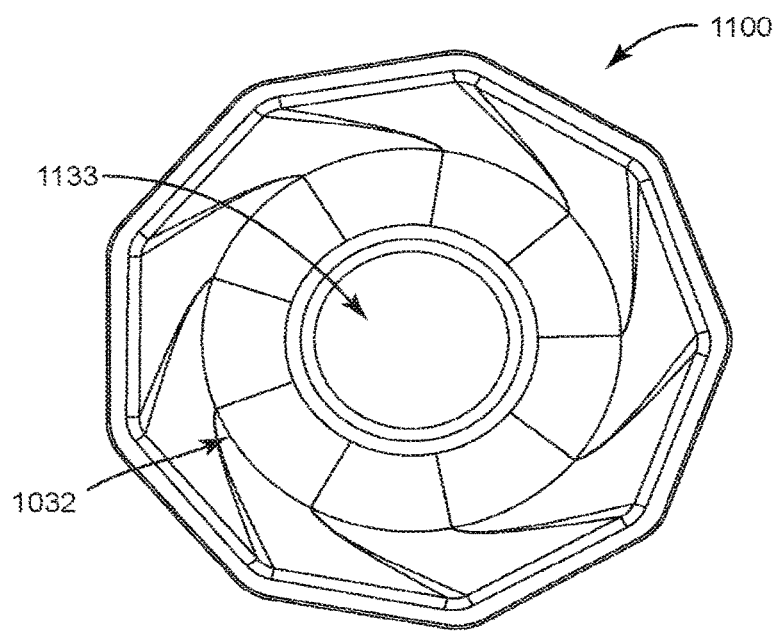
FIG. 27 is a bottom view of an embodiment of the container of FIG. 23.

The container 1100 can include a base portion 1132 having a raised base portion 1133. For example, as shown in FIG. 25C, the raised base portion 1133 is positioned in a central portion of the base portion 1132. The raised base portion 1133 can be configured to contact and/or engage an actuation mechanism of the container platform 300. For example, the raised base portion 1133 can be shaped to match a component of the container platform 300.

Figure 28:
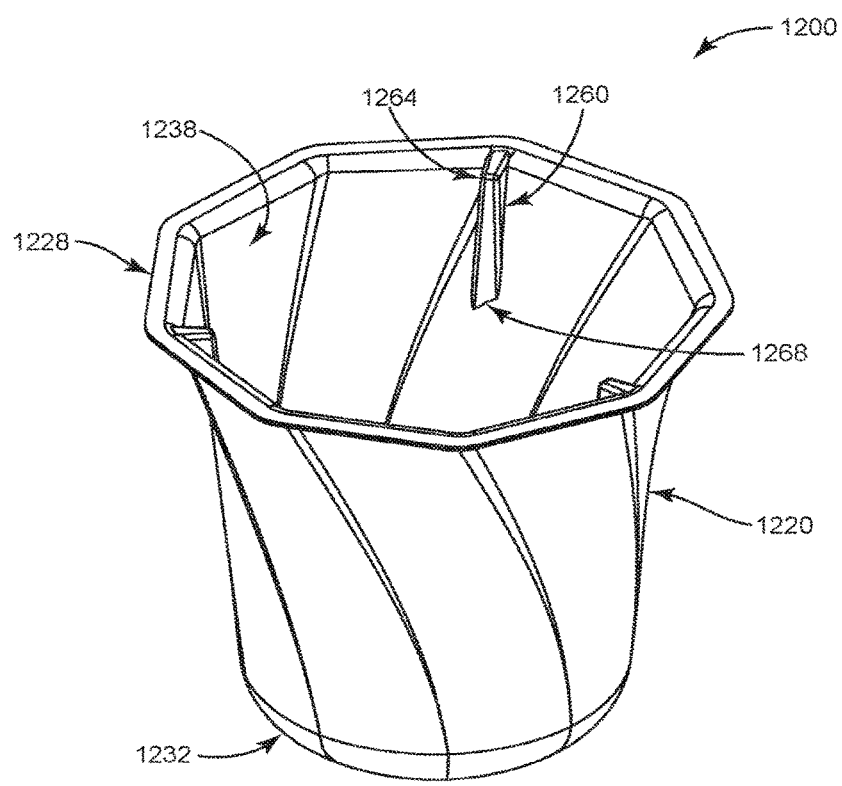
FIG. 28 is a perspective view of an embodiment of a container including turbulence enhancement features, for use with an automated food processing system.
Figure 29:
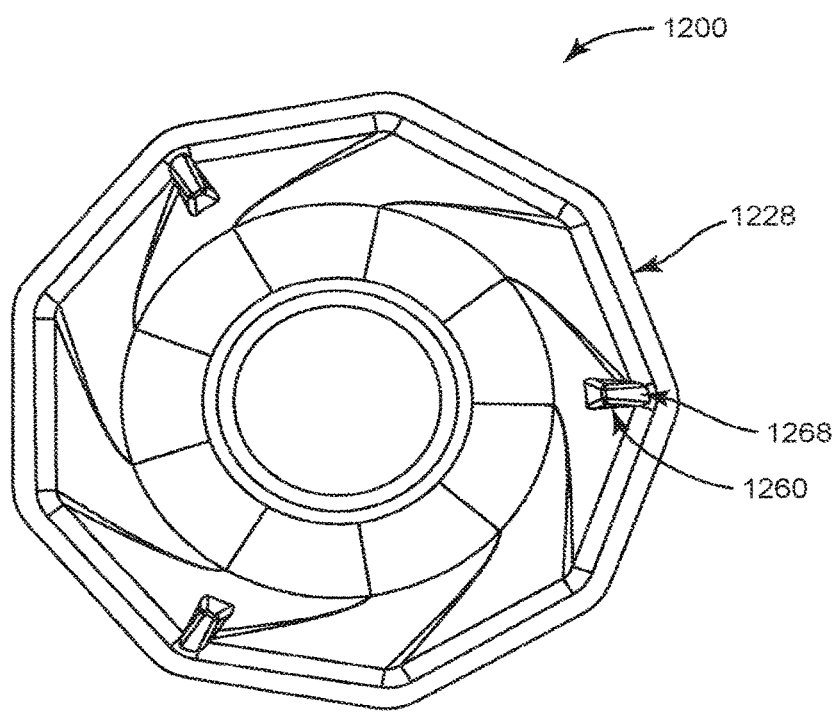
FIG. 29 is a top view of an embodiment of the container of FIG. 28.

Referring now to FIGS. 28-29, embodiments of a container 1200 are illustrated. The container 1200 can be similar to containers 120, 1000, and 1100 described herein. The container 1200 can include turbulence enhancement features 1260. The turbulence enhancement features 1260 can be configured to increase turbulence of materials in the container 1200 as the materials are processed (e.g., blended, etc.). By increasing the turbulence of materials in the container 1200, the turbulence enhancement features 1260 can increase mixing of the materials (e.g., cause turbulent mixing). This can decrease the time and/or energy required to process materials in the container 1200, as well as to provide a more uniform mixture after processing.

As shown in FIGS. 28-29, the turbulence enhancement features 1260 can be positioned on an interior surface 1238 of the body 1220 of the container 1200. The turbulence enhancement features 1260 can include a first end 1264 positioned adjacent to the lip portion 1228 and a second end 1268 positioned on a central portion of the interior surface 1238 (e.g., the turbulence enhancement features 1260 extend from the lip portion 1228 towards the base portion 1232). In some embodiments, the turbulence enhancement features 1260 are oriented parallel to a central axis passing through a center of the base portion 1232 and transverse to the base portion 1232.

Figure 30A:
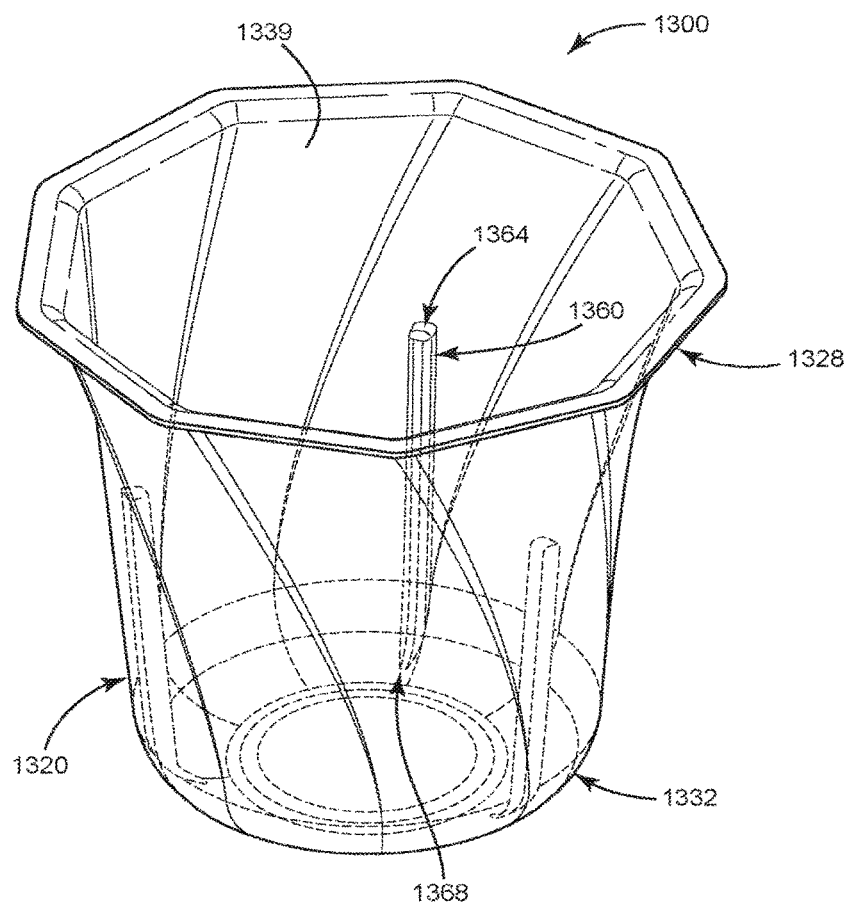
FIGS. 30A-30H illustrates various embodiments of containers including turbulence enhancement features, for use with an automated food processing system.
Figure 30B:
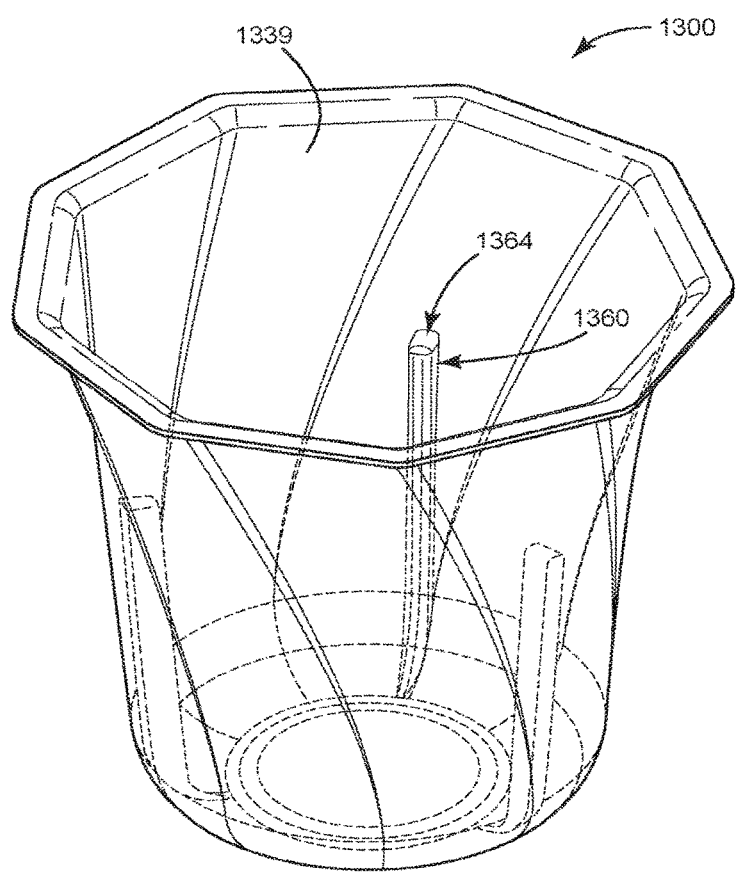
Figure 30C:
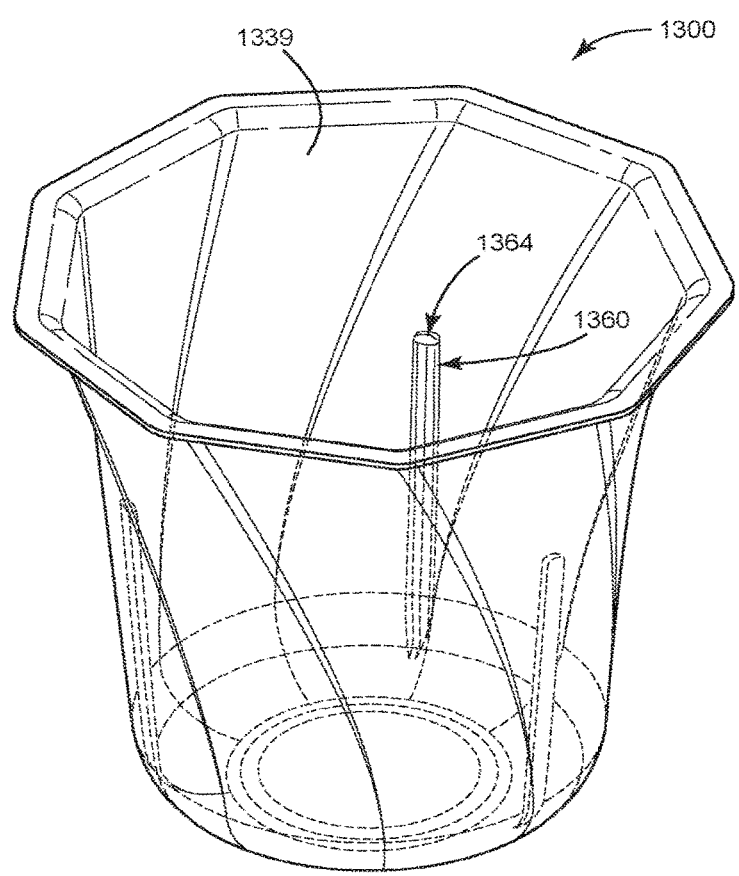
Figure 30D:
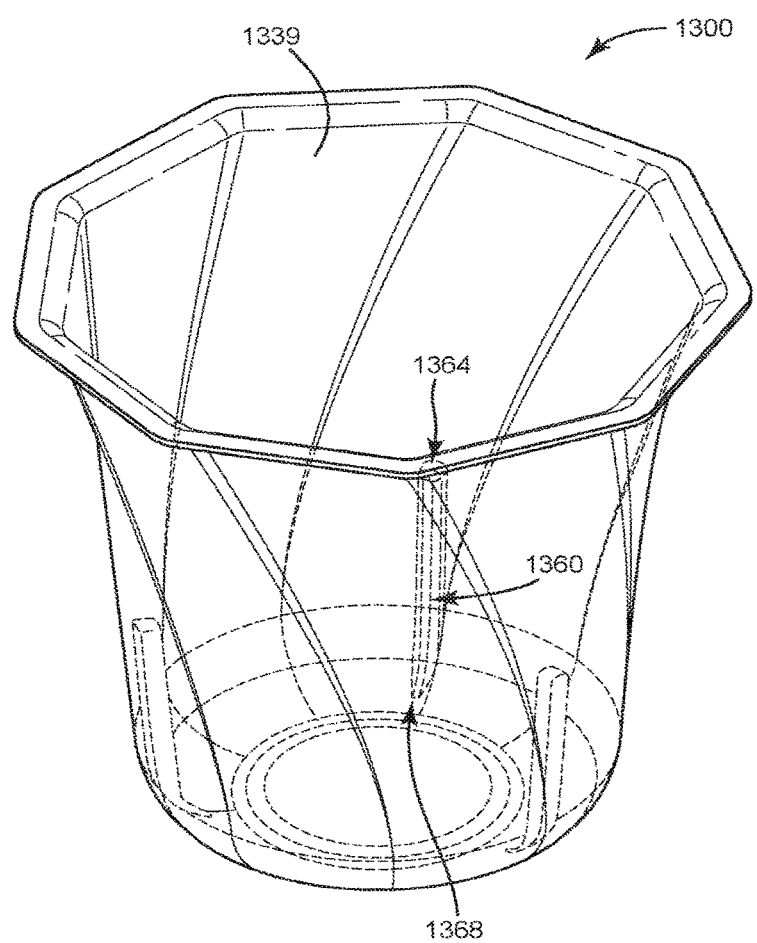
Figure 30E:
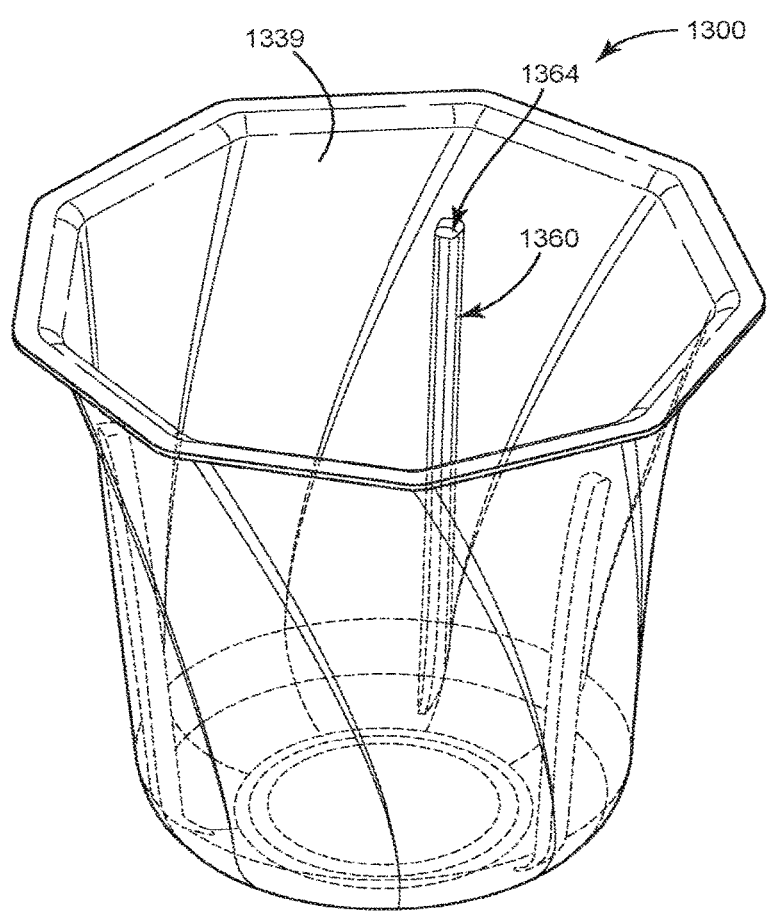
Figure 30F:
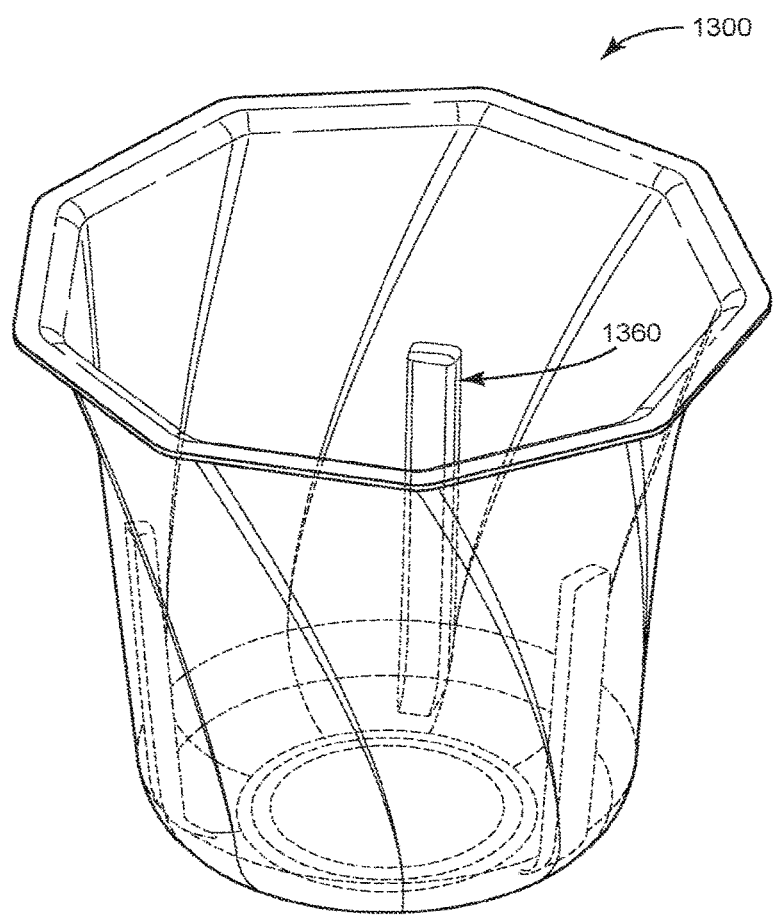
Figure 30G:
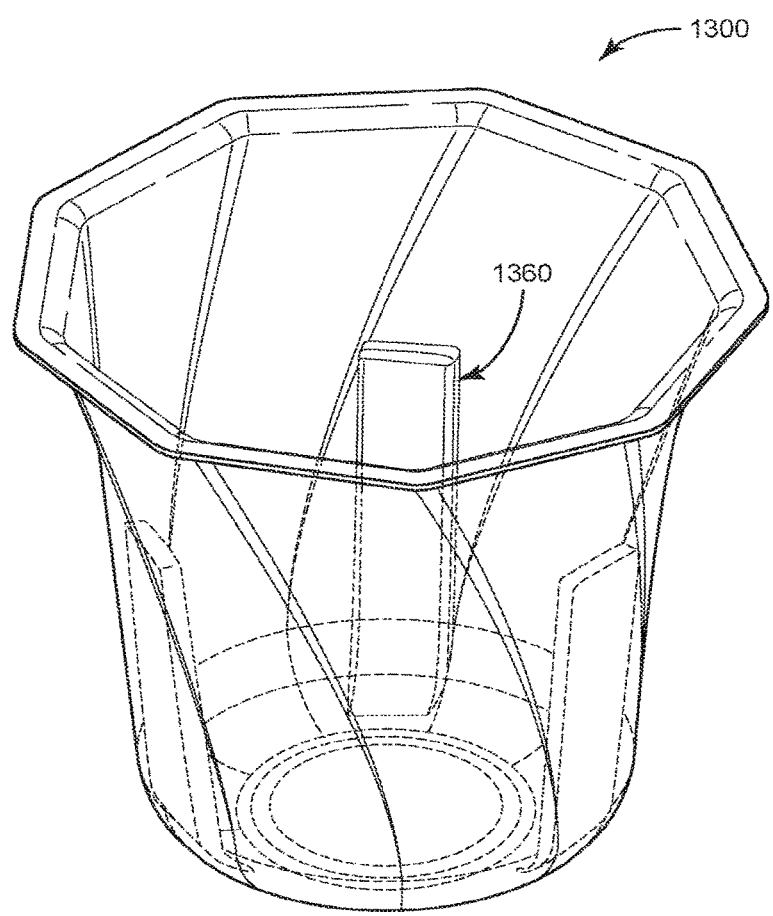
Figure 30H:
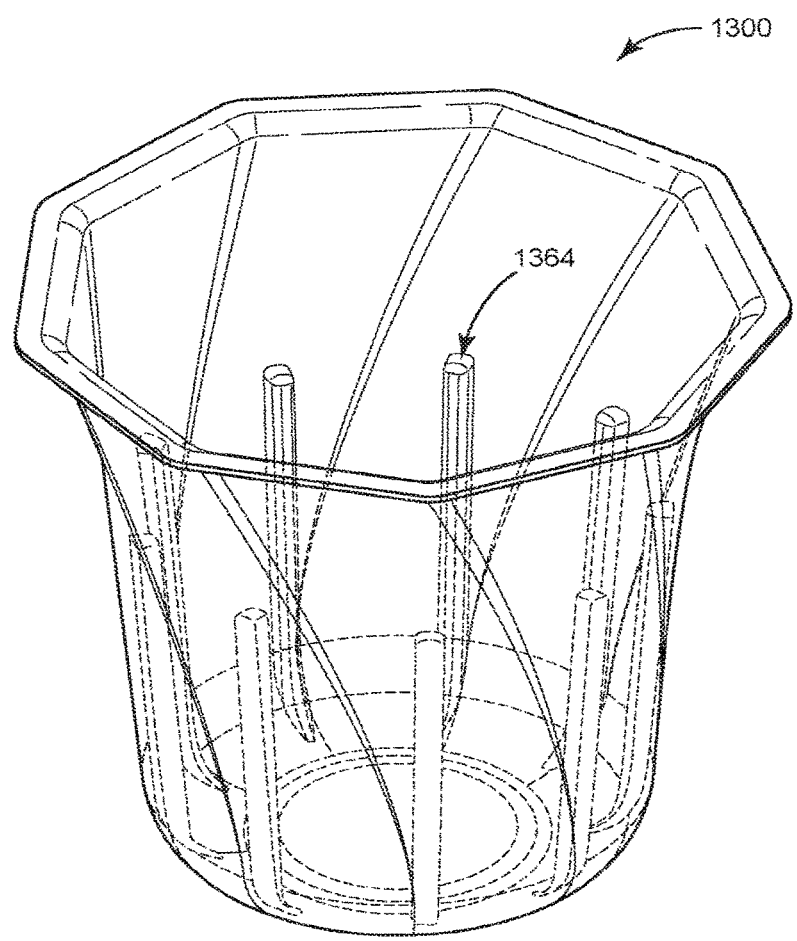

Referring now to FIGS. 30A-30H, various embodiments of containers 1300 having turbulence enhancement features 1360 are illustrated. The containers 1300 can be similar to containers 120, 1000, 1100, and 1200 described herein. The turbulence enhancement features 1360 can be similar to turbulence enhancement features 1260 described herein. As shown in FIG. 30A, the turbulence enhancement feature 1360 extends from a first end 1364 positioned on an interior surface 1338 of the container 1300 to a second end 1368 positioned adjacent to the base portion 1332. As shown in FIG. 30B, the first end 1364 of the turbulence enhancement feature 1360 can extend a greater distance from the interior surface 1338 relative to the first end 1364 shown in FIG. 30A. As shown in FIG. 30C, the first end 1364 of the turbulence enhancement feature 1360 can extend a lesser distance from the interior surface 1338 relative to the first end 1364 shown in FIG. 30A. As shown in FIG. 30D, the first end 1364 of the turbulence enhancement feature 1360 can extend a lesser distance along the interior surface 1338 from the second end 1368 relative to the turbulence enhancement feature 1360 shown in FIG. 30A. As shown in FIG. 30E, the first end 1364 of the turbulence enhancement feature 1360 can extend a greater distance along the interior surface 1338 from the second end 1368 relative to the turbulence enhancement feature 1360 shown in FIG. 30A. As shown in FIG. 30F, the turbulence enhancement feature 1360 can define a greater width relative to the turbulence enhancement feature 1360 shown in FIG. 30A. As shown in FIG. 30G, the turbulence enhancement feature 1360 can define a greater width relative to the turbulence enhancement features 1360 shown in FIGS. 30A and 30E. As shown in FIG. 30H, the number of turbulence enhancement features 1360 can be varied; for example, the number of turbulence enhancement features 1360 can correspond to the number of side portions 1322 of the container 1300 (e.g., one turbulence enhancement feature 1360 can be positioned on a portion of the interior surface 1338 corresponding to each side portion 1322, etc.). In some embodiments, the container 1300 includes at least two turbulence enhancement features In some embodiments, the container 1300 includes nine turbulence enhancement features 1360.

Figure 31A:
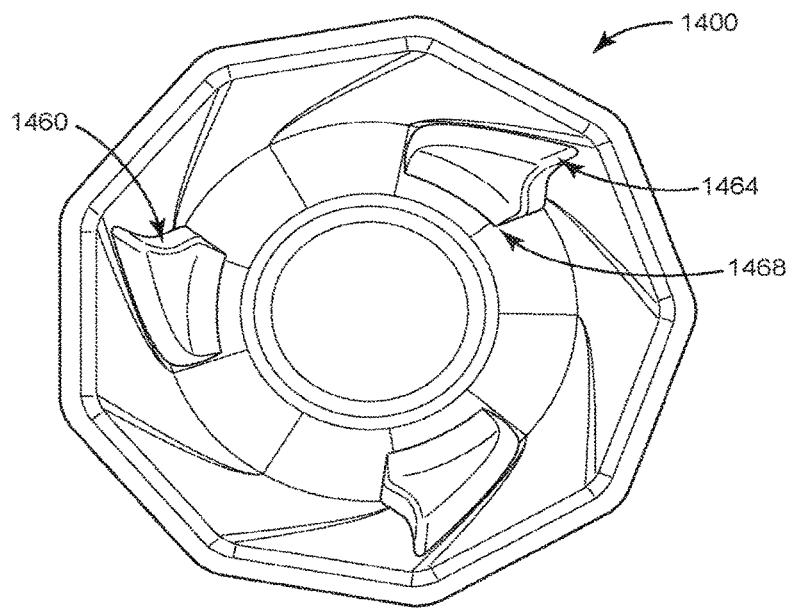
FIGS. 31A-31B are top views of an embodiment of a container including turbulence enhancement features, for use with an automated food processing system.
Figure 31B:
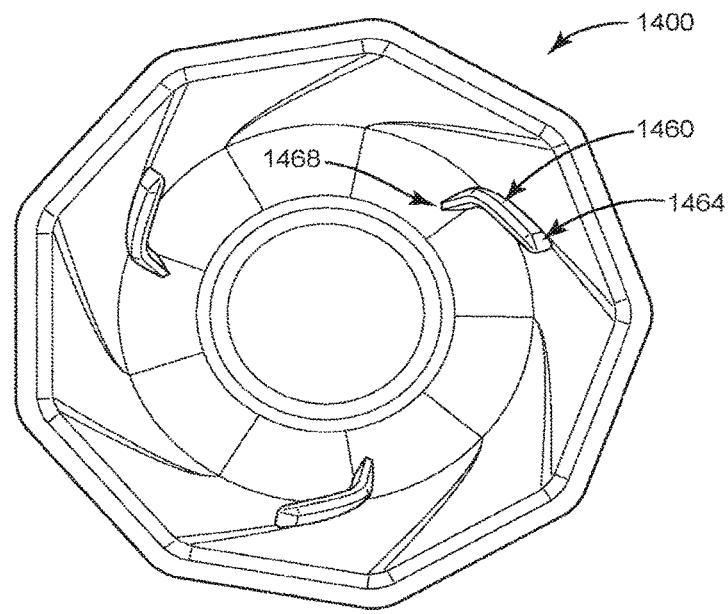

Referring now to FIGS. 31A-31B, various embodiments of containers 1400 having turbulence enhancement features 1460 are illustrated. The containers 1400 can be similar to containers 120, 1000, 1100, 1200, and 1300 described herein. The turbulence enhancement features 1460 can be similar to turbulence enhancement features 1260 and 1360 described herein. As shown in FIG. 31A, the turbulence enhancement feature 1460 extends from a first end 1464 (at which the turbulence enhancement feature 1460 tapers to a point) to a second end 1468 positioned adjacent to the base portion 1432. The tapering of the turbulence enhancement feature 1460 can follow a profile defining side portions 1422 of the container 1400. As shown in FIG. 31B, the turbulence enhancement feature 1460 is shaped to follow a path along an interior surface 1439 of the container 1400.

Figure 32:
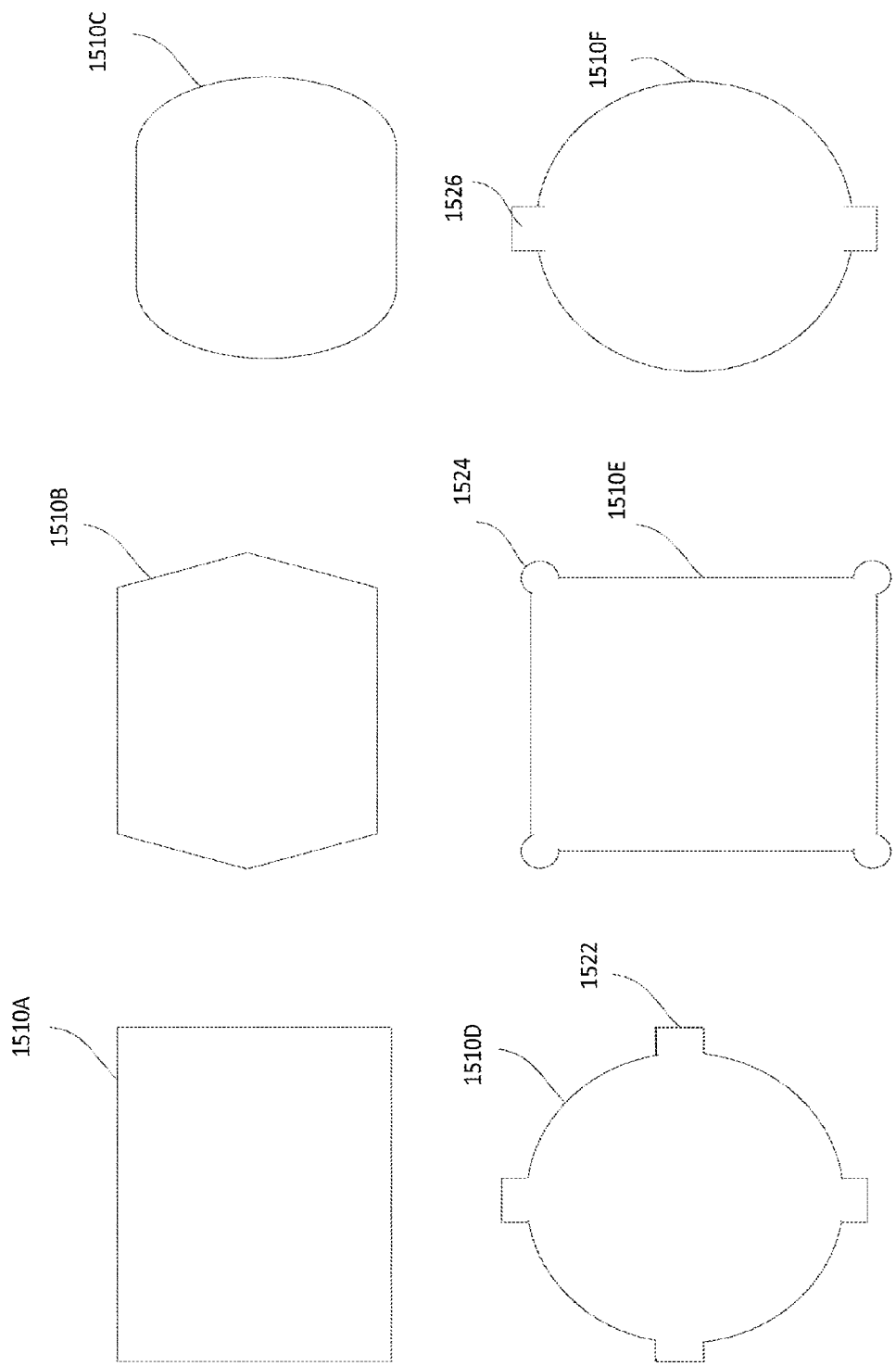
FIG. 32 are top views of various embodiments of containers for use with an automated food processing system.

Referring now to FIG. 32, various embodiments of containers are illustrated. The containers can be similar to containers 120, 1000, 1100, 1200, 1300, and 1400 described herein. The containers can include various profiles (e.g., geometries as seen from the top views shown in FIG. 32).

For example, the container can include a rectangular profile 1510A, a hexagonal profile 1510B, or a rounded rectangle or oval profile 1510C. The profile can include a circular profile 1510D with rectangular extensions 1520D, such as extensions configured to be coupled to the container receptacle 320. The profile can include a rectangular or square profile 1510E, with circular extensions 1520E positioned on corners of the profile 1510E. The profile can include a circular profile 1510F, with rectangular extensions 1520F. Various numbers and geometries of profiles and extensions and combinations thereof can be included.

In various embodiments, the containers described herein are configured to have different heights, such as different heights corresponding to different recipes or processing/preparation methods. In some embodiments, the container defines a height (e.g., a height from the second surface 1030 of the container 1000 to a plane defined by the base portion 1032). In some implementations, the height of the container 1000 is sized to correspond to a distance between a portion of the container platform 300 on which the base portion 1032 rests (e.g., to trigger an actuation switch) and a surface of the protrusion 322 contacted by the second surface 1030. In some embodiments, the height is greater than or equal to 1 inch and less than or equal to 8 inches. In some embodiments, the height is less than 8 inches, 7 inches, 6 inches, 5 inches, 4 inches, 3 inches, 2 inches, amongst others. In some embodiments, the height is greater than or equal to 3 inches and less than or equal to 4 inches. In some embodiments, the height is approximately 3.5 inches.

In various embodiments, the containers can include identification features configured to identify the material (e.g., foods) contained by the containers, such as for determining a processing/preparation method to be applied to the container and its contents. For example, the containers can include identification features such as colors, patterns, bosses, embosses, surfaces, etc. The automated food processing system 100 can include a sensor (e.g., image sensor, mechanical sensor, etc.) configured to receive identification information from the identification feature such that the automated food processing system 100 can identify the container and/or the contents of the container based on the identification feature, such as for determining a preparation/processing method to be applied to the container. In some implementations, the automated food processing system 100 can select a blend cycle from a plurality of blend cycle based on a sensor value corresponding to the identification feature determined via the sensor.

Figure 33A:
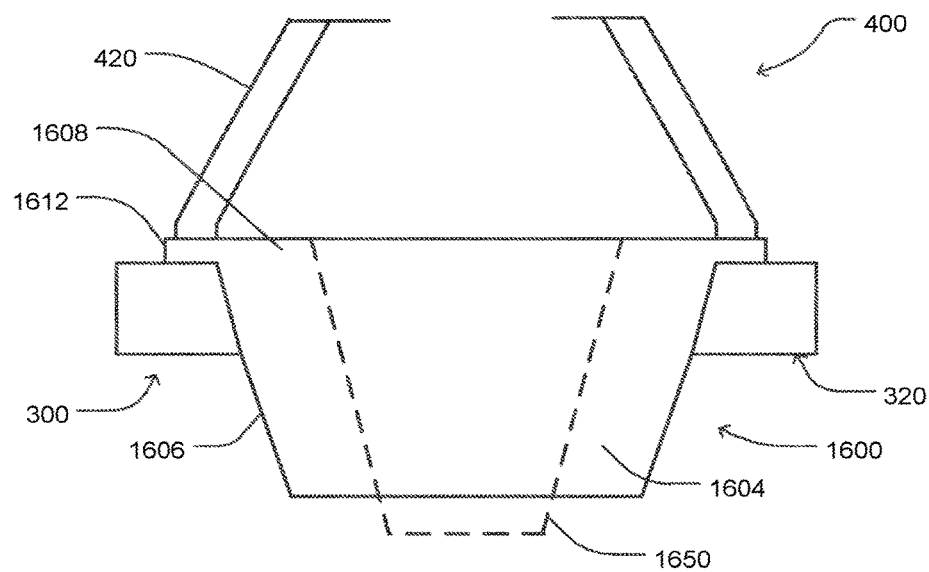
FIG. 33A is a side view of an embodiment of an adaptor device for a container secured by a container platform and blade assembly of an automated food processing system.
Figure 33B:
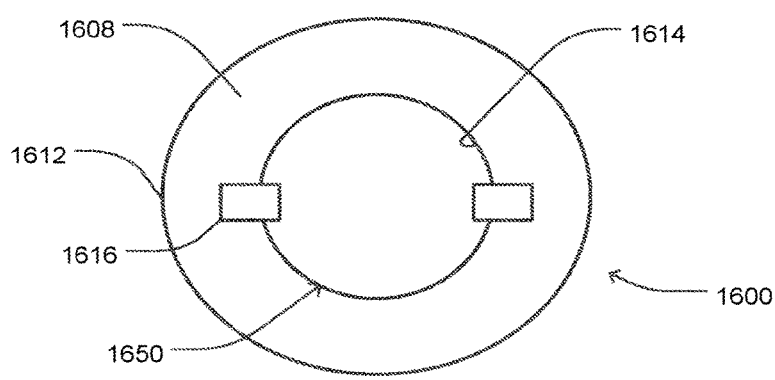
FIG. 33B is a top view of an embodiment of an adaptor device receiving a container for use with an automated food processing system.

14. Adaptor Configured for Use with Container and Automated Food Processing System Referring now to FIGS. 33A-33B, an adaptor device 1600 is illustrated. The adaptor device 1600 is configured to be attached to and/or support a container 1650 and to be received in a container receptacle of an automated food processing system (e.g., container receptacle 320 of automated food processing system 100). For example, if the container 1650 is not shaped to operate with the automated food processing system 100, then the adaptor device 1600 can be positioned on or about the container 1650 to enable the automated food processing system 100 to operate on the container 1650 in a manner analogous to what has been described for other containers herein (e.g., with container 1000). The container 1650 and features thereof can be similar to other containers described herein, except that the container 1650 is not sized or shaped to engage with or be received by the automated food processing system 100 or components thereof, such as if a diameter of a lip portion of the container 1650 is less than a diameter required for the container 1650 to be received by the container platform 300 and blade assembly 400 as shown for container 1000 in FIG. 22. The adaptor device 1600 can be sized and/or shaped to be supported by and/or engage the container receptacle 320. The adaptor device 1600 can define a length (e.g., a length in a direction transverse to a plane in which the adaptor device 1600 is supported by the container receptacle 320, a length of an adaptor body portion 1604) such that a bottom surface of the adaptor device 1600 can contact and/or engage a switch or sensor of the container platform 300, such as to actuate the switch or sensor. In some embodiments, the adaptor device 1600 is sized and/or shaped to be similar to the container 1000, such that the adaptor device 1600 can engage, couple to, be supported by, or otherwise interact with the automated food processing system 100 in a manner analogous to the container 1000, while supporting the container 1650 so that the automated food processing system 100 can process contents of the container 1650. The adaptor device 1600 (or the adaptor device 1600 when supporting the container 1650) can have a weight that is equal to a weight of the container 1000, so as to similarly trigger weight-based sensors of the automated food processing system 100. While FIG. 33B illustrates the adaptor device 1600 and container 1650 having circular rims or lip portions, in various embodiments, the adaptor device 1600 and container 1650 can have various shapes (e.g., an outer rim of the adaptor device 1600 can match the container receptacle 320, such as by having matching sides or edges, such as nine sides; an inner rim of the adaptor device 1600 can match or be adjustable to match any shape of a container; etc.). FIG. 33A illustrates the container 1650 supported by the adaptor device 1600 in dashed lines; as shown in FIG. 33A, in some embodiments, the container 1650 can extend beyond an end of the adaptor device 1600.

In some embodiments, the adaptor device 1600 includes an adaptor body portion 1604. The adaptor body portion 1604 can be similar to the body 1020 of the container 1000. For example, the adaptor body portion 1604 can include an outer surface 1606 that is configured to engage the container platform 300, such as by having a number of sides, edges, or other engagement features shaped to correspond to engagement features of the container platform 300. The adaptor body 1604 can include an inner surface 1614. The inner surface 1614 can be configured to engage an outer surface of the container 1650. For example, the inner surface 1614 can be sized and/or shaped to match the outer surface of the container 1650. The inner surface 1614 can include frictional engagement features (e.g., rough surfaces, etc.) configured to prevent rotation of the container 1650 relative to the adaptor device 1600, such as during a processing operation of the automated food processing system 100.

In some embodiments, the adaptor body 1604 includes compressible material (e.g., air, liquid, foam, gel, air pockets, etc.) between the inner surface 1614 and the outer surface 1606. The compressible material can allow the adaptor body 1604 to absorb forces generated in the container 1650 that can cause expansion of the container 1650 (e.g., forces due to an increase in pressure in the container 1650 during a processing operation of the automated food processing system 100). In some embodiments, the inner surface 1614 can be flexible (e.g., can include a flexible material such as a flexible plastic or metal), such that the inner surface 1614 flexes in response to an expansion of the container 1650. In some the adaptor body 1604 is configured to allow expansion of the container 1650 up to a threshold value above which the container 1650 deforms, bursts, or is otherwise irreversibly expanded, such as to prevent leaks of the container 1650.

In some embodiments, the adaptor device 1600 includes a lip portion 1608. The lip portion 1608 can be similar to the lip portion 1028 of the container 1000. For example, the lip portion 1608 can be configured to engage, contact, or otherwise be coupled with the container receptacle 320 and the blade assembly 400, such as for allowing the adaptor device 1600 (and the container 1650 with the adaptor device 1600) to be rotated. The lip portion 1608 can include lip engagement features 1612 that can be similar to the surfaces 1029, 1030 of the lip portion 1028, and can configured to be positioned adjacent to the container receptacle 320 and the blade assembly 400.

The dimensions of the adaptor device 1600 can vary (e.g., a length of the adaptor device 1600 or the adaptor body portion 1604 thereof), such that in some embodiments, the adaptor device 1600 has a ring-like shape (e.g., the adaptor device 1600 is substantially defined by the lip portion, and the body portion 1604 extends a relatively small distance, e.g. a distance similar in scale to the container receptacle 320 as shown in FIG. 33A); in some embodiments, the adaptor device 1600 has a shape analogous to the container 1000, such as for the adaptor body portion 1604 to contact a switch or sensor of the container platform 300.

In some embodiments, the adaptor device 1600 includes retaining features 1616 (e.g., snaps, tabs, latches, locks, etc.) configured to engage, retain, attach to, support, lock on, or otherwise couple the container 1650 to the adaptor device 1600. For example, the retaining features 1616 can be configured to apply a force to an inner surface of the container 1650 to press the container 1650 to the inner surface 1614 of the adaptor device 1650. The retaining features 1616 can extend along an axis transverse to the plane shown in FIG. 33B, such that a portion of the inner surface 1614 forms a portion of a lumen that is also formed by the blade assembly 400 and the container 1650; the container 1650 can thus be positioned below the lip portion 1028.

In some embodiments, the adaptor body portion 1604 does not include a bottom surface (e.g., a bottom surface opposite the blade assembly 400 when the adaptor device 1600 is received in the container platform 300), or an opening is defined in the bottom surface. This can allow the container 1650 to extend beyond dimensions of the adaptor device 1600. For example, a bottom surface of the container 1650 can engage a switch or sensor of the container platform 300, or indicator information on the bottom surface of the container 1650 can be detected by a sensor of the container platform 300.

In some embodiments, a bottom surface of the adaptor body portion 1604 is transparent. This can allow indicator information on a bottom surface of the to be detected by a sensor of the container platform 300 through the bottom surface.

In some embodiments, the inner surface 1614 and/or the retaining features 1616 are adjustable in position. For example, a diameter of the inner surface 1614 and/or the retaining features 1616 can be increased or decreased, such as for sizing the adaptor device 1600 to receive containers 1650 of varying diameters.

In some embodiments, the adaptor device 1600 can be permanently fixed (e.g., attached, engaged, coupled, etc.) to the container receptacle 300 or the blade assembly 400. The adaptor device 1600 can be secured to the container receptacle 300 or the blade assembly 400 by fastening members (e.g., screws, bolts, etc.). In some embodiments, the adaptor device 1600 can be removably attached to the container receptacle 300 or the blade assembly 400 (e.g., using removable fastening members).

15. Systems and Methods for Declumping

In some embodiments, the automated food processing system 100 and/or a container (e.g., container 1000), can be configured to declump materials (e.g., prevent clump, reverse clumping, break up clumped material) in the container 1000, such as to declump materials during a blend cycle. The automated food processing system 100 can perform the functions described herein (or cause components of the automated food processing system 100 to perform the functions) by transmitting control signals for controlling operation of various components (e.g., the processor 180 can execute instructions, such as a blend cycle schedule, to generate control signals based on the instructions and transmit the control signals to corresponding components, such as the platform actuator 500 and blade actuator 800; the processor 180 can also receive signals, such as signals from sensors, and execute instructions and/or generate control signals at least in part based on the received signals). The automated food processing system 100 can trigger various declumping actions, such as shaking the container 1000, changing a state of the material in the container 1000 (e.g., by injecting fluid or other materials into the container 1000), or causing the container 1000 to be inverted to dislodge clumped material (e.g., inverted by platform actuator 500).

In some embodiments, a structural feature of the container 1000 is configured to declump materials. For example, an inner surface of the container 1000 can include ridges, frictional surfaces, or other features configured to prevent or reverse clumping of material in the container 1000. In some embodiments, the turbulence enhancement features 1260 described herein are configured to prevent or reverse clumping. The structural feature of the container 1000 can extend from the inner surface 1039 of the container 1000 into the cavity 1040, such that material moving within the cavity 1040 contacts the structural feature and is redirected by the structural feature. In some embodiments, the structural feature is or includes a surface having a coefficient of friction greater than a coefficient of friction of the inner surface 1039, such that a friction force occurs between material in the cavity 1040 and the structural feature, redirecting the material (the friction force being relatively greater than a friction force between the inner surface 1039 and the material). In some embodiments, the coefficient of friction of the structural feature is less than the coefficient of the inner surface 1039; the selection of the coefficient of friction of the structural feature can be determined based on the material in the container 1000 (e.g., if bonding between particles of the material is a determining factor of clumping, then relatively high friction structural features can facilitate break-up of the material; if the speed at which the material can be moved within the container 1000 is a determining factor of clumping, then relatively low friction structural features can reduce drag against the material to increase the speed at which the material can be moved within the container 1000). For example, the structural features can be configured to facilitate break-up of clumps without impeding movement of material in the container 1000.

In some embodiments, the blade assembly 400 can be designed or configured to declump material being blended by the automated food processing system 100. For example, a surface of the blade recess 426 (e.g., an inner surface facing the cavity 1040 of the container 1000) can have or be coated with a material that reduces, prevents, or reverses clumping. In some embodiments, the inner surface of the blade recess 426 is a metal alloy, such as stainless steel.

In some embodiments, the automated food processing system 100 is configured to change a state of the material in the container 1000 to declump the material. For example, the automated food processing system 100 can inject a fluid into the container 1000, such as by injecting a fluid via the fluid dispenser 600. The fluid can be configured to declump the material. For example, the fluid can have a relatively greater temperature relative to the material in the container 1000, facilitating break-up of material (e.g., facilitating break-up of solidified or frozen material). The fluid can be injected at a high pressure or velocity such that the fluid mechanically breaks up the material (e.g., the fluid applies a force to the material to break through a relatively solid boundary of the clumped material, etc.). In some embodiments, fluid injection is triggered based on a determined state of the material in the container, such as by determining that the material is solid or frozen as disclosed herein.

In some embodiments, the automated food processing system 100 is configured to declump material within the container 1000 by shaking the container 1000. For example, the automated food processing system 100 can include an agitation device (e.g., a device configured to rotate or oscillate about an axis of the container 1000, the device being mechanically coupled to the container 1000 such that the rotation or oscillation translates the container 1000 about the axis) positioned adjacent to the container 1000 when the container 1000 is received by the container platform 320, shaking the coupled container 1000 and blade assembly 400, which can function to dislodge clumped, unblended materials, such as materials that are proximate to a bottom portion of an interior of the container 1000 or stuck to the interior surface 1039 of the container 1000. The container 1000 and blade assembly 400 can be shaken along an axis of inversion, along an axis perpendicular to the inversion axis, or shaken in any other suitable manner.

Figure 34:
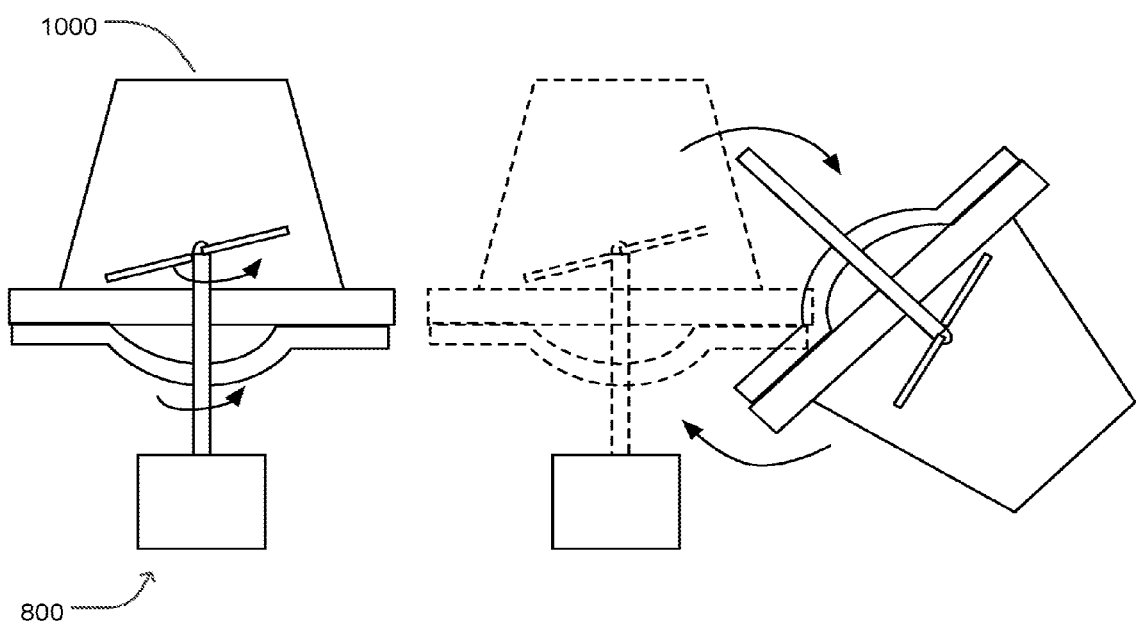
FIG. 34 is a schematic diagram of an embodiment inversion process for declumping material in a container by an automated food processing system.

In some embodiments, the automated food processing system is configured to declump material within the container 1000 by inverting the container 1000 (e.g., inverting the container 1000 and/or the blade assembly 400 about an inversion axis, such as an inversion axis perpendicular to a direction defined by gravity). For example, as shown in FIG. 34, the container 1000 and blade assembly 400 can be reverted (e.g., back to the starting position), then inverted (e.g., back to the blending position), wherein the unit can be reverted at a predetermined speed or acceleration, inverted at a predetermined speed or acceleration, or actuated at any other suitable pace. The predetermined speed or acceleration can be selected based on the material to be blended (e.g., specified by the recipe, selected based on the clumping likelihood of the material, etc.), be constant for all blend cycles, or otherwise determined. The material can be blended when the container 1000 is in the reverted position (e.g., in variations where the blade actuator 800 is coupled to the blade assembly 400 and/or the container 1000 via the blade assembly 400), or remain unblended.

In some embodiments, an inversion axis is defined in relation to a direction defined by gravity. For example, the inversion axis can be perpendicular or otherwise transverse to the direction defined by gravity. The inversion axis can be an axis about which the platform actuator 500 rotates the container 1000 and/or the blade platform 420 (e.g., pivots the blade platform 420 as described in Section 7), such as an axis approximately located in a plane defined by the blade platform 420 or defined by where the platform actuator is coupled to the container platform 300. The inversion axis can pass through a point located at or approximately at a point at which the blade assembly 400 contacts the container 1000.

In some embodiments, the system 100 is configured to cause inversion by actuation of the platform actuator 500. For example, the platform actuator 500 can receive a control signal indicating instructions to invert the container 1000 and invert the container 1000 based on the instructions. In some embodiments, the blade actuator 800 receives a signal including instructions to decouple from the blade assembly 400 when an inversion takes place. For example, processor 180 can send a first control signal including instructions to decouple to the blade actuator 800, and send a second control signal including instructions to invert to the platform actuator 500. In some embodiments, the second control signal is sent after a predetermined period of time after the first control signal (e.g., a predetermined period of time corresponding to a time required to decouple the blade actuator 800, a time required to decouple the blade actuator 800 plus a buffer time, etc.). In some embodiments, after inversion, the platform actuator 500 can receive a control signal indicating instructions to revert the container 1000 (e.g., revert the container to a blending position, the processing position described herein, etc.). The blade actuator can receive a control signal indicating instructions to recouple to the blade assembly 400 and/or to rotate the blades 440 of the blade assembly. For example, the processor 180 can send a third control signal including instructions to revert the container 1000 to the platform actuator 500, and send a fourth control signal including instructions to recouple to the blade assembly 400 and/or restart rotation of the blades 440 to the blade actuator 800. In some embodiments, the fourth control signal is sent after a predetermined period of time after the third control signal (e.g., a predetermined period of time corresponding to a time required for the platform actuator 500 to revert the container 1000; a time required for the platform actuator to revert the container 1000 plus a buffer time, etc.). The control signals can include the respective predetermined periods of time.

In some embodiments, the platform actuator is configured to perform an inversion (e.g., rotate from processing position) or a reversion (e.g., rotate to processing position) for a predetermined period of time. The predetermined period of time can be a set time (e.g., less than one second, 1 second, 2 seconds, 3 seconds, etc.). The predetermined period of time can be a function of a time required for material in the container 1000 to dislodge or declump. The predetermined period of time can be a function of the container 1000 (e.g., a structural integrity of the container 1000; a known or expected friction force securing the container 1000 to the blade platform 420 and the container receptacle 320, such that a rate of rotation of the container 1000 is limited so that the container 1000 does not slip during inversion; etc.) For example, the processor 180 can be configured to determine the predetermined period of time based on the material in the container 1000, such as by executing an algorithm to determine the predetermined period of time, or by performing a lookup to retrieve the predetermined period of time, based on the material in the container 1000. The processor 180 can determine the predetermined period of time based on a state of the material (e.g., temperature or pressure detected within the container 1000, etc.). The control signals sent to the platform actuator 500 can include the predetermined periods of time.

In some embodiments, the platform actuator 500 is configured to invert the container 1000 by rotating the container platform 300, blade assembly 400, and/or container 1000 by an angle relative to the processing position. For example, FIG. 34 shows the container 1000 and blade actuator 800 in a frame of reference oriented relative to the processing position (e.g., the frame of reference has been normalized relative to the processing position shown in FIG. 11, etc.). The angle can be a predetermined angle (e.g., an angle between zero degrees and a position at which the container 1000 is loaded as shown in FIG. 3, such as an angle between zero degrees and an angle defined by a full range of motion of the platform actuator 500). For example, the angle can be 45 degrees, 90 degrees, 135 degrees, etc. The angle can be determined based on various factors, including a force required to declump material in the container 1000 and the time required to perform the inversion. For example, as the angle of inversion increases, the instantaneous and/or cumulative effect of gravity forces applied to the material in the container 1000 can increase; as the angle of inversion increases, more time can be required to perform the inversion (which can cause a longer pause in the blend cycle).

The automated food processing system 100 can be configured to trigger a declumping action based on various conditions, such as at least one of a blend cycle schedule (e.g., instructions included in a blend cycle schedule) or a feedback signal. The action can be triggered based on a difference between an anticipated state of the material being processed and an actual state of the material being processed. In some embodiments, the state of the material being processed is a consistency (e.g., viscosity, emulsion consistency). The consistency can be determined based on sound emitted from the container 1000 or from the blade actuator 800, based on a back EMF of the blade actuator 800, based on a torque on the blade assembly 400 or the blade actuator 800, etc. In some embodiments, the state of the material being processed is a local density or a global density.

In some embodiments, the declumping action can be triggered at various points in time during a blend cycle. For example, the declumping action can be triggered at an absolute time difference relative to a start or finish of the blend cycle (e.g., 1 second, 2 second, 5 seconds, 20 seconds, 30 seconds, 60 seconds, etc. after the start or before the finish of the blend cycle); or a relative time difference (e.g., 5% through the blend cycle, 25% through the blend cycle, 50% through the blend cycle, 75% through the blend cycle, 95% through the blend cycle, etc.).

In some embodiments, the declumping action (e.g., inversion by the platform actuator 500) is triggered based on a feedback signal. The feedback signal can be determined based on blending information detected by a sensor. The blending information can correspond to a state of the material being processed. For example, the sensor can be configured to measure a local density or a global density of the material being processed within the container 1000 (e.g., a sensor that outputs a signal into the container 1000 and generates a feedback signal based on a return signal from the container 1000; a sensor that is calibrated to determine a state of the material being processed based on information detected outside of the container 1000, such as sound generated by the container 1000 or components of the automated food processing system 100; etc.). The blending information can correspond to a state of an actuator driving the blade assembly 400 (e.g., blade actuator 800). For example, the blending information can correspond to a load or current draw of the blade actuator 800, such as if the load or current draw exceeds a maximum threshold or an expected threshold for the blend cycle (e.g., a load or current draw sensing circuit can be electronically coupled to the blade actuator 800 or to a power source for the blade actuator 800 and can output an indication of the load or current draw, such as by outputting a voltage, to the processor 180) for processing by the processor 180). The blending information can correspond to a difference between an actual rate of rotation of the blade actuator 800 and an expected rate of rotation of the blade actuator 800 for a point in time during a blend cycle. For example if the blending information indicates that the actual rate of rotation of the blade actuator 800 is less than threshold percentage of the expected rate of rotation, then the declumping action can be triggered.

In some embodiments, a target or predicted consistency of the material in the container 1000 can be determined based on the blend cycle (or a schedule thereof). For example, the target consistency can be determined for the conclusion of the blend cycle, for particular points or times throughout the blend cycle, or continuously from the start to the conclusion of the blend cycle, such as in the form or a graph, chart, or table. For example, the blend cycle schedule can include a target current draw of the blade actuator 800 for achievement of a target consistency of the material in the container 1000; in this example, the automated food processing system 100 receives a signal indicating a current draw of the blade actuator 800, such as to monitor the current draw, terminates the blend cycle for the container 1000 early if the target current draw specified in the blend cycle schedule is achieved and sustained (e.g., for a threshold period of time), and extends the final actuation period of the blend cycle for the container 1000 until the target current draw is achieved and sustained (e.g., for a threshold period of time). In some embodiments, the blend cycle schedule specifies a target current draw of the blade actuator 800 for each actuation period of the blend cycle schedule. For example, for each actuation period of the blend cycle schedule executed for the container 1000, the automated food processing system 100 receives a signal indicating a current draw of the blade actuator 800, terminates the current actuation period if the target current draw specified in the blend cycle schedule for the current actuation period is achieved and sustained (e.g., for one second), and extends the current actuation period of the blend cycle until the target current draw for the current actuation period is achieved and sustained (e.g., for one second).

In some embodiments, the blend cycle schedule specifies a first actuation period, and a minimum current draw to be detected for the blade actuator 800, to complete the first actuation period (e.g., the first actuation period is determined to be complete based on an instantaneous current draw (or a time-averaged current draw over a period of time preceding the measurement point) exceeding the minimum current draw). For example, the system 100 actuates the blade actuator 800, monitors a current draw of the blade actuator 800, and maintains actuation of the blade actuator 800 (e.g., at 100% power) until the minimum current draw specified for the first actuation period is detected. In some embodiments, the blend cycle schedule can specify a pulse schedule for the blade actuator 800 (e.g., oscillating between 100% power and 0% power at the blade actuator at a rate of 0.5 Hz as a square, sine, or sawtooth function) until a minimum current draw of the blade actuator 800 is detected, followed by a series of actuation periods (as described above) to be executed once the minimum current draw for the blade actuator 800 is detected. For example, once the blade platform 420 is latched to the container platform 300 to seal the container 1000 (and the container 1000 inverted), the automated food processing system 100 can thus implement the blend cycle schedule by pulsing the blade actuator 800, monitoring current (i.e., amperage) supplied to the blade actuator 800 as the blade actuator 800 is pulsed, identifying an instance as which the current draw of the blade actuator 800 exceeds the minimum current draw specified in the blend cycle schedule, and then executing blade actuator power and duration specifications for each actuation period defined in the blend cycle schedule until the blend cycle schedule is complete.

In some embodiments, the automated food processing system 100 can determine if a frozen or otherwise substantially solid mass within container 1000 has been drawn into one or more of the blades 440 or a portion of the lumen defined by the blade recess 426 based on a current draw of the blade actuator 800 (e.g., electric motor). For example, an instance of spiking current draw at the blade actuator 800 can occur during a blend cycle when a substantially solid or frozen mass within the container 1000 or the blade recess 426 impacts the blades 440 as the blades 400 are spinning, thereby indicating that a frozen or otherwise substantially solid mass in the base of the container 1000 has released from an inner surface of the container 1000 (e.g., inner surface 1039) and is thus accessible by the blades 440 for blending. However, lack of a significant spike in current draw at the blade actuator 800 during a blend cycle may indicate that a frozen or otherwise substantially solid mass in the base of the container 1000 has not released from inner surface 1039 of the container 1000 and is therefore not available to the blades 440 for blending, thereby preventing complete blending of the contents of the container 1000. The automated food processing system 100 can monitor current draw of the blade actuator 800 to detect a current draw (or current spike) event indicative that substantially all contents of the container 1000 are accessible to the blades 440 for blending, and the automated food processing system 100 can modify the blend cycle schedule—such as by extending a duration of an actuation period or by adding a pulsing actuation period to the blend cycle schedule—to achieve a suitable current draw (or current spike) event, such as a minimum current draw specific to the type of material (e.g., type of beverage) corresponding to the container 1000 and/or as specified in the blend cycle schedule selected for the container 1000.

In some embodiments, the blend cycle schedule can specify a target current-time (e.g., 'amps-seconds') value for each actuation period of the blend cycle schedule; and, for each actuation period in the blend cycle schedule executed by the automated food processing system 100 to blend contents of the container 1000, the automated food processing system 100 can integrate a total current draw of the actuator over time, terminate a current blend cycle schedule once a calculated current-time value for the current actuation period reaches (or exceeds) the corresponding target current-time specified in the blend cycle schedule, and then execute the subsequent actuation period specified in the blend cycle schedule until the blend cycle schedule is complete.

In some embodiments, the blend cycle schedule can include a curve defining target current draw over time for each actuation period of the blend cycle schedule; and, for each actuation period in the blend cycle schedule executed by the automated food processing system 100 to blend contents of the container 1000, the automated food processing system 100 can adjust—substantially in real-time—a voltage supplied to the blade actuator 800 during a current actuation period of the blend cycle to map an actual current draw of the blade actuator at a current time to the target current draw specified for the current time in the corresponding target current draw/time curve.

In some embodiments, the blend cycle schedule can specify a target rotational speed (e.g., "RPM") of the blades 440, a target decrease in rotational speed of the blades 440 (due to an impact with a solid or frozen mass within the vessel), a target total number of blade rotations, a curve defining blade rotations over time, or one or more other rotation or speed parameters of the blade for one or more actuation period of the blend cycle schedule; and the automated food processing system 100 can interface with an encoder, tachometer, or other sensor coupled to the blade actuator 800 or to the driveshaft 460 to track rotations and/or speed of the blade. The automated food processing system 100 can implement methods and techniques similar to those described above to manipulate a voltage or current supplied to the blade actuator 800 and/or to manipulate a duration of one or more actuation periods of the blend cycle schedule to achieve the rotation or speed parameters defined in the blend cycle schedule selected for the container 1000.

In some embodiments, one or more declumping actions can be performed in sequence or concurrently. For example, while the container 1000 is inverted, fluid can be injected into the container 1000 and/or the container 1000 can be agitated. While the container 1000 is being agitated, fluid can be injected into the container 1000.

The systems and methods of the disclosure can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with systems and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor 180, though any suitable dedicated hardware device can (alternatively or additionally) execute the instructions.

Although omitted for conciseness, the preferred embodiments include every combination and permutation of the various system components and the various method processes.

As a person skilled in the art will recognize from the previous detailed description and from the figures and claims, modifications and changes can be made to the embodiments of the disclosure without departing from the scope of this disclosure as defined in the following claims.

We claim:

1. A system for processing foodstuffs, comprising:
a container platform defining a container receptacle configured to receive a container when the container platform is at a loading position;

a blade assembly including a set of blades configured to rotate to process the foodstuffs;

a blade actuator configured to rotate the blades;

a blade platform to which the blade assembly is mounted;

a platform actuator configured to move the blade platform between a blade engagement position at which the blade assembly is coupled to the blade actuator and a container engagement position at which the blade platform is configured to couple to the container platform when the container platform is at the loading position; and a processor configured to:
cause the platform actuator to move, prior to a first actuation of the blade actuator for the blend cycle, the blade platform from the container engagement position to the blade engagement position;
cause the first actuation of the blade actuator, the first actuation including coupling the blade actuator to the blade assembly;
subsequent to the first actuation of the blade actuator, cause the platform actuator to move the blade platform away from the blade engagement position towards the container engagement position;
cause the blade platform to return to the blade engagement position;
cause a second actuation of the blade actuator subsequent to the blade platform returning to the blade engagement position, the second actuation including recoupling the blade actuator to the blade assembly; and
cause the platform actuator to return the blade platform to the container engagement position subsequent to the second actuation.

2. The system of claim 1, wherein the platform actuator is configured to move the blade platform along a blade platform path from the blade engagement position to the container engagement position.

3. The system of claim 1, wherein the blade platform is rotated at least 75 degrees from the blade engagement position to a predetermined position.

4. The system of claim 1, wherein the processor is further configured to cause the blade actuator to recouple to the blade assembly when the blade platform is returned to the blade engagement position.

5. The system of claim 1, wherein the platform actuator is configured to move the blade platform to a predetermined position prior to an end of the blend cycle.

6. The system of claim 1, wherein the platform actuator is configured to move the blade platform to a predetermined position at a predetermined time during the blend cycle.

7. The system of claim 1, wherein causing the blade platform to move includes uprighting the container, and causing the blade platform to return to the blade engagement position includes inverting the container.

8. The system of claim 1, wherein the platform actuator includes a motor.

9. The system of claim 1, wherein the blade platform is configured to be coupled to the container platform while the blade platform is moved from the container engagement position to the blade engagement position.

10. The system of claim 1, wherein the container platform is operable between a loading position and a processing position distinct from the loading position.

11. A method for processing foodstuffs, comprising:
moving a blade platform, prior to a first actuation of a blade actuator for a blend cycle, from a container engagement position at which the blade platform is configured to couple to a container platform when the container platform is at a loading position, to a blade engagement position, a blade assembly including a set of blades configured to rotate to process the foodstuffs, the blade assembly mounted to the blade platform, the container platform defining a container receptacle configured to receive a container when the container platform is at a loading position, the blade actuator configured to rotate the blades;
performing a first actuation of the blade actuator by coupling the blade actuator to the blade assembly;
moving the blade platform, subsequent to the first actuation of the blade actuator, away from the blade engagement position towards the container engagement position;
returning the blade platform to the blade engagement position;
performing a second actuation of the blade actuator subsequent to the blade platform returning to the blade engagement position, the second actuation including recoupling the blade actuator to the blade assembly; and
returning the blade platform to the container engagement position subsequent to the second actuation.

12. The method of claim 11, wherein moving the blade platform includes using a platform actuator to move the blade platform along a blade platform path from the blade engagement position to the container engagement position.

13. The method of claim 11, wherein the blade platform is rotated at least 75 degrees from the blade engagement position to a predetermined position.

14. The method of claim 11, further comprising recoupling the blade actuator to the blade assembly when the blade platform is returned to the blade engagement position.

15. The method of claim 11, further comprising moving the blade platform to the predetermined position prior to an end of the blend cycle.

16. The method of claim 11, further comprising moving the blade platform to a predetermined position at a predetermined time during the blend cycle.

17. The method of claim 11, wherein moving the blade platform includes uprighting the container, and returning the blade platform to the blade engagement position includes inverting the container.

18. The method of claim 11, further comprising using a motor to move the blade platform.

19. The method of claim 11, further comprising coupling the blade platform to the container platform while the blade platform is moved from the container engagement position to the blade engagement position.

20. The method of claim 11, further comprising operating the container platform between a loading position and a processing position distinct from the loading position.

* * * * *